(12) United States Patent
Lee

(10) Patent No.: US 11,997,272 B2
(45) Date of Patent: *May 28, 2024

(54) IMAGE SIGNAL ENCODING/DECODING METHOD AND DEVICE FOR SAME

(71) Applicant: Apple Inc., Cupertino, CA (US)

(72) Inventor: Bae Keun Lee, Seongnam-si (KR)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/116,554

(22) Filed: Mar. 2, 2023

(65) Prior Publication Data
US 2023/0300331 A1 Sep. 21, 2023

Related U.S. Application Data

(63) Continuation of application No. 17/219,875, filed on Mar. 31, 2021, now Pat. No. 11,601,646, which is a (Continued)

(30) Foreign Application Priority Data

Jan. 2, 2019 (KR) .................. 10-2019-0000468
Jan. 15, 2019 (KR) .................. 10-2019-0004996

(51) Int. Cl.
*H04N 19/119* (2014.01)
*H04N 19/172* (2014.01)
(Continued)

(52) U.S. Cl.
CPC ......... *H04N 19/119* (2014.11); *H04N 19/172* (2014.11); *H04N 19/174* (2014.11);
(Continued)

(58) Field of Classification Search
CPC .............................. H04N 19/119; H04N 19/70
See application file for complete search history.

(56) References Cited

U.S. PATENT DOCUMENTS 11,012,691 B2  5/2021  Lee
11,601,646 B2  3/2023  Lee
(Continued)

FOREIGN PATENT DOCUMENTS

CN  109076216  12/2018
CN  113287313  8/2021
(Continued)

OTHER PUBLICATIONS

Bross et al., "Versatile Video Coding (Draft 2)," Joint Video Experts Team (JVET) of ITU-T SG 16 WP 3 and ISO/IEC JTC 1/SC 29/WG 11, JVET-K1001-v5, 11th Meeting: Ljubljana, SI, Jul. 10-18, 2018, 128 pages.

(Continued)

*Primary Examiner* — Fabio S Lima
(74) *Attorney, Agent, or Firm* — Fish & Richardson P.C.

(57) ABSTRACT

An image decoding method according to the present invention may include: a step for dividing a picture into a plurality of tiles; and a step for determining at least one slice on the basis of the plurality of tiles. Here, the step for dividing a picture into a plurality of tiles may include: a step for determining the width of a first tile column in the picture; and a step for determining the width of a second tile column neighboring the first tile column.

16 Claims, 19 Drawing Sheets

Related U.S. Application Data continuation of application No. 16/950,536, filed on Nov. 17, 2020, now Pat. No. 11,012,691, which is a continuation of application No. PCT/KR2020/000055, filed on Jan. 2, 2020.

(51) Int. Cl.
*H04N 19/174* (2014.01)
*H04N 19/70* (2014.01)
*H04N 19/103* (2014.01)
*H04N 19/159* (2014.01)
*H04N 19/176* (2014.01)

(52) U.S. Cl.
CPC .......... *H04N 19/70* (2014.11); *H04N 19/103* (2014.11); *H04N 19/159* (2014.11); *H04N 19/176* (2014.11)

(56) References Cited

U.S. PATENT DOCUMENTS

| | | | |
|---|---|---|---|
| 2010/0158401 | A1 | 6/2010 | Shiraishi et al. |
| 2012/0230398 | A1 | 9/2012 | Segall et al. |
| 2012/0230399 | A1 | 9/2012 | Segall et al. |
| 2016/0286235 | A1* | 9/2016 | Yamamoto ............ H04N 19/17 |
| 2017/0214920 | A1 | 7/2017 | Wang |
| 2019/0238860 | A1* | 8/2019 | Lim ................... H04N 21/4728 |
| 2019/0306515 | A1* | 10/2019 | Shima .................... H04N 19/85 |
| 2020/0344499 | A1* | 10/2020 | Fang .................... H04N 21/816 |
| 2021/0067775 | A1 | 3/2021 | Lee |
| 2021/0136407 | A1* | 5/2021 | Aono .................... H04N 19/55 |
| 2021/0168404 | A1* | 6/2021 | Lim ..................... H04N 19/513 |
| 2021/0203977 | A1* | 7/2021 | Lee ..................... H04N 19/132 |
| 2021/0235082 | A1 | 7/2021 | Lee |

FOREIGN PATENT DOCUMENTS

| | | |
|---|---|---|
| JP | 2017-208846 | 11/2017 |
| JP | 2018-056686 | 4/2018 |
| KR | 10-2015-0033194 | 4/2015 |
| KR | 10-2018-0098158 | 9/2018 |
| KR | 10-2018-0111839 | 10/2018 |
| WO | WO 2018116924 | 6/2018 |

OTHER PUBLICATIONS

Chen et al., "AHG17: Flexible tile grouping for VVC," Joint Video Experts Team (JVET) of ITU-T SG 16 WP 3 and ISO/IEC JTC 1/SC 29/WG 11, JVET-M0160-v1, Jan. 2, 2019, 7 pages.
Deshpande et al., "On Tile Grouping," Joint Video Experts Team (JVET) of ITU-T SG 16 WP 3 and ISO/IEC JTC 1/SC 29/WG 11, JVET-M0853-v2, 13th Meeting: Marrakech, MA, Jan. 9-18, 2019, 8 pages.
Extended European Search Report in European Appln No. 20736045, dated Oct. 14, 2022, 10 pages.
He, "AHG12: On Rectangular Tile Group," of ITU-T SG 16 WP 3 and ISO/IEC JTC 1/SC 29/WG 11, JVET-M0121r1, 13th Meeting: Marrakech, MA, Jan. 9-18, 2019, 9 pages.
High Efficiency Video Coding—Coding Tools and Specification, Dec. 31, 2015, Chapter 4, pp. 101-132.
International Preliminary Report on Patentability in International Appln. No. PCT/KR2020/000055, dated Jul. 15, 2022, 13 pages (with Machine Translation).
International Search Report and Written Opinion in International Appln. No. PCT/KR2020/000055, dated Apr. 13, 2020, 15 pages (with Machine Translation).
Kondo et al., "On constant shift and offset in MIP," Joint Video Experts Team (JVET) of ITU-T SG 16 WP 3 and ISO/IEC JTC 1/SC 29/WG 11, JVET-Q0161, 17th Meeting: Brussels, BE, Jan. 7-17, 2020, 5 pages.
Sjöberg et al., "Flexible Tiles," Joint Video Experts Team (JVET) of ITU-T SG 16 WP 3 and ISO/IEC JTC 1/SC 29/WG 11, JVET-K0260-v2, 11th Meeting, Ljubljana, SI, Jul. 10-18, 2018, 10 pages.
Zhang et al., "AHG12: Control of loop filtering across subpicture/tile/slice boundaries," Joint Video Experts Team (JVET) of ITU-T SG 16 WP 3 and ISO/IEC JTC 1/SC 29/WG 11, JVET-Q0120-v1, 17th Meeting, Brussels, BE, Jan. 7-17, 2020, 11 pages.

* cited by examiner

[FIG. 1]
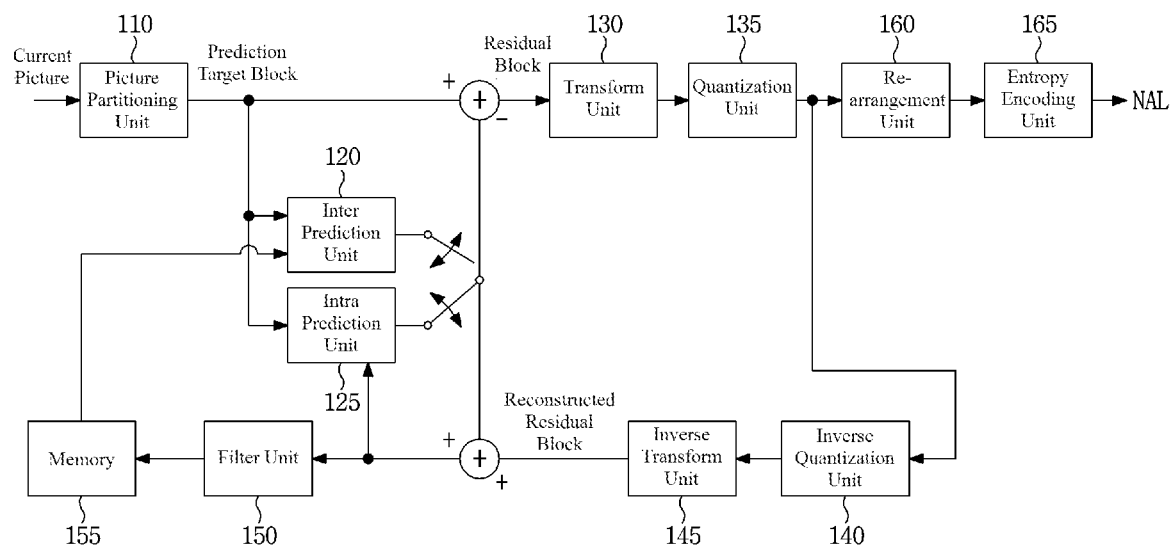
[FIG. 2]
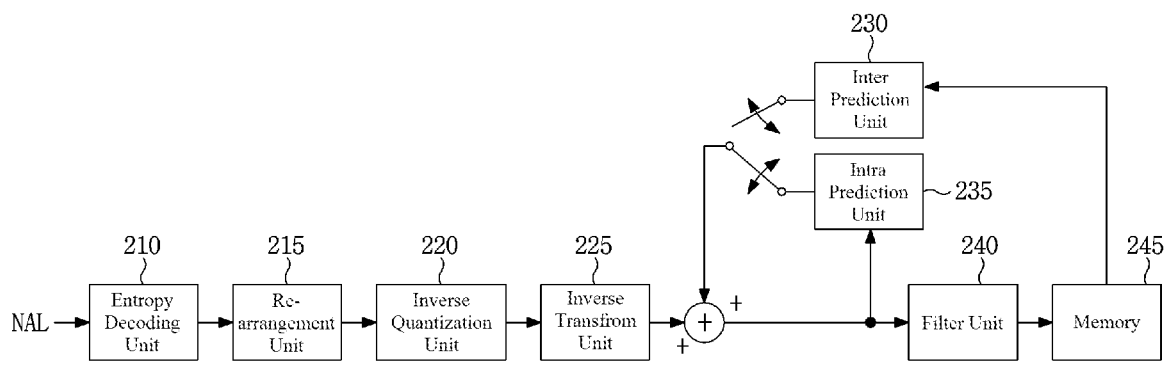

【FIG. 3】
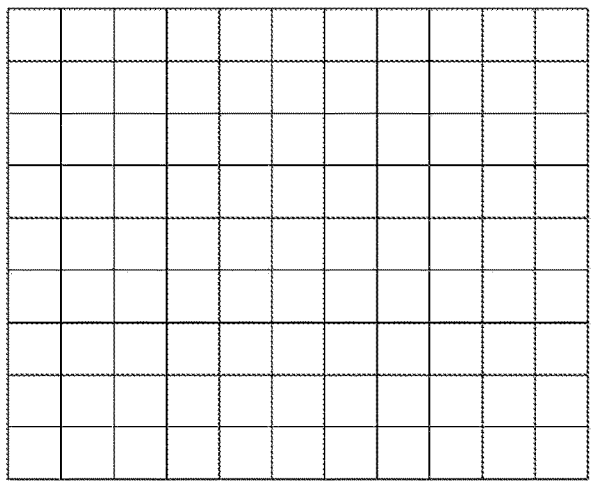
【FIG. 4】
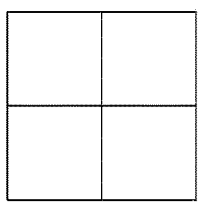 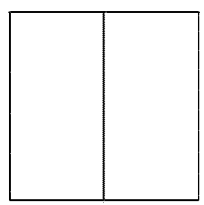 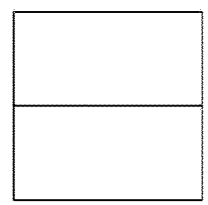 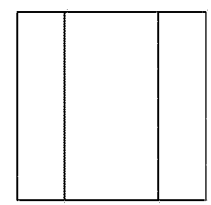 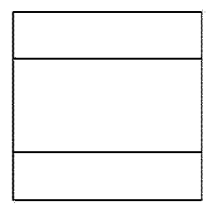
SPLIT_QT    SPLIT_BT_VER    SPLIT_BT_HOR    SPLIT_TT_VER    SPLIT_TT_HOR
【FIG. 5】
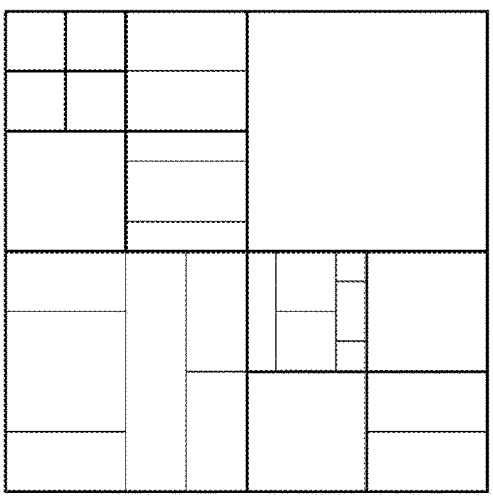

【FIG. 6】
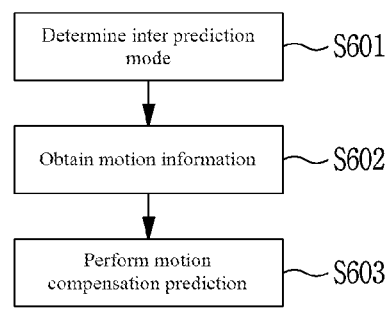
【FIG. 7】
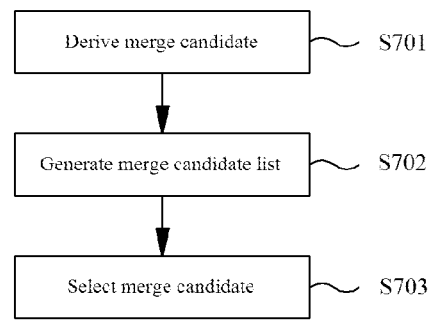

【FIG. 8】
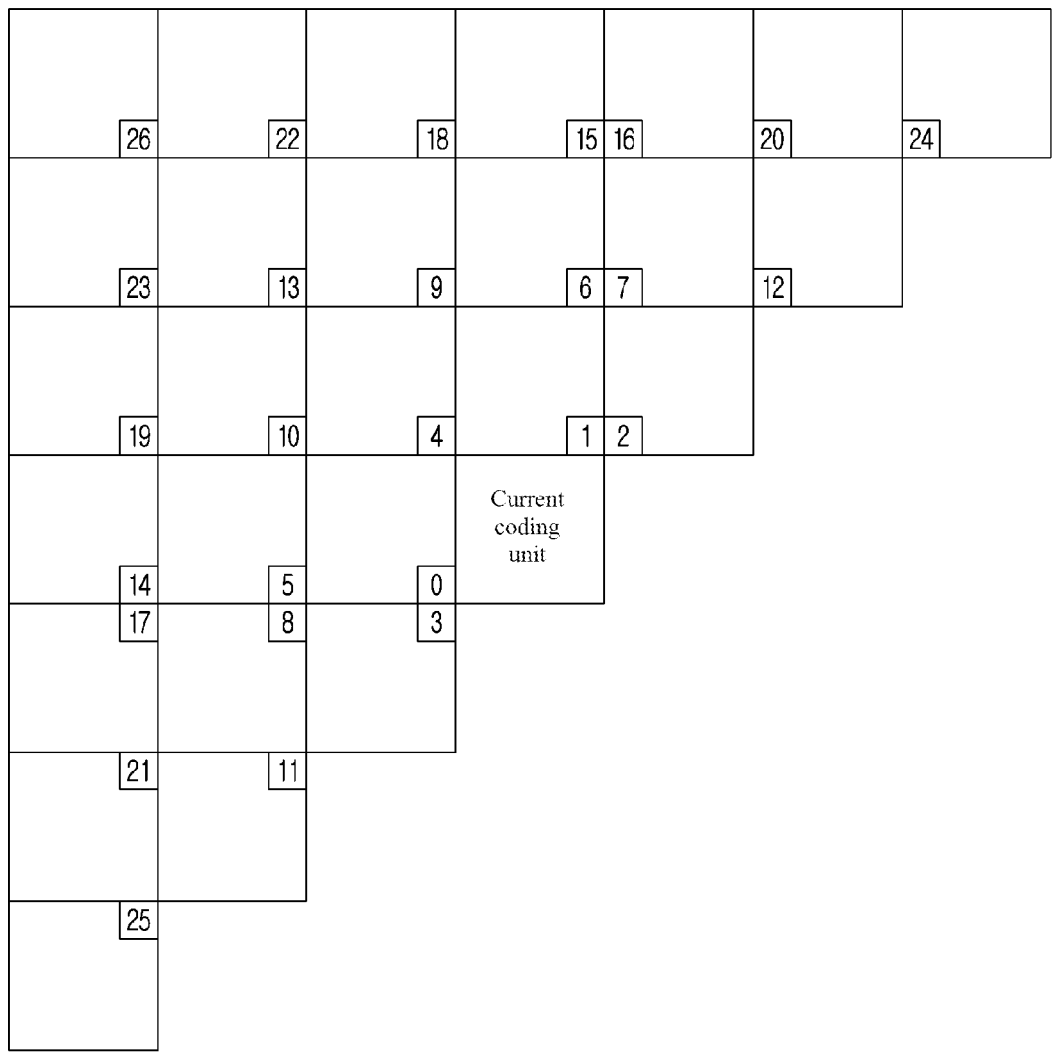

【FIG. 9】
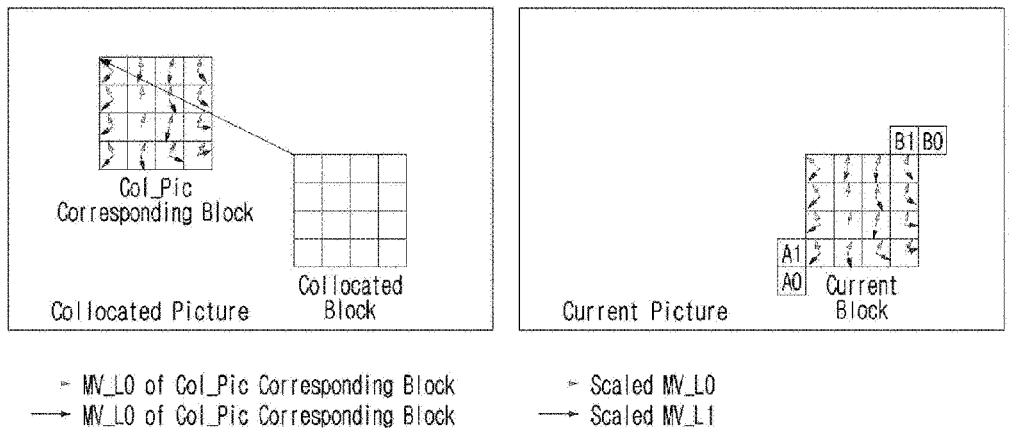
【FIG. 10】
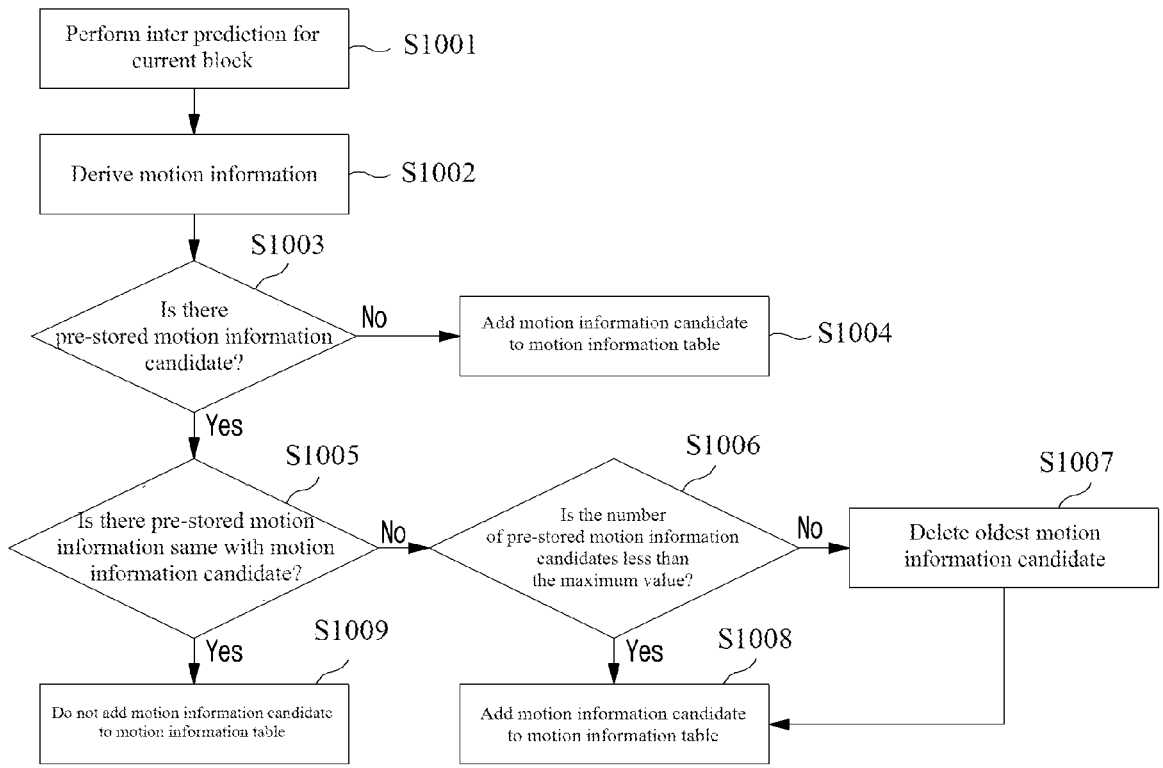

[FIG. 11]
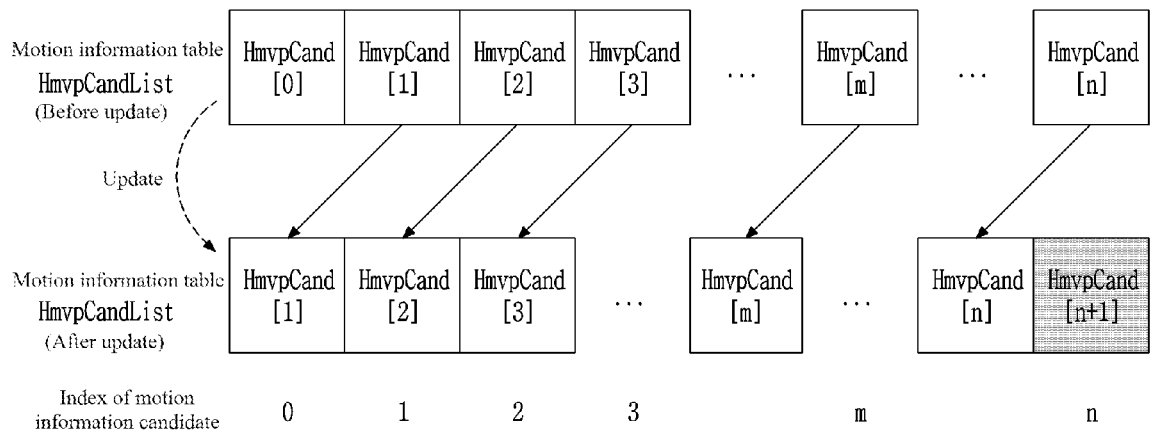
[FIG. 12]
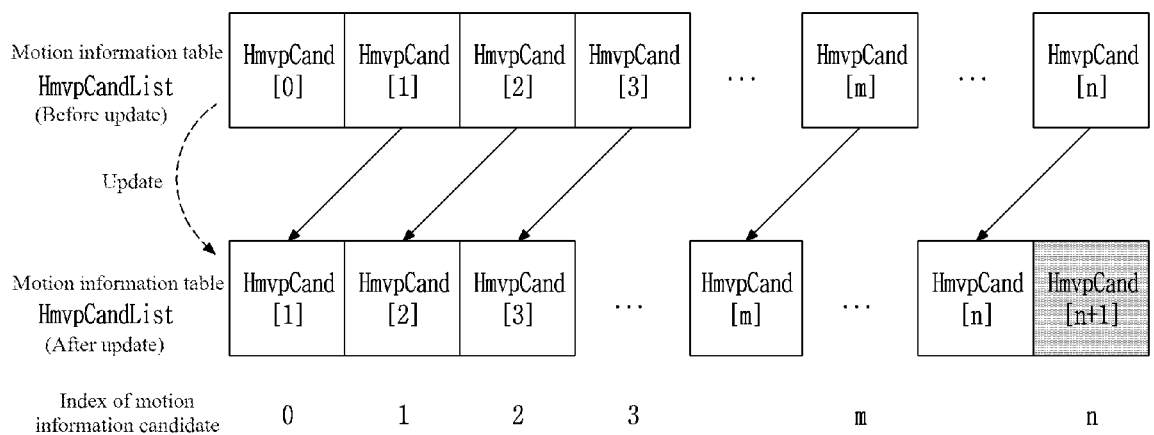

[FIG. 13]
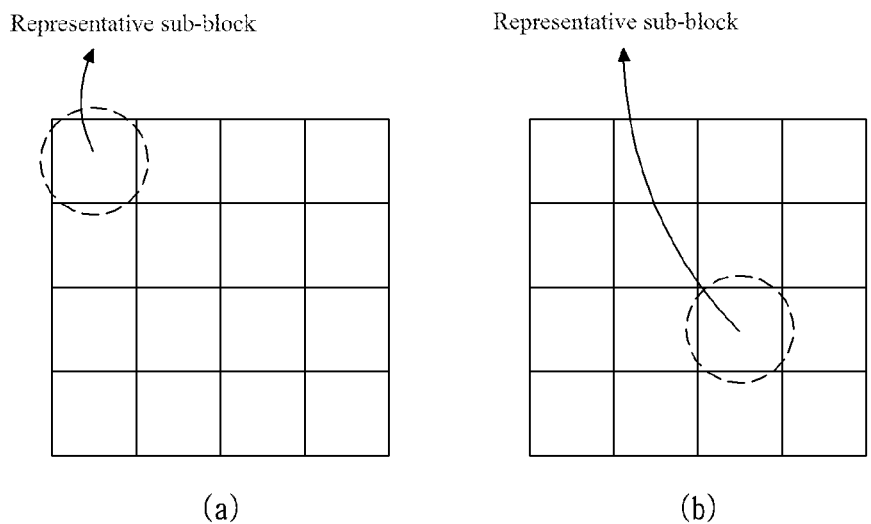
(a)  (b)
[FIG. 14]
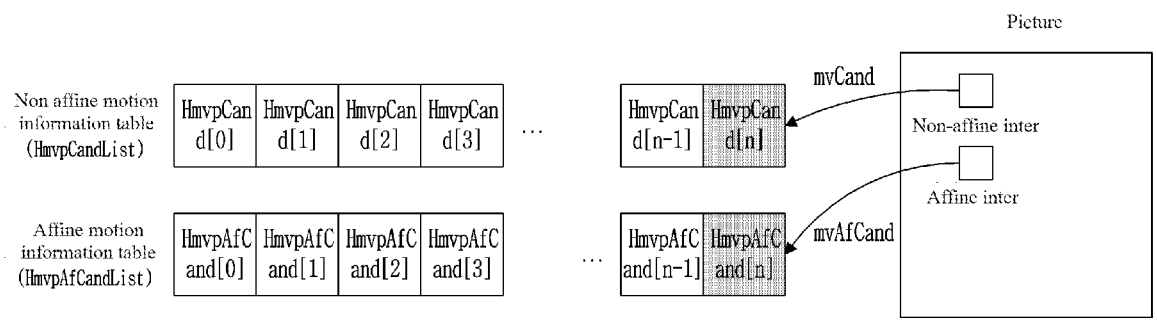

[FIG. 15]
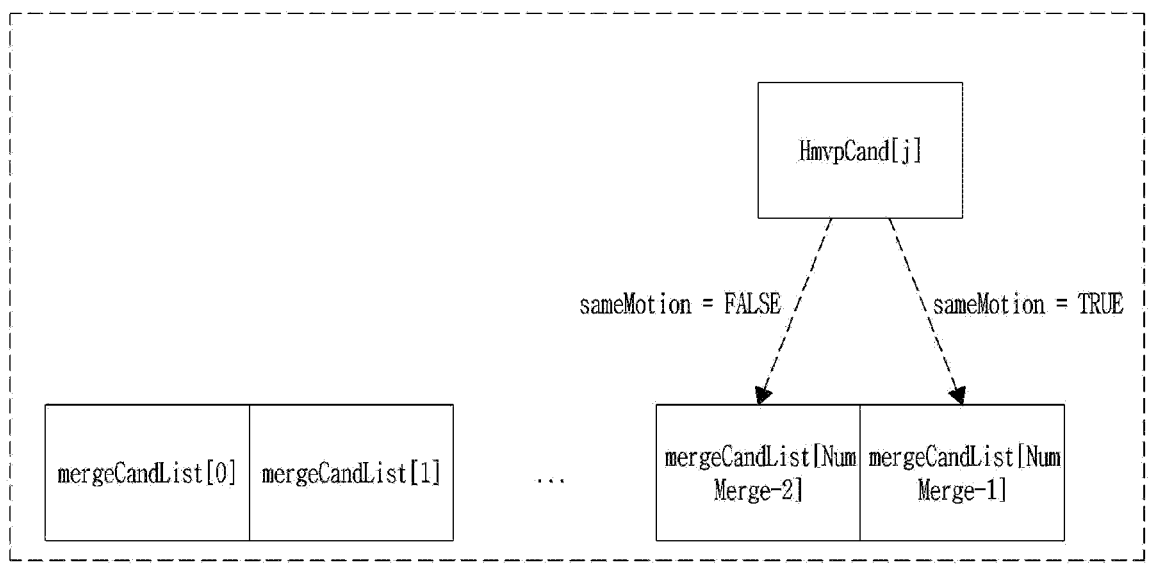

【FIG. 16】
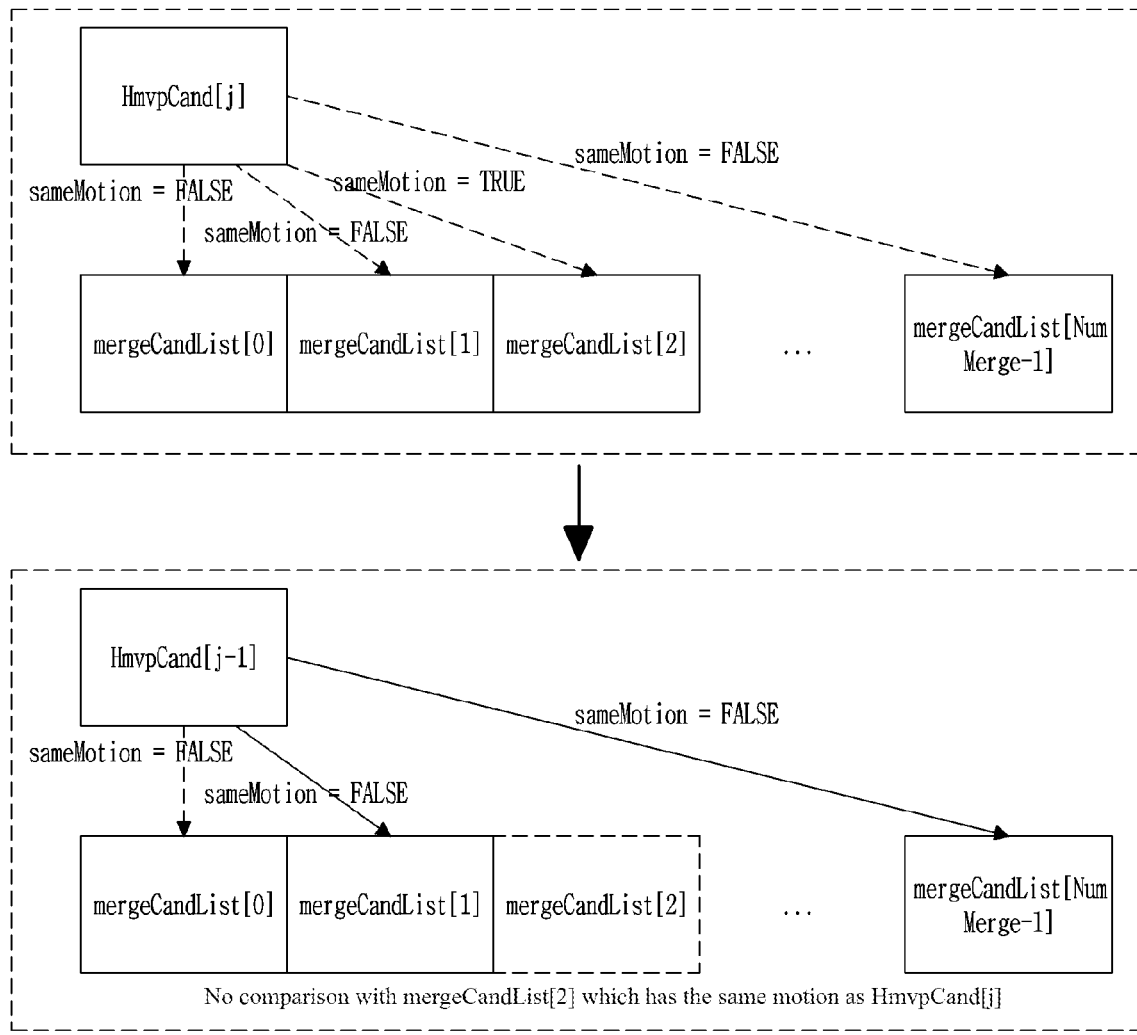
【FIG. 17】
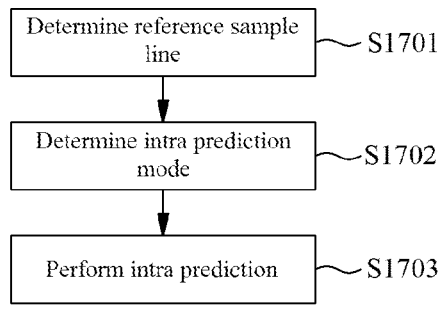

【FIG. 18】
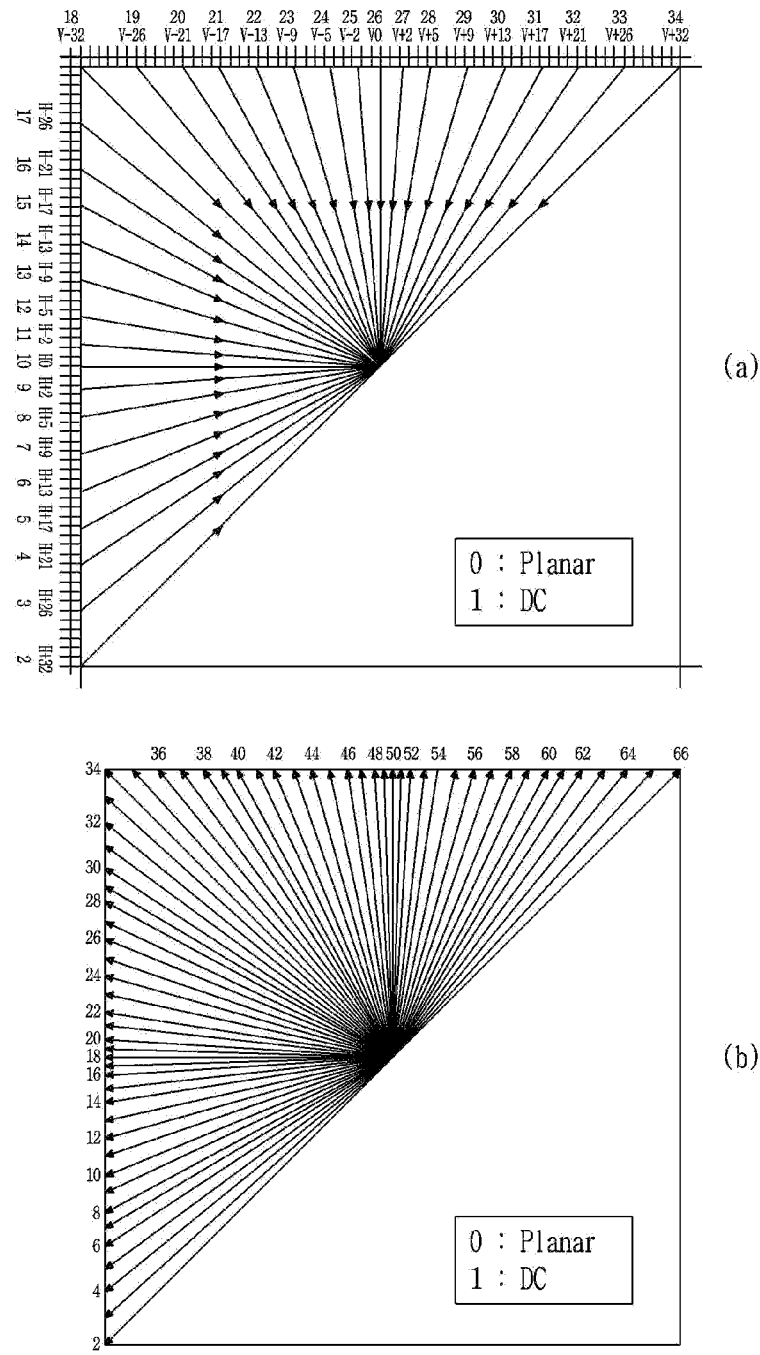

【FIG. 19】
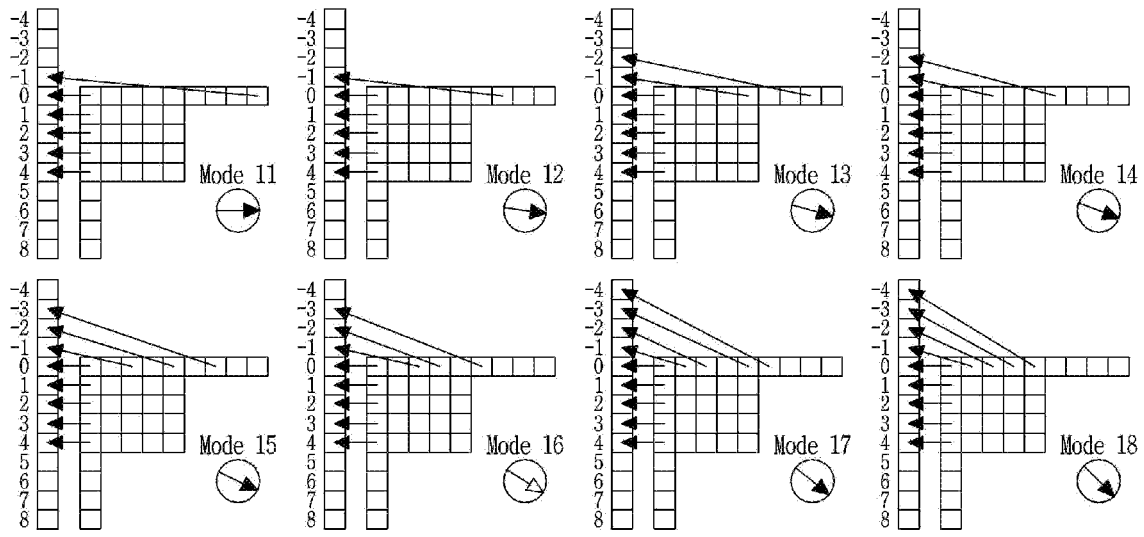
【FIG. 20】
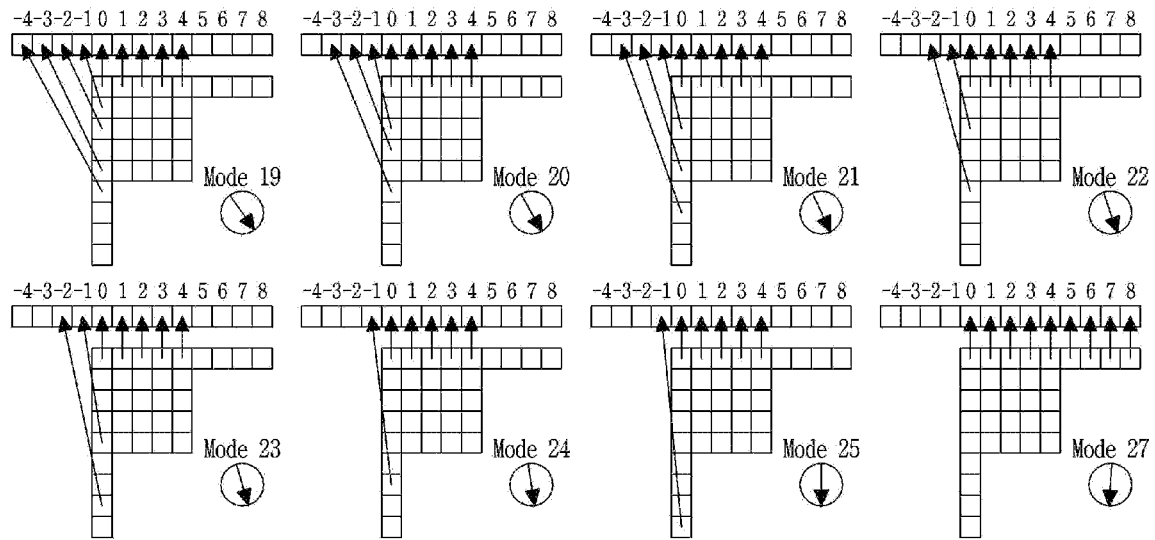

【FIG. 21】
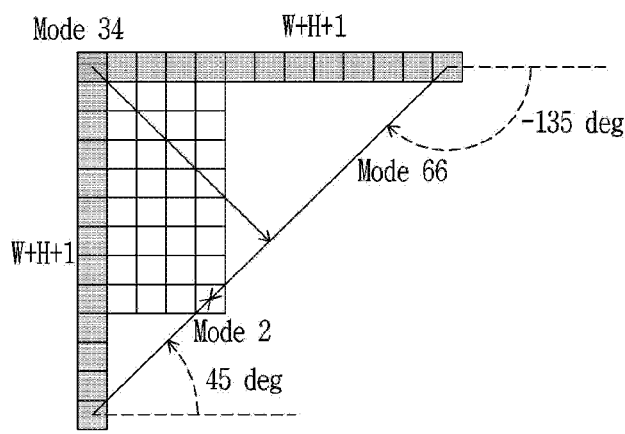
【FIG. 22】
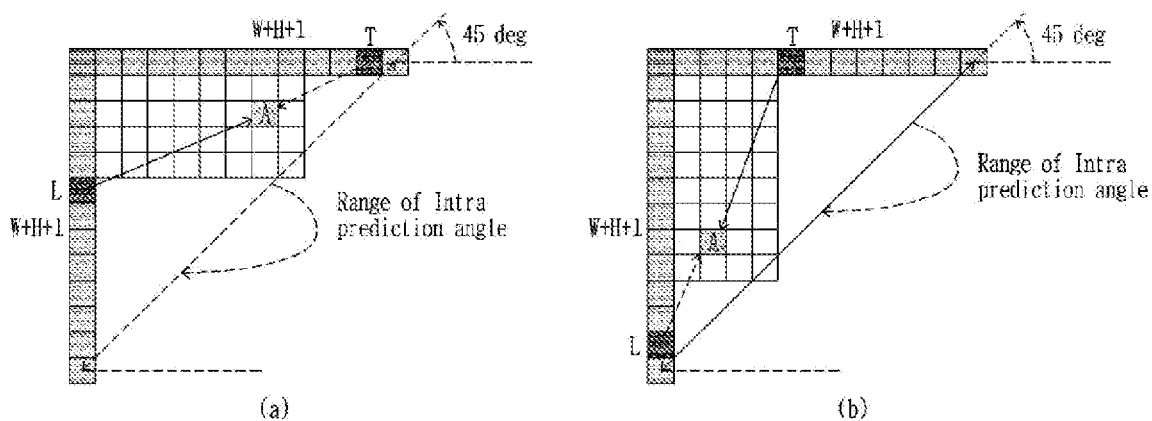

[FIG. 23]
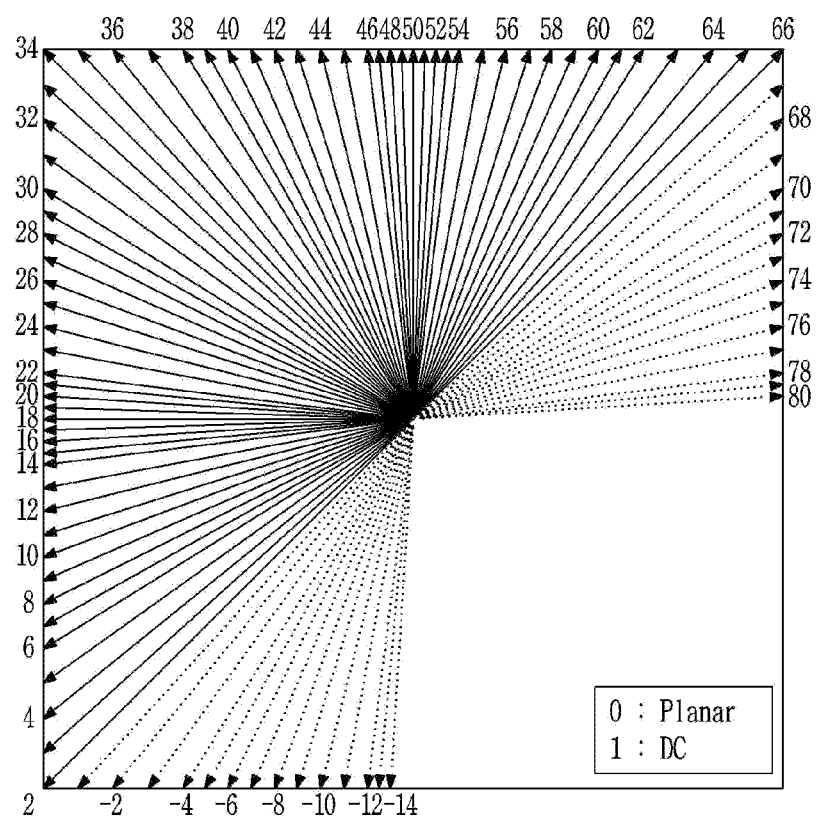

[FIG. 24]
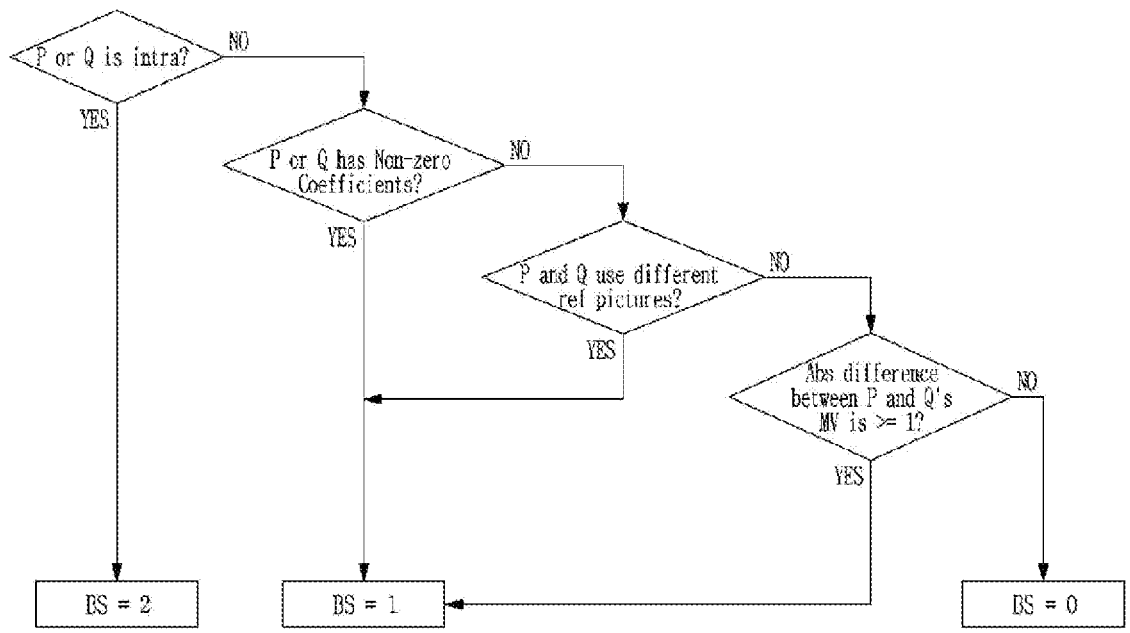
[FIG. 25]
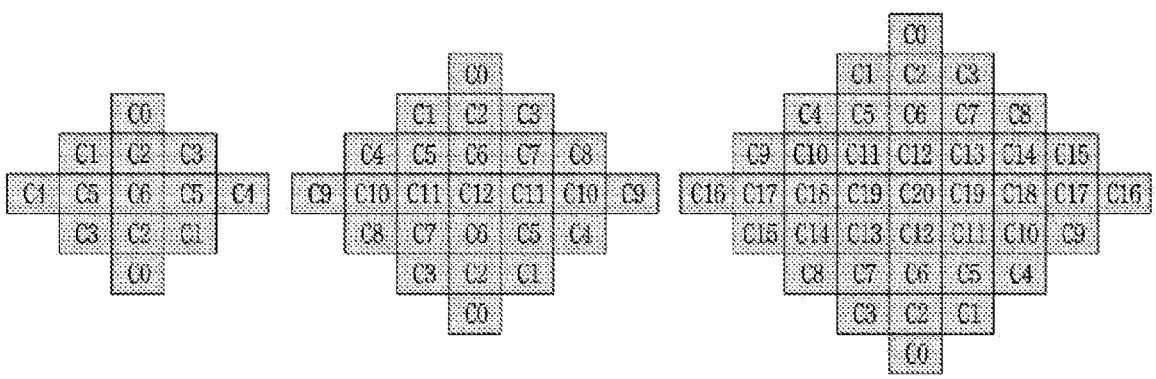

[FIG. 26]
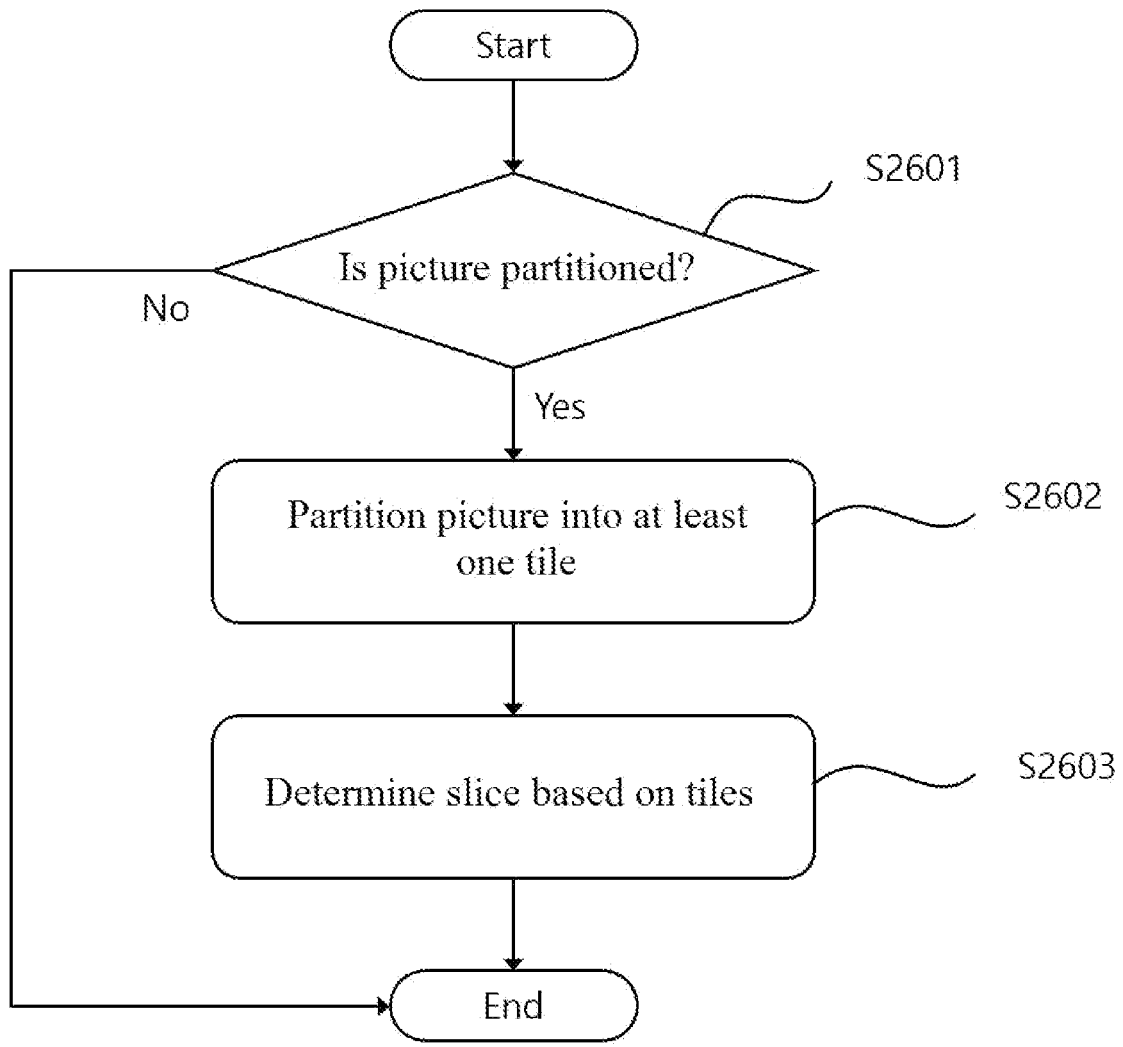

【FIG. 27】
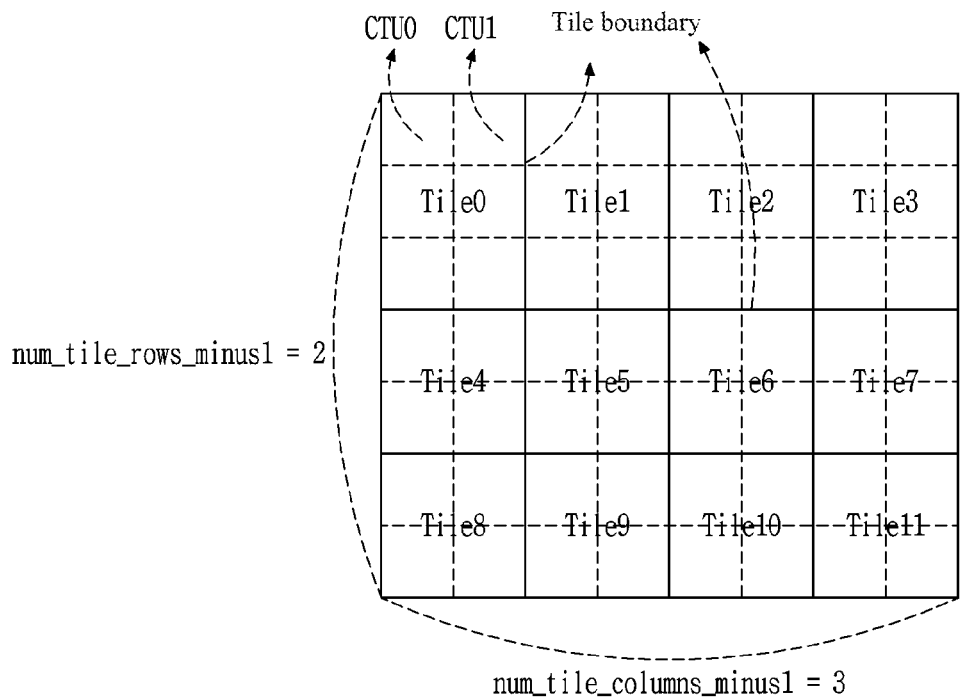
【FIG. 28】
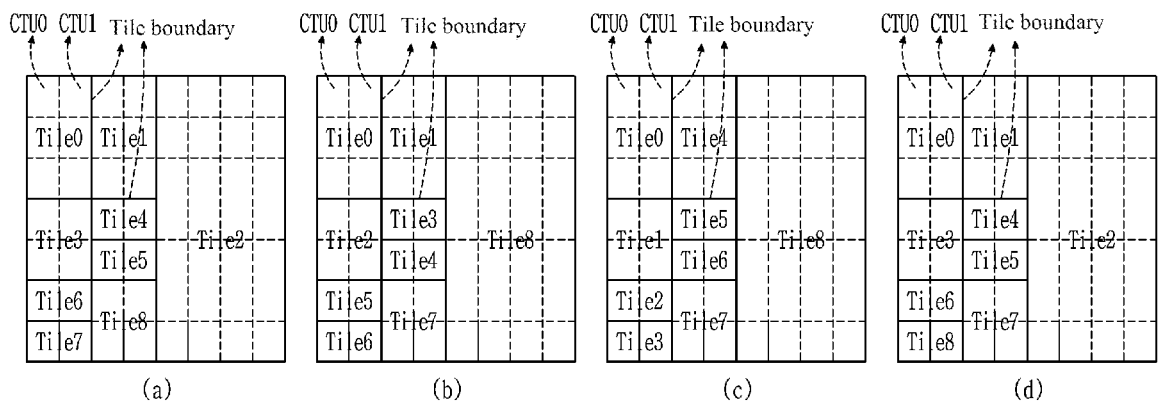

【FIG. 29】
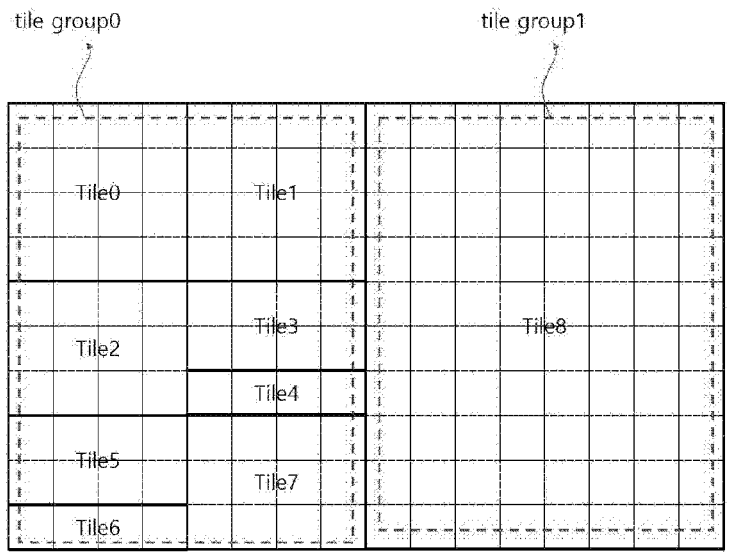
【FIG. 30】
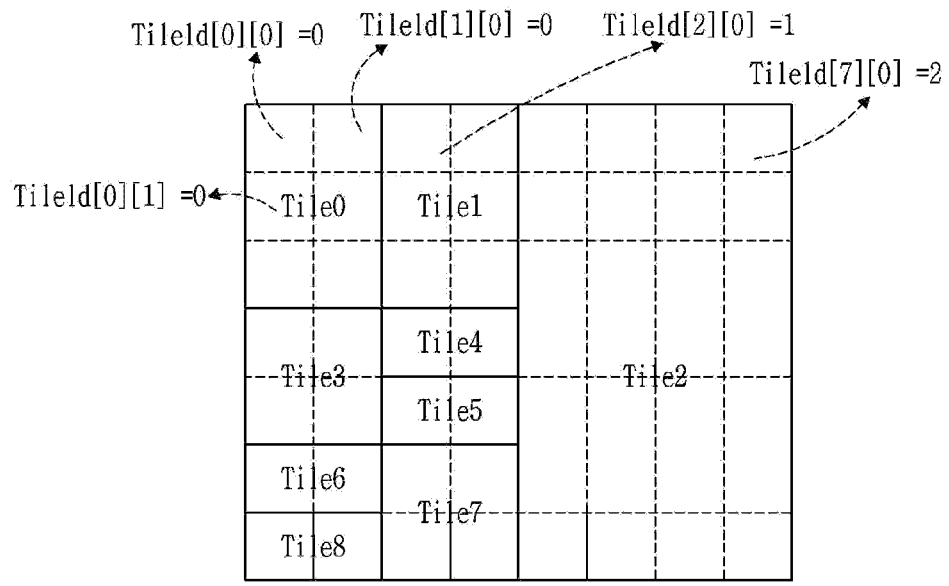

【FIG. 31】
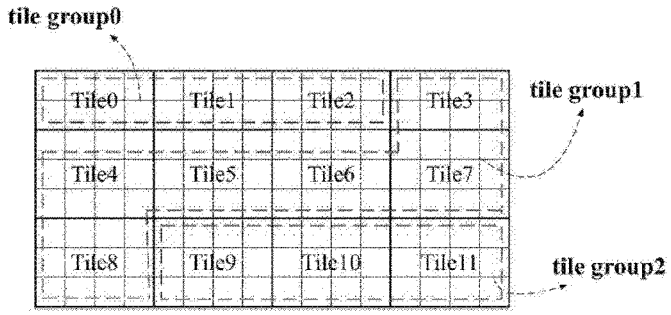
【FIG. 32】
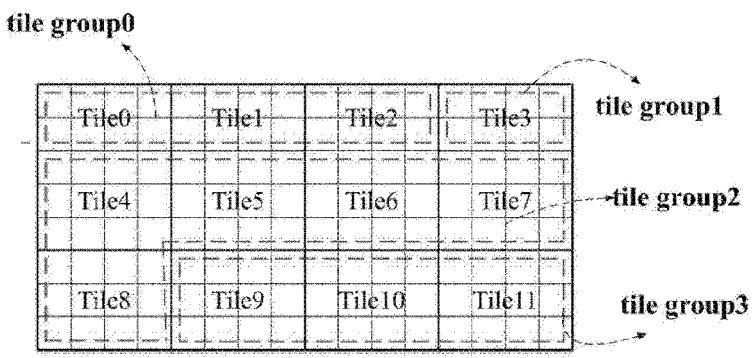
【FIG. 33】
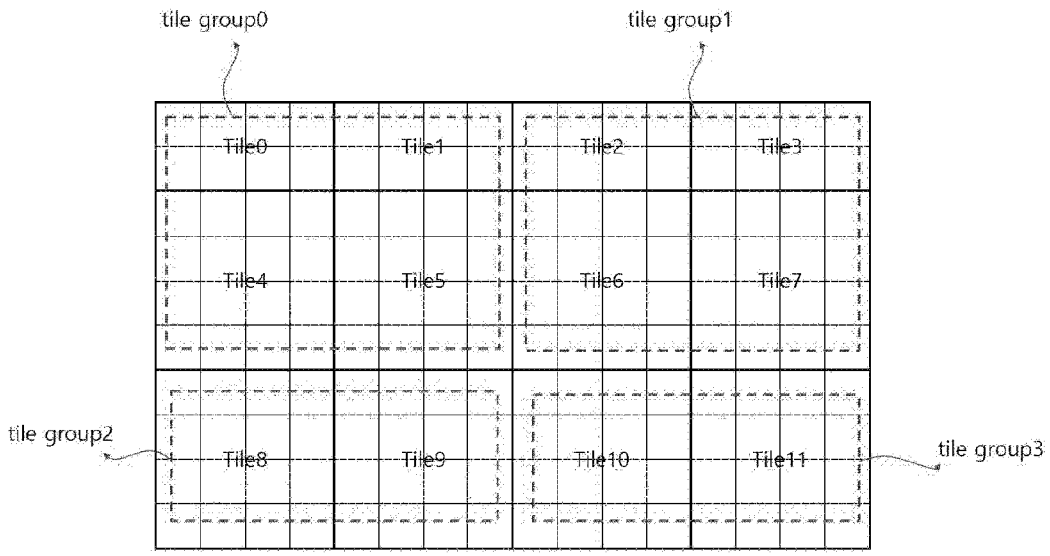

【FIG. 34】
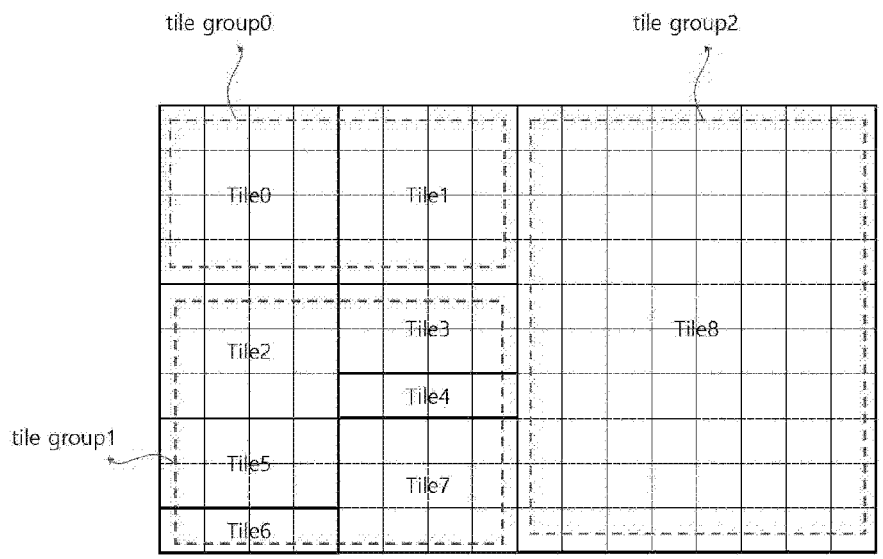
【FIG. 35】
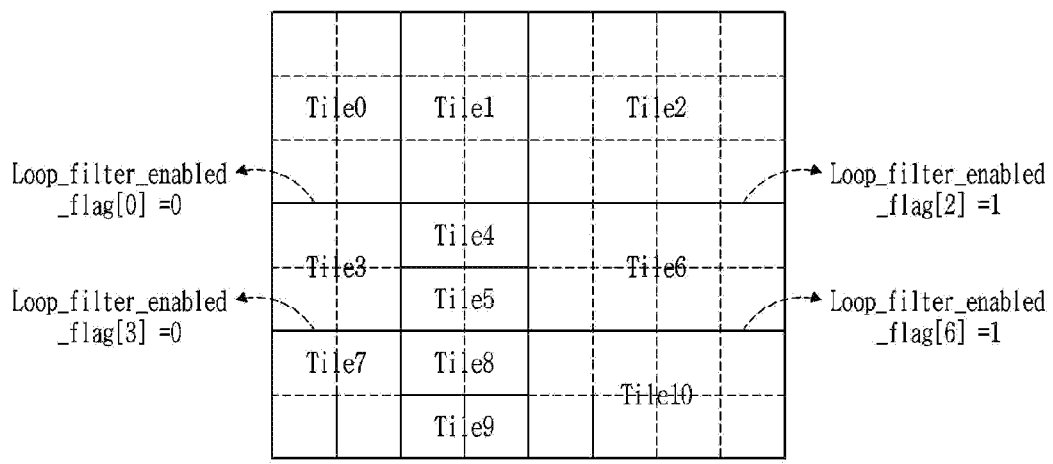

IMAGE SIGNAL ENCODING/DECODING METHOD AND DEVICE FOR SAME

The present application is a continuation application of application Ser. No. 17/219,875, filed Mar. 31, 2021, which is a continuation application of application Ser. No. 16/950,536, filed Nov. 17, 2020, which is a continuation of PCT International Application No.: PCT/KR2020/000055, filed on Jan. 2, 2020, which claims foreign priority to Korean Patent Application No.: 10-2019-0000468, filed on Jan. 2, 2019 and Korean Patent Application No.: 10-2019-0004996, filed on Jan. 15, 2019, the disclosures of which are hereby incorporated by reference in their entireties.

FIELD OF THE DISCLOSURE

The present disclosure relates to a video signal encoding/decoding method and a device therefor.

DESCRIPTION OF THE RELATED ART

As display panels become larger, video service of higher quality is required. The biggest problem with high-definition video service is that an amount of data is greatly increased. In order to solve the above problem, research for improving the video compression rate is being actively conducted. As a representative example, the Joint Collaborative Team on Video Coding (JCT-VC) was formed in 2009 by the Motion Picture Experts Group (MPEG) and the Video Coding Experts Group (VCEG) under the International Telecommunication Union-Telecommunication (ITU-T). The JCT-VC proposed High Efficiency Video Coding (HEVC), a video compression standard that has about twice compression performance of H.264/AVC, and that was approved as standard on Jan. 25, 2013. However, with rapid development of high-definition video services, the performance of HEVC is gradually showing its limitations.

DISCLOSURE

Technical Purpose

A purpose of the present disclosure is to provide a method for partitioning a picture into a plurality of tiles or a plurality of slices in encoding/decoding a video signal, and a device for performing the method.

A purpose of the present disclosure is to provide a method for selectively encoding/decoding size information of a tile column/a tile row according to whether a width/height is the same as that of a neighboring tile column/tile row in partitioning a picture into a plurality of tiles, and a device for performing the method.

A purpose of the present disclosure is to provide a method for determining a slice based on the number of tiles included in a slice or the index of a tile in a slice in partitioning a picture into a plurality of slices, and a device for performing the method.

Technical purposes obtainable from the present disclosure are non-limited to the above-mentioned technical purposes, and other unmentioned technical purposes may be clearly understood from the following description by those having ordinary skill in the technical field to which the present disclosure pertains.

Technical Solution

A video signal decoding method according to the present disclosure may include partitioning a picture into a plurality of tiles; and determining at least one slice based on the plurality of tiles. In this connection, partitioning the picture into a plurality of tiles may include determining a width of a first tile column in the picture; and determining a width of a second tile column neighboring the first tile column. In this connection, the width of the first tile column may be determined by a syntax representing the width of the first tile column and when the width of the second tile column is the same as the width of the first tile column, the decoding of a syntax representing the width of the second tile column may be omitted and the width of the second tile column may be set the same as the width of the first tile column.

In a video signal decoding method according to the present disclosure, the second tile column may be a right-most tile column in the picture.

In a video signal decoding method according to the present disclosure, determining the slice may include decoding information representing a method of determining the slice; and decoding information for determining tiles included in the slice. In this connection, information representing a method of determining the slice may represent whether the slice is defined based on a raster scanning order or whether the slice is defined in a rectangular shape. When the slice is defined based on the raster scanning order, information for determining the tiles may correspond to information representing the number of tiles included in the slice and when the slice is defined in a rectangular shape, information for determining the tiles may correspond to information for determining at least one index among tiles included in the slice.

In a video signal decoding method according to the present disclosure, information for determining the index may represent index difference between a tile at a predetermined position included in the slice and a tile at a predetermined position included in a previous slice.

In a video signal decoding method according to the present disclosure, for a last slice in the picture, decoding of information for determining the tiles may be omitted.

It is to be understood that the foregoing summarized features are exemplary aspects of the following detailed description of the present disclosure without limiting the scope of the present disclosure.

Technical Effect

According to the present disclosure, encoding/decoding efficiency may be improved by partitioning a picture into a plurality of tiles or slices.

According to the present disclosure, encoding/decoding efficiency may be improved by selectively encoding/decoding the size information of a tile column and a tile row according to whether a width/height is the same as that of a neighboring tile column/tile row.

According to the present disclosure, encoding/decoding efficiency may be improved by determining a slice based on the number of tiles included in a slice or the index of a tile in a slice.

Effects obtainable from the present disclosure may be non-limited by the above-mentioned effect, and other unmentioned effects may be clearly understood from the following description by those having ordinary skill in the technical field to which the present disclosure pertains.

BRIEF DESCRIPTION OF THE DRAWINGS

FIG. 1 is a view showing a block diagram of a video encoding device (encoder) according to an embodiment of the present disclosure;

FIG. 2 is a view showing a block diagram of a video decoding device (decoder) according to an embodiment of the present disclosure;

FIG. 3 is a view showing a basic coding tree unit according to an embodiment of the present disclosure;

FIG. 4 is a view showing various partitioning types of a coding block.

FIG. 5 is a view of an example showing an aspect of partitioning a CTU.

FIG. 6 is a flow diagram of an inter prediction method according to an embodiment of the present disclosure.

FIG. 7 is a flow diagram of a process deriving the current block motion information under a merge mode.

FIG. 8 is a diagram of illustrating candidate blocks used to derive a merge candidate.

FIG. 9 is a diagram to explain an example of determining a motion vector per sub-block.

FIG. 10 is a diagram to explain the update aspect of a motion information table.

FIG. 11 is a diagram showing the update aspect of a motion information table.

FIG. 12 is a diagram showing an example in which the index of a pre-saved motion information candidate is updated.

FIG. 13 is a diagram showing the position of a representative sub-block.

FIG. 14 shows an example in which a motion information table is generated per inter-prediction mode.

FIG. 15 is a diagram showing an example in which a redundance check is performed only for a part of merge candidates.

FIG. 16 is a diagram showing an example in which a redundance check with a specific merge candidate is omitted.

FIG. 17 is a flow diagram of an intra-prediction method according to an embodiment of the present disclosure.

FIG. 18 is a diagram showing intra-prediction modes.

FIG. 19 and FIG. 20 are a diagram showing the example of a one-dimensional array in which reference samples are arranged in a row.

FIG. 21 is a diagram illustrating an angle formed by directional intra-prediction modes with a straight line parallel to an x-axis.

FIG. 22 is a diagram showing an aspect in which a prediction sample is obtained in case that a current block has a non-square shape.

FIG. 23 is a diagram showing wide angle intra-prediction modes.

FIG. 24 is a flow diagram showing a process of determining a blocking strength.

FIG. 25 shows predefined filter candidates.

FIG. 26 is a diagram showing a picture partitioning method according to an embodiment of the present disclosure.

FIG. 27 shows an example in which a picture is partitioned into a plurality of tiles.

FIG. 28 is a diagram showing the partitioning aspect of a picture according to a flexible tile method.

FIG. 29 is a diagram showing an example in which the scanning order of tiles is determined according to a tile group index.

FIG. 30 is a diagram showing an example in which a TileID is assigned to each coding tree unit.

FIG. 31 and FIG. 32 are a diagram showing an example in which a tile group is defined based on the raster order.

FIG. 33 is a diagram showing an example in which only a rectangular tile group is allowed.

FIG. 34 is a diagram showing an example in which a tile group is defined in a flexible tile partitioning method.

FIG. 35 shows an example in which whether an in-loop filter is applied is selectively determined per tile.

DETAILED DESCRIPTION OF THE DISCLOSURE

Hereinafter, embodiments of the present disclosure will be described in detail with reference to the accompanying drawings.

Image encoding and decoding is performed on a basis of a block. In an example, for a coding block, a transform block, or a prediction block, encoding/decoding processes such as transform, quantization, prediction, in-loop filtering, reconstruction, etc. may be performed.

Hereinafter, an encoding/decoding target block is referred to as a "current block". In an example, a current block may represent a coding block, a transform block, or a prediction block according to a current process of encoding/decoding.

In addition, the term "unit" used in the present specification represents a basis unit for performing a specific encoding/decoding process, and a "block" may be understood to represent a sample array having a predetermined size. Unless otherwise stated, "block" and "unit" may be used interchangeably. In an example, in examples described later, a coding block and a coding unit may be understood to have the same meaning as each other.

FIG. 1 is view showing a block diagram of an image encoding apparatus (encoder) according to an embodiment of the present disclosure.

Referring to FIG. 1, an image encoding apparatus 100 may include a picture partitioning unit 110, prediction units 120 and 125, a transform unit 130, a quantization unit 135, a rearrangement unit 160, an entropy encoding unit 165, a dequantization unit 140, an inverse-transform unit 145, a filter unit 150, and a memory 155.

Components described in FIG. 1 are independently illustrated in order to show different characteristic functions in an image encoding apparatus, and the figure does not mean that each component is constituted by separated hardware or one software unit. That is, each component is just enumerated for convenience of explanation, at least two components of respective components may constitute one component or one component may be partitioned into a plurality of components which may perform their functions. Even an embodiment of integrating respective components and embodiment of dividing a component are also included in the scope of the present disclosure unless they are departing from the spirit of the present disclosure.

Further, some components are not requisite components that perform essential functions of the present disclosure but are optional components for just improving performance. The present disclosure may be implemented with the requisite component for implementing the spirit of the present disclosure other than the component used to just improve the performance and a structure including only the requisite component other than the optional component used to just improve the performance is also included in the scope of the present disclosure.

The picture partitioning unit 110 may partition an input picture into at least one processing unit. In this connection, the processing unit may be a prediction unit (PU), a transform unit (TU), or a coding unit (CU). In the picture partitioning unit 110, a single picture may be partitioned into combinations of a plurality of coding units, prediction units, and transform units, and the picture may be encoded by selecting a combination of the coding units, the prediction units, and the transform units according to a predetermined condition (for example, cost function).

For example, a single picture may be partitioned into a plurality of coding units. In order to partition a picture into coding units, a recursive tree structure such as a quad-tree structure may be used, and a coding unit that is originated from a root such as a single image or largest coding unit may be partitioned into other coding units and may have child nodes as many as the partitioned coding units. A coding unit that is no longer partitioned according to certain restrictions becomes a leaf node. Namely, when it is assumed that only square partitioning is available for a single coding unit, a single coding unit may be partitioned into at most four other coding units.

Hereinafter, in the embodiment of the present disclosure, a coding unit may be used as a unit for encoding or may be used as a unit for decoding.

A prediction unit may be obtained by partitioning a single coding unit into at least one square or rectangle having the same size, or a single coding unit may be partitioned into prediction units in such a manner that one prediction unit may be different from another prediction unit in a shape and/or size.

In generation of a prediction unit based on a coding block to which intra-prediction is being performed, when the coding unit is not the smallest coding unit, intra-prediction may be performed without performing partitioning into a plurality of N×N prediction units.

The prediction units 120 and 125 may include an inter-prediction unit 120 performing inter-prediction and an intra prediction unit 125 performing intra-prediction. Whether to perform inter-prediction or intra-prediction on a prediction unit may be determined, and detailed information (for example, an intra-prediction mode, a motion vector, a reference picture, etc.) according to each prediction method may be determined. In this connection, a processing unit on which prediction is performed may differ with a processing unit for which a prediction method, and detail thereof are determined. For example, a prediction method, a prediction mode, etc. may be determined on the basis of a prediction unit, and prediction may be performed on the basis of a transform unit. A residual value (residual block) between the generated prediction block and an original block may be input to the transform unit 130. In addition, prediction mode information used for prediction, motion vector information, etc. may be encoded using a residual value by the entropy encoding unit 165 and may be transmitted to the decoder. When a specific encoding mode is used, an original block is encoded as it is and transmitted to a decoding unit without generating a prediction block through the prediction unit 120 or 125.

The inter-prediction unit 120 may predict a prediction unit on the basis of information on at least one of a previous picture and a subsequent picture of a current picture, or in some cases, may predict a prediction unit on the basis of information on some encoded regions in the current picture. The inter-prediction unit 120 may include a reference picture interpolation unit, a motion prediction unit, and a motion compensation unit.

The reference picture interpolation unit may receive reference picture information from the memory 155, and generate pixel information of a pixel at an integer or less from the reference picture. In case of a luma pixel, an 8-tap DCT-based interpolation filter having different coefficients may be used so as to generate pixel information on a pixel at an integer or less for a ¼ pixel unit. In case of a chroma signal, a 4-tap DCT-based interpolation filter having different filter coefficients may be used so as to generate pixel information on a pixel at an integer or less for a ⅛ pixel unit.

The motion prediction unit may perform motion prediction based on a reference picture interpolated by the reference picture interpolation unit. As methods for calculating a motion vector, various methods, such as a full search-based block matching algorithm (FBMA), a three step search (TSS) algorithm, a new three-step search (NTS) algorithm, etc. may be used. A motion vector may have a motion vector value in a unit of ½ or ¼ pixel on the basis of the interpolated pixel. The motion prediction unit may predict a current prediction unit by varying a motion prediction method. As motion prediction methods, various methods, such as a skip method, a merge method, an advanced motion vector prediction (AMVP) method, an intra block copy method, etc. may be used.

The intra-prediction unit 125 may generate a prediction unit on the basis of information on a reference pixel around a current block, which is pixel information in a current picture. When a neighboring block of a current prediction unit is a block for which inter-prediction is performed, and thus a reference pixel is a pixel for which inter-prediction is performed, a reference pixel included in the block for which inter-prediction is performed may be replaced by information on a reference pixel of a neighboring block for which intra-prediction is performed. In other words, when a reference pixel is unavailable, at least one reference pixel of available reference pixels may be used in place of unavailable reference pixel information.

A prediction mode in intra-prediction may include a directional prediction mode using reference pixel information according to a prediction direction and a non-directional mode not using directional information when performing prediction. A mode for predicting luma information may be different from a mode for predicting chroma information. In order to predict the chroma information, information on an intra-prediction mode used for predicting the luma information or information on a predicted luma signal may be used.

In performing intra-prediction, when a prediction unit is identical in a size with a transform unit, intra-prediction may be performed on the prediction unit on the basis of pixels positioned at the left, the top-left, and the top of the prediction unit. However, in performing intra-prediction, when a prediction unit is different in a size with a transform unit, intra-prediction may be performed by using a reference pixel based on the transform unit. In addition, intra-prediction using N×N partitioning may be only used for the smallest coding unit.

In an intra-prediction method, a prediction block may be generated after applying an adaptive intra smoothing (AIS) filter to a reference pixel according to a prediction mode. A type of AIS filter applied to a reference pixel may vary. In order to perform an intra-prediction method, an intra prediction mode for a current prediction unit may be predicted from an intra-prediction mode of a prediction unit present around the current prediction unit. In predicting a prediction mode for a current prediction unit by using mode information predicted from a neighboring prediction unit, when an intra prediction mode for the current prediction unit is identical to an intra prediction mode of the neighboring prediction unit, information indicating that the current prediction unit and the neighboring prediction unit have the same prediction mode may be transmitted by using predetermined flag information. When a prediction mode for the current prediction unit is different from prediction modes of the neighboring prediction units, entropy encoding may be performed to encode information on a prediction mode for a current block.

In addition, a residual block may be generated which includes information on a residual value that is a difference value between a prediction unit for which prediction is performed on by the prediction unit 120 or 125, and an original block of the prediction unit. The generated residual block may be input to the transform unit 130.

The transform unit 130 may perform transform on a residual block, which includes information on a residual value between an original block and a prediction unit generated by the prediction unit 120 or 125, by using a transform method such as discrete cosine transform (DCT) or discrete sine transform (DST). In this connection, a DCT transform core includes at least one of DCT2 or DCT8 and a DST transform core includes DST7. Whether to apply DCT, or DST so as to perform transform on a residual block may be determined on the basis of information on an intra-prediction mode of a prediction unit which is used to generate the residual block. It is possible to skip a transform for a residual block. A flag indicating whether or not to skip a transform for a residual block may be encoded. A transform skip may be allowed for a residual block whose a size is smaller than or equal to a threshold value, a residual block of a luma component, or a residual block of a chroma component under 4:4:4 format.

The quantization unit 135 may perform quantization on values transformed into a frequency domain by the transform unit 130. A quantization coefficient may vary according to a block or importance of an image. Values calculated in the quantization unit 135 may be provided to the dequantization unit 140 and the rearrangement unit 160.

The rearrangement unit 160 may perform rearrangement on coefficient values with respect to quantized residual values.

The rearrangement unit 160 may change coefficients in the form of a two-dimensional block into coefficients in the form of a one-dimensional vector through a coefficient scanning method. For example, the rearrangement unit 160 may scan from a DC coefficient to a coefficient in a high frequency domain by using a zigzag scanning method so as to change the coefficients into the form of a one-dimensional vector. According to a size and an intra prediction mode of a transform unit, rather than zigzag scanning, vertical directional scanning where coefficients in the form of a two-dimensional block are scanned in a column direction, or horizontal directional scanning where coefficients in the form of two-dimensional block are scanned in a row direction may be used. In other words, which scanning method among zigzag scanning, vertical directional scanning, and horizontal directional scanning is used may be determined according to a size and an intra prediction mode of a transform unit.

The entropy encoding unit 165 may perform entropy encoding on the basis of values calculated by the rearrangement unit 160. Entropy encoding may use various encoding methods, for example, exponential Golomb coding, context-adaptive variable length coding (CAVLC), or context-adaptive binary arithmetic coding (CABAL).

The entropy encoding unit 165 may encode various types of information, such as information on a residual value coefficient and information on a block type of a coding unit, information on a prediction mode, information on a partitioning unit, information on a prediction unit, information on a partitioning unit, information on a prediction unit and information on a transmission unit, information on a motion vector, information on a reference frame, information on a block interpolation, filtering information, etc. obtained from the rearrangement unit 160 and the prediction units 120 and 125.

The entropy encoding unit 165 may entropy encode coefficients of a coding unit input from the rearrangement unit 160.

The dequantization unit 140 may perform dequantization on values quantized in the quantization unit 135, and the inverse-transform unit 145 may perform inverse-transform on values transformed in the transform unit 130. A residual value generated by the dequantization unit 140 and the inverse-transform unit 145 may be added with a prediction unit predicted by a motion estimation unit, a motion compensation unit, or the intra-prediction unit which are included in the prediction units 120 and 125 so as to generate a reconstructed block.

The filter unit 150 may include at least one of a deblocking filter, an offset correction unit, and an adaptive loop filter (ALF).

The deblocking filter may remove block distortion that occurs due to boundaries between blocks in a reconstructed picture. In order to determine whether or not to perform deblocking, whether or not to apply a deblocking filter to a current block may be determined on the basis of pixels included in several rows and columns included in a block. When a deblocking filter is applied to a block, a strong filter or a weak filter is applied according to required deblocking filtering strength. In addition, in applying a deblocking filter, when performing horizontal directional filtering and vertical directional filtering, horizontal directional filtering and vertical directional filtering may be configured to be processed in parallel.

The offset correction unit may correct an original image by an offset in a unit of a pixel with respect to an image for which deblocking is performed. In order to perform offset correction on a specific picture, a method of applying a offset to a region which is determined after partitioning pixels of the image into the predetermined number of regions, or a method of applying an offset according to edge information of each pixel may be used.

Adaptive loop filtering (ALF) may be performed on the basis of a value obtained by comparing a filtered reconstructed image with an original image. Pixels included in an image may be partitioned into predetermined groups, a filter to be applied to each of the groups may be determined, and filtering may be individually performed on each group. Information on whether or not to apply ALF and may be transmitted for each coding unit (CU) for a luma signal, and a shape and a filter coefficient of an ALF filter to be applied may vary on the basis of each block. Alternatively, an ALF filter having the same shape (fixed shape) may be applied regardless of a feature of a block to which the filter will be applied.

In the memory 155, a reconstructed block or picture calculated through the filter unit 150 may be stored. The stored reconstructed block or picture may be provided to the prediction unit 120 or 125 when performing inter-prediction.

FIG. 2 is view showing a block diagram of an image decoding apparatus (decoder) according to an embodiment of the present disclosure.

Referring to FIG. 2, an image decoding apparatus 200 may include: an entropy decoding unit 210, a rearrangement unit 215, a dequantization unit 220, an inverse-transform unit 225, prediction units 230 and 235, a filter unit 240, and a memory 245.

When an image bitstream is input from the encoder, the input bitstream may be decoded according to an inverse process of the image encoding apparatus.

The entropy decoding unit 210 may perform entropy decoding according to the inverse process of the entropy encoding by the entropy encoding unit of the image encoder. For example, in association with the methods performed by the image encoder apparatus, various methods, such as exponential Golomb coding, context-adaptive variable length coding (CAVLC), or context-adaptive binary arithmetic coding (CABAC) may be applied.

The entropy decoding unit 210 may decode information on intra-prediction and inter-prediction performed by the encoder.

The rearrangement unit 215 may perform rearrangement on the bitstream entropy decoded by the entropy decoding unit 210 on the basis of the rearrangement method used in the encoder. Coefficients represented in the form of a one-dimensional vector may be reconstructed and rearranged into coefficients in the form of a two-dimensional block. The rearrangement unit 215 may perform rearrangement through a method of receiving information related to coefficient scanning performed in the encoder and of inversely scanning on the basis of the scanning order performed in the encoder.

The dequantization unit 220 may perform dequantization on the basis of a quantization parameter received from the encoder and coefficient values of the rearranged block.

The inverse-transform unit 225 may perform, an inverse transform, that is inverse DCT or inverse DST, against to a transform, that is DCT or DST, performed on the quantization result by the transform unit in the image encoder. In this connection, a DCT transform core may include at least one of DCT2 or DCT8, and a DST transform core may include DST7. Alternatively, when the transform is skipped in the image encoder, the inverse-transform also not be performed in the inverse-transform unit 225. Inverse transform may be performed on the basis of a transmission unit determined by the image encoder. The inverse transform unit 225 of the image decoder may selectively perform a transform method (for example, DCT, or DST) according to multiple pieces of information, such as a prediction method, a size of a current block, a prediction direction, etc.

The prediction unit 230 or 235 may generate a prediction block on the basis of information related to a prediction block received from the entropy decoding unit 210 and information on a previously decoded block or picture received from the memory 245.

As described above, as the operation of the image encoder, in performing intra-prediction, when a prediction unit is identical in size with a transform unit, intra-prediction may be performed on the prediction unit on the basis of pixels positioned at the left, the top-left, and the top of the prediction unit. However, in performing intra-prediction, when a prediction unit is different in size with a transform unit, intra-prediction may be performed by using a reference pixel based on the transform unit. In addition, intra-prediction using N×N partitioning may be only used for the smallest coding unit.

The prediction units 230 and 235 may include a PU determination module, an inter-prediction unit, and an intra-prediction unit. The PU determination unit may receive various types of information, such as information on a prediction unit, information on a prediction mode of an intra-prediction method, information on a motion prediction of an inter-prediction method, etc. which are input from the entropy decoding unit 210, divide a prediction unit in a current coding unit, and determine whether inter-prediction or intra-prediction is performed on the prediction unit. By using information required in inter-prediction of a current prediction unit received from the image encoder, the inter-prediction unit 230 may perform inter-prediction on the current prediction unit on the basis of information on at least one of a previous picture and a subsequent picture of a current picture including the current prediction unit. Alternatively, inter-prediction may be performed on the basis of information on some pre-reconstructed regions in a current picture including the current prediction unit.

In order to perform inter-prediction, which method among a skip mode, a merge mode, an AMVP mode, or an intra block copy mode is used as a motion prediction method for a prediction unit included in a coding unit may be determined on the basis of the coding unit.

The intra prediction unit 235 may generate a prediction block on the basis of information on a pixel within a current picture. When a prediction unit is a prediction unit for which intra-prediction has been performed, intra-prediction may be performed on the basis of information on an intra-prediction mode of a prediction unit received from the image encoder. The intra prediction unit 235 may include an adaptive intra smoothing (AIS) filter, a reference pixel interpolation module, or a DC filter. The AIS filter may perform filtering on a reference pixel of a current block, and whether to apply the filter may be determined according to a prediction mode for a current prediction unit. A prediction mode of the prediction unit and information on an AIS filter which are received from the image encoder may be used when performing AIS filtering on a reference pixel of a current block. When a prediction mode for the current block is a mode to which AIS filtering is not applied, the AIS filter may not be applied.

When a prediction mode of a prediction unit is a prediction mode for which intra-prediction is performed on the basis of a pixel value obtained by interpolating reference pixels, the reference pixel interpolation unit may interpolate the reference pixels so as to generate a reference pixel having a unit of an integer or less. When a prediction mode for a current prediction unit is a prediction mode where a prediction block is generated without interpolating reference pixels, the reference pixels may not be interpolated. The DC filter may generate a prediction block through filtering when a prediction mode for a current block is a DC mode.

A reconstructed block or picture may be provided to the filter unit 240. The filter unit 240 may include a deblocking filter, an offset correction module, and an ALF.

Information on whether or not a deblocking filter has been applied to a corresponding block or picture and information on whether a strong filter or a weak filter is applied when the deblocking filter is applied may be received from the image encoder. The deblocking filter of the image decoder may receive information on a deblocking filter from the image encoder, and the image decoder may perform deblocking filtering on a corresponding block.

The offset correction unit may perform offset correction on a reconstructed image on the basis of a type of offset correction, information on an offset value, etc. applied to an image when performing encoding.

The ALF may be applied to a coding unit on the basis of information on whether or not to apply ALF, information on an ALF coefficient, etc. received from the encoder. The above ALF information may be provided by being included in a particular parameter set.

In the memory 245, a reconstructed picture or block may be stored so as to be used as a reference picture or reference block, and the reconstructed picture may be provided to an output unit.

FIG. 3 is a view showing a basic coding tree unit according to an embodiment of the present disclosure.

The largest coding block may be defined as a coding tree block. A single picture may be partitioned into a plurality of coding tree units (CTU). A CTU may be a coding unit of the largest size, and may be referred to as the largest coding unit (LCU). FIG. 3 is a view showing an example where a single picture is partitioned into a plurality of CTUs.

A size of a CTU may be defined in a picture level or sequence level. For the same, information representing a size of a CTU may be signaled through a picture parameter set or sequence parameter set.

In an example, a size of a CTU for the entire picture within a sequence may be set to 128×128. Alternatively, any one of 128×128 or 256×256 may be determined as a size of a CTU in a picture level. In an example, a CTU may be set to have a size of 128×128 in a first picture, and a size of 256×256 in a second picture.

Coding blocks may be generated by partitioning a CTU. A coding block represents a basic unit for performing encoding/decoding. In an example, prediction or transform may be performed for each coding block, or a prediction encoding mode may be determined for each coding block. In this connection, the prediction encoding mode represents a method of generating a prediction image. In an example, a prediction encoding mode may include intra-prediction, inter-prediction, current picture referencing (CPR), intra block copy (IBC) or combined prediction. For a coding block, a prediction block of the coding block may be generated by using a prediction encoding mode of at least one of intra-prediction, inter-prediction, current picture referencing, or combined prediction.

Information representing a prediction encoding mode for a current block may be signaled in a bitstream. In an example, the information may be a 1-bit flag representing whether a prediction encoding mode is an intra mode or an inter mode. When a prediction encoding mode for a current block is determined as an inter mode, current picture referencing or combined prediction may be available.

Current picture referencing is setting a current picture as a reference picture and obtaining a prediction block of a current block from a region that has been already encoded/decoded within a current picture. In this connection, the current picture means a picture including the current block. Information representing whether or not current picture referencing is applied to a current block may be signaled in a bitstream. In an example, the information may be a 1-bit flag. When the flag is TRUE, a prediction encoding mode for a current block may be determined as current picture referencing, and when the flag is FALSE, a prediction encoding mode for a current block may be determined as inter-prediction.

Alternatively, a prediction encoding mode for a current block may be determined on the basis of a reference picture index. In an example, when a reference picture index indicates a current picture, a prediction encoding mode for a current block may be determined as current picture referencing. When a reference picture index indicates a picture other than a current picture, a prediction encoding mode for a current block may be determined as inter-prediction. In other words, current picture referencing is a prediction method using information on a region that has been already encoded/decoded within a current picture, and inter-prediction is a prediction method using information on another picture that has been already encoded/decoded.

Combined prediction represents a combined encoding mode combining at least two of intra-prediction, inter-prediction, and current picture referencing. In an example, when combined prediction is applied, a first prediction block may be generated on the basis of any one of intra-prediction, inter-prediction or current picture referencing, and a second prediction block may be generated on the basis of another. When a first prediction block and a second prediction block are generated, a final prediction block may be generated by calculating an average or weighted sum of the first prediction block and the second prediction block. Information representing whether or not to apply combined prediction to a current block may be signaled in a bitstream. The information may be a 1-bit flag.

FIG. 4 is a view showing various partitioning types a coding block.

A coding block may be partitioned into a plurality of coding blocks on the basis of quad-tree partitioning, binary-tree partitioning or ternary tree partitioning. The partitioned coding block may be partitioned again into a plurality of coding blocks on the basis of quad-tree partitioning, binary-tree partitioning or ternary tree partitioning.

Quad-tree partitioning represents a method of partitioning a current block into four blocks. As a result of quad-tree partitioning, a current block may be partitioned into four square partitions (refer to "SPLIT_QT" of FIG. 4 (a)).

Binary-tree partitioning represents a method of partitioning a current block into two blocks. Partitioning a current block into two blocks along a vertical direction (that is, using a vertical line across the current block) may be referred to vertical directional binary-tree partitioning, and partitioning a current block into two blocks along a horizontal direction (that is, using a horizontal line across the current block) may be referred to as horizontal directional binary-tree partitioning. As a result of binary-tree partitioning, a current block may be partitioned into two non-square partitions. "SPLIT_BT_VER" of FIG. 4 (b) is a view showing a result of vertical directional binary-tree partitioning, and "SPLIT_BT_HOR" of FIG. 4 (c) is a view showing a result of horizontal directional binary-tree partitioning.

Ternary-tree partitioning represents a method of partitioning a current block into three blocks. Partitioning a current block into three blocks along a vertical direction (that is, using two vertical lines across the current block) may be referred to vertical directional ternary-tree partitioning, and partitioning a current block into three blocks along a horizontal direction (that is, using two horizontal lines across the current block) may be referred to as horizontal directional ternary-tree partitioning. As a result of ternary-tree partitioning, a current block may be partitioned into three non-square partitions. In this connection, a width/height of a partition positioned at the center of a current block may be twice than a width/height of other partitions. "SPLIT_TT_VER" of FIG. 4 (d) is a view showing a result of vertical directional ternary-tree partitioning, and "SPLIT_TT_HOR" of FIG. 4 (e) is a view showing a result of horizontal directional ternary-tree partitioning.

The number of partitioning times of a CTU may be defined as a partitioning depth. The maximum partitioning depth of a CTU may be determined in a sequence or picture level. Accordingly, the maximum partitioning depth of a CTU may vary on the basis of a sequence or picture.

Alternatively, the maximum partitioning depth may be independently determined for each partitioning method. In an example, the maximum partitioning depth where quad-tree partitioning is allowed may differ from the maximum partitioning depth where binary-tree partitioning and/or ternary-tree partitioning is allowed.

The encoder may signal information representing at least one of a partitioning type and a partitioning depth of a current block in a bitstream. The decoder may determine a partitioning type and a partitioning depth of a CTU on the basis of the information obtained by parsing a bitstream.

FIG. 5 is a view of an example showing an aspect of partitioning a CTU.

Partitioning a coding block by using quad-tree partitioning, binary-tree partitioning and/or ternary-tree partitioning may be referred to as multi-tree partitioning.

Coding blocks generated by partitioning a coding block by applying multi-tree partitioning may be referred to child coding blocks. When a partitioning depth of a coding block is k, a partitioning depth of child coding blocks is set to k+1.

To the contrary, for coding blocks having a partitioning depth of k+1, a coding block having a partitioning depth of k may be referred to as a parent coding block.

A partitioning type of a current coding block may be determined on the basis of at least one of a partitioning type of a parent coding block and a partitioning type of a neighboring coding block. In this connection, the neighboring coding block may be a block adjacent to a current coding block, and include at least one of an top neighboring block, a left neighboring block, or a neighboring block adjacent to the top-left corner of the current coding block. In this connection, the partitioning type may include whether or not to apply quad-tree partitioning, whether or not to apply binary-tree partitioning, a direction of binary-tree partitioning, whether or not to apply ternary-tree partitioning, or a direction of ternary-tree partitioning.

In order to determine a partitioning type of a coding block, information representing whether or not a coding block is partitioned may be signaled in a bitstream. The information is a 1-bit flag of "split_cu_flag", and when the flag is TRUE, it may represent that a coding block is partitioned by a multi tree partitioning method.

When split_cu_flag is TRUE, information representing whether or not a coding block is partitioned by quad-tree partitioning may be signaled in a bitstream. The information is a 1-bit flag of split_qt_flag, and when the flag is TRUE, a coding block may be partitioned into four blocks.

In an example, in an example shown in FIG. 5, a CTU is partitioned by quad-tree partitioning, and thus four coding blocks having a partitioning depth of 1 are generated. In addition, it is shown that quad-tree partitioning is applied again to the first coding block and the fourth coding block among four coding blocks generated by quad-tree partitioning. As a result, four coding blocks having a partitioning depth of 2 may be generated.

In addition, by applying again quad-tree partitioning to a coding block having a partitioning depth of 2, a coding block having a partitioning depth of 3 may be generated.

When quad-tree partitioning is not applied to a coding block, whether to perform binary-tree partitioning or ternary-tree partitioning for the coding block may be determined according to at least one of a size of the coding block, whether or not the coding block is positioned at a picture boundary, the maximum partitioning depth, or a partitioning type of a neighboring block. When it is determined to perform binary-tree partitioning or ternary-tree partitioning for the coding block, information representing a partitioning direction may be signaled in a bitstream. The information may be a 1-bit flag of mtt_split_cu_vertical_flag. Whether a partitioning direction is a vertical direction or a horizontal direction may be determined on the basis of the flag. Additionally, information representing which one of binary-tree partitioning or ternary-tree partitioning is applied to the coding block may be signaled in a bitstream. The information may be a 1-bit flag of mtt_split_cu_binary_flag. Whether binary-tree partitioning is applied to the coding block or ternary-tree partitioning is applied to the coding block may be determined on the basis of the flag.

In an example, in an example shown in FIG. 5, vertical directional binary-tree partitioning is applied to a coding block having a partitioning depth of 1, vertical directional ternary-tree partitioning is applied to a left coding block among coding blocks generated by the partitioning, and vertical directional binary-tree partitioning is applied to a right coding block.

Inter-prediction is a prediction encoding mode predicting a current block by using information on a previous picture. In an example, a block (hereinafter, collocated block) at the same position with a current block within a previous picture may be set as a prediction block of the current block. Hereinafter, a prediction block generated on the basis of a collocated block of the current block may be referred to as a collocated prediction block.

To the contrary, when an object present in a previous picture has moved to another position in a current picture, a current block may be effectively predicted by using motions of the object. For example, when a motion direction and a size of the object is determined by comparing a previous picture with a current picture, a prediction block (or prediction image) of the current block may be generated according to motion information of the objects. Hereinafter, a prediction block generated by using motion information may be referred to as a motion prediction block.

A residual block may be generated by subtracting a prediction block from a current block. In this connection, in case where an object moves, energy of a residual block may be reduced by using a motion prediction block rather than using a collocated prediction block, and thus compression performance of the residual block may be improved.

As above, generating a prediction block by using motion information may be referred to as motion estimation prediction. In the most inter-prediction, a prediction block may be generated on the basis of motion compensation prediction.

Motion information may include at least one of a motion vector, a reference picture index, a prediction direction, and a bidirectional weighting factor index. A motion vector represents a motion direction of an object and a magnitude. A reference picture index specifies a reference picture of a current block among reference pictures included in a reference picture list. A prediction direction indicates any one of uni-directional L0 prediction, uni-directional L1 prediction, or bi-directional prediction (L0 prediction and L1 prediction). At least one of L0 directional motion information and L1 directional motion information may be used according to a prediction direction of a current block. A bidirectional weighting factor index specifies a weighting factor applied to an L0 prediction block and a weighting factor applied to an L1 prediction block.

FIG. 6 is a flow diagram of an inter-prediction method according to the embodiment of the present disclosure.

In reference to FIG. 6, an inter-prediction method includes determining an inter-prediction mode for a current block (S601), obtaining motion information of the current block according to the determined inter-prediction mode (S602), and performing motion compensation prediction for a current block on the basis of the obtained motion information (S603).

In this connection, the inter-prediction mode may represent various methods for determining motion information of a current block, and include an inter-prediction mode using translation motion information, an inter-prediction mode using affine motion information. In an example, an inter-prediction mode using translation motion information may include a merge mode and a motion vector prediction mode, and an inter-prediction mode using affine motion information may include an affine merge mode and an affine motion vector prediction mode. Motion information on a current block may be determined on the basis of a neighboring block neighboring the current block or information obtained by parsing a bitstream.

Motion information of a current block may be derived from motion information of another block. In this connection, another block may be a block encoded/decoded by inter prediction previous to the current block. Setting motion information of a current block to be the same as motion information of another block may be defined as a merge mode. Also, setting a motion vector of another block as a prediction value of a motion vector of the current block may be defined as a motion vector prediction mode.

FIG. 7 is a flow diagram of a process deriving the motion information of a current block under a merge mode.

The merge candidate of a current block may be derived (S701). The merge candidate of a current block may be derived from a block encoded/decoded by inter-prediction prior to a current block.

FIG. 8 is a diagram illustrating candidate blocks used to derive a merge candidate.

The candidate blocks may include at least one of neighboring blocks including a sample adjacent to a current block or non-neighboring blocks including a sample non-adjacent to a current block. Hereinafter, samples determining candidate blocks are defined as base samples. In addition, a base sample adjacent to a current block is referred to as a neighboring base sample and a base sample non-adjacent to a current block is referred to as a non-neighboring base sample.

A neighboring base sample may be included in a neighboring column of a leftmost column of a current block or a neighboring row of an uppermost row of a current block. In an example, when the coordinate of a left-top sample of a current block is (0,0), at least one of a block including a base sample at a position of (−1, H−1), (W−1, −1), (W, −1), (−1, H) or (−1, 1) may be used as a candidate block. In reference to a diagram, the neighboring blocks of index 0 to 4 may be used as candidate blocks.

A non-neighboring base sample represents a sample that at least one of a x-axis distance or a y-axis distance with a base sample adjacent to a current block has a predefined value. In an example, at least one of a block including a base sample that a x-axis distance with a left base sample is a predefined value, a block including a non-neighboring sample that a y-axis distance with a top base sample is a predefined value or a block including a non-neighboring sample that a x-axis distance and a y-axis distance with a left-top base sample are a predefined value may be used as a candidate block. A predefined value may be a natural number such as 4, 8, 12, 16, etc. In reference to a diagram, at least one of blocks in an index 5 to 26 may be used as a candidate block.

Alternatively, a candidate block not belonging to the same coding tree unit as a current block may be set to be unavailable as a merge candidate. In an example, when a base sample is out of an upper boundary of a coding tree unit to which a current block belongs, a candidate block including the base sample may be set to be unavailable as a merge candidate.

A merge candidate may be derived from a temporal neighboring block included in a picture different from a current block. In an example, a merge candidate may be derived from a collocated block included in a collocated picture. Any one of reference pictures included in a reference picture list may be set as a collocated picture. Index information identifying a collocated picture among reference pictures may be signaled in a bitstream. Alternatively, a reference picture with a predefined index among reference pictures may be determined as a collocated picture.

The motion information of a merge candidate may be set the same as the motion information of a candidate block. In an example, at least one of a motion vector, a reference picture index, a prediction direction or a bidirectional weight index of a candidate block may be set as the motion information of a merge candidate.

A merge candidate list including a merge candidate may be generated S702.

The index of merge candidates in a merge candidate list may be assigned according to the predetermined order. In an example, an index may be assigned in the order of a merge candidate derived from a left neighboring block, a merge candidate derived from a top neighboring block, a merge candidate derived from a right-top neighboring block, a merge candidate derived from a left-bottom neighboring block, a merge candidate derived from a left-top neighboring block and a merge candidate derived from a temporal neighboring block.

When a plurality of merge candidates are included in a merge candidate, at least one of a plurality of merge candidates may be selected S703. Concretely, information for specifying any one of a plurality of merge candidates may be signaled in a bitstream. In an example, information, merge_idx, representing an index of any one of merge candidates included in a merge candidate list may be signaled in a bitstream.

A motion vector may be derived per sub-block.

FIG. 9 is a diagram to explain an example of determining a motion vector per sub-block.

Any motion vector among a plurality of merge candidates included in a merge candidate list may be set as an initial motion vector of a current block. In this connection, a merge candidate used to derive the initial motion vector may be determined by a syntax, merge_idx. Alternatively, when neighboring blocks adjacent to the current block are searched in the predetermined scanning order, the initial motion vector may be derived from an available merge candidate which was found first. In this connection, the predetermined scanning order may be the order of a neighboring block (A1) adjacent to the left of the current block, a neighboring block (B1) adjacent to the top of the current block, a neighboring block (B0) adjacent to the right-top corner of the current block and a neighboring block (A0) adjacent to the left-bottom corner of the current block. Alternatively, the predetermined scanning order may be defined in the order of B1, B0, A1 and A0 or may be determined in the order of B1, A1, B0 and A0.

If an initial motion vector is determined, a collocated picture of a current block may be determined. In this connection, the collocated picture may be set as a reference picture having a predefined index among reference pictures included in a reference picture list. For example, a predefined index may be 0 or the largest index. Alternatively, information for determining the collocated picture may be signaled in a bitstream. In an example, a syntax, collocated_ref_idx, specifying a collocated picture in a reference picture list may be signaled in a bitstream.

If a collocated picture is determined, a block apart from a collocated block with the same position and size as a current block in the collocated picture by an initial motion vector may be determined. The block specified by an initial motion vector may be referred to as a collocated picture corresponding block. In an example, when an initial motion vector (for FIG. 9, the motion vector of A1 block) is (x1, y1), a block far apart from a block at the same position as the current block in the collocated picture (i.e., the collocated block) by (x1, y1) may be determined as a collocated picture corresponding block.

If a collocated picture corresponding block is determined, motion vectors of sub-blocks in the collocated picture corresponding block may be set as motion vectors of sub-blocks in a current block. In an example, when a current block is partitioned into 4×4 sized sub-blocks, a motion vector for 4×4 sized sub-blocks in the collocated picture corresponding block may be set as a motion vector of each sub-block in the current block.

When a sub-block in collocated picture corresponding block has a bidirectional motion vector (e.g. L0 motion vector and L1 motion vector), the bidirectional motion vector of a sub-block in the collocated picture corresponding block may be taken as the bidirectional motion vector of a sub-block in a current block. Alternatively, based on whether a bidirectional prediction is applied to a current block, only L0 motion vector may be taken or only L1 motion vector may be taken from a sub-block in the collocated picture corresponding block.

Alternatively, when a reference picture of a current block is different from a reference picture of a collocated picture corresponding block, the motion vector of a sub-block in the collocated picture corresponding block may be scaled to derive the motion vector of a sub-block in the current block.

The reference picture of the current block and whether a bidirectional prediction is applied to the current block may be set the same as a merge candidate used to derive an initial motion vector. Alternatively, information for specifying the reference picture of the current block and/or information indicating whether a bidirectional prediction is applied to a current block may be signaled in a bitstream.

Information indicating whether a motion vector will be derived per sub-block may be signaled in a bitstream. The information may be a 1-bit flag, but it is not limited thereto. Alternatively, based on whether a bidirectional prediction is applied to a current block or at least one of the number of available merge candidates, whether a motion vector will be derived per sub-block may be determined.

When the number of merge candidates included in a merge candidate list is less than the threshold, a motion information candidate included in a motion information table may be added to a merge candidate list as a merge candidate. In this connection, the threshold may be the maximum number of merge candidates which may be included in a merge candidate list or a value in which an offset is subtracted from the maximum number of merge candidates. An offset may be a natural number such as 1 or 2, etc.

A motion information table includes a motion information candidate derived from a block encoded/decoded based on inter-prediction in a current picture. In an example, the motion information of a motion information candidate included in a motion information table may be set the same as the motion information of a block encoded/decoded based on inter-prediction. In this connection, motion information may include at least one of a motion vector, a reference picture index, a prediction direction or a bidirectional weight index.

A motion information candidate included in a motion information table also can be referred to as a inter region merge candidate or a prediction region merge candidate.

The maximum number of a motion information candidate which may be included in a motion information table may be predefined in an encoder and a decoder. In an example, the maximum number of a motion information candidate which may be included in a motion information table may be 1, 2, 3, 4, 5, 6, 7, 8 or more (e.g. 16).

Alternatively, information representing the maximum number of a motion information candidate which may be included in a motion information table may be signaled in a bitstream. The information may be signaled in a sequence, a picture or a slice level. The information may represent the maximum number of a motion information candidate which may be included in a motion information table. Alternatively, the information may represent difference between the maximum number of a motion information candidate which may be included in a motion information table and the maximum number of a merge candidate which may be included in a merge candidate list.

Alternatively, the maximum number of a motion information candidate which may be included in a motion information table may be determined according to a picture size, a slice size or a coding tree unit size.

A motion information table may be initialized in a unit of a picture, a slice, a tile, a brick, a coding tree unit or a coding tree unit line (a row or a column). In an example, when a slice is initialized, a motion information table is also initialized thus a motion information table may not include any motion information candidate.

Alternatively, information representing whether a motion information table will be initialized may be signaled in a bitstream. The information may be signaled in a slice, a tile, a brick or a block level. Until the information indicates the initialization of a motion information table, a pre-configured motion information table may be used.

Alternatively, information on an initial motion information candidate may be signaled in a picture parameter set or a slice header. Although a slice is initialized, a motion information table may include an initial motion information candidate. Accordingly, an initial motion information candidate may be used for a block which is the first encoding/decoding target in a slice.

Alternatively, a motion information candidate included in the motion information table of a previous coding tree unit may be set as an initial motion information candidate. In an example, a motion information candidate with the smallest index or with the largest index among motion information candidates included in the motion information table of a previous coding tree unit may be set as an initial motion information candidate.

Blocks are encoded/decoded in the order of encoding/decoding, and blocks encoded/decoded based on inter-prediction may be sequentially set as a motion information candidate in the order of encoding/decoding.

FIG. 10 is a diagram to explain the update aspect of a motion information table.

For a current block, when inter-prediction is performed S1001, a motion information candidate may be derived based on a current block S1002. The motion information of a motion information candidate may be set the same as that of a current block.

When a motion information table is empty S1003, a motion information candidate derived based on a current block may be added to a motion information table S1004.

When a motion information table already includes a motion information candidate S1003, a redundancy check for the motion information of a current block (or, a motion information candidate derived based on it) may be performed S1005. A redundancy check is to determine whether the motion information of a pre-stored motion information candidate in a motion information table is the same as the motion information of a current block. A redundancy check may be performed for all pre-stored motion information candidates in a motion information table.

Alternatively, a redundancy check may be performed for motion information candidates with an index over or below the threshold among pre-stored motion information candidates in a motion information table. Alternatively, a redundancy check may be performed for the predefined number of motion information candidates. In an example, 2 motion information candidates with smallest indexes or with largest indexes may be determined as targets for a redundancy check.

When a motion information candidate with the same motion information as a current block is not included, a motion information candidate derived based on a current block may be added to a motion information table S1008. Whether motion information candidates are identical may be determined based on whether the motion information (e.g. a motion vector/a reference picture index, etc.) of motion information candidates is identical.

In this connection, when the maximum number of motion information candidates are already stored in a motion information table S1006, the oldest motion information candidate may be deleted S1007 and a motion information candidate derived based on a current block may be added to a motion information table S1008. In this connection, the oldest motion information candidate may be a motion information candidate with the largest or the smallest index.

Motion information candidates may be identified by respective index. When a motion information candidate derived from a current block is added to a motion information table, the smallest index (e.g. 0) may be assigned to the motion information candidate and indexes of pre-stored motion information candidates may be increased by 1. In this connection, When the maximum number of motion information candidates are already stored in a motion information table, a motion information candidate with the largest index is removed.

Alternatively, when a motion information candidate derived from a current block is added to a motion information table, the largest index may be assigned to the motion information candidate. In an example, when the number of pre-stored motion information candidates in a motion information table is less than the maximum value, an index with the same value as the number of pre-stored motion information candidates may be assigned to the motion information candidate. Alternatively, when the number of pre-stored motion information candidates in a motion information table is equal to the maximum value, an index subtracting 1 from the maximum value may be assigned to the motion information candidate. Alternatively, a motion information candidate with the smallest index is removed and the indexes of residual pre-stored motion information candidates are decreased by 1.

FIG. 11 is a diagram showing the update aspect of a motion information table.

It is assumed that as a motion information candidate derived from a current block is added to a motion information table, the largest index is assigned to the motion information candidate. In addition, it is assumed that the maximum number of a motion information candidate is already stored in a motion information table.

When a motion information candidate HmvpCand[n+1] derived from a current block is added to a motion information table HmvpCandList, a motion information candidate HmvpCand[0] with the smallest index among pre-stored motion information candidates may be deleted and indexes of residual motion information candidates may be decreased by 1. In addition, the index of a motion information candidate HmvpCand[n+1] derived from a current block may be set to the maximum value (for an example shown in FIG. 11, n).

When a motion information candidate identical to a motion information candidate derived based on a current block is prestored S1005, a motion information candidate derived based on a current block may not be added to a motion information table S1009.

Alternatively, while a motion information candidate derived based on a current block is added to a motion information table, a pre-stored motion information candidate identical to the motion information candidate may be removed. In this case, it causes the same effect as when the index of a pre-stored motion information candidate is newly updated.

FIG. 12 is a diagram showing an example in which the index of a pre-stored motion information candidate is updated.

When the index of a pre-stored motion information candidate identical to a motion information candidate mvCand derived from a current block is hIdx, the pre-stored motion information candidate may be removed and the index of motion information candidates with an index larger than hIdx may be decreased by 1. In an example, an example shown in FIG. 12 showed that HmvpCand[2] identical to mvCand is deleted in a motion information table HvmpCandList and an index from HmvpCand[3] to HmvpCand[n] is decreased by 1.

And, a motion information candidate mvCand derived based on a current block may be added to the end of a motion information table.

Alternatively, an index assigned to a pre-stored motion information candidate identical to a motion information candidate derived based on a current block may be updated. For example, the index of a pre-stored motion information candidate may be changed to the minimum value or the maximum value.

The motion information of blocks included in a predetermined region may be set not to be added to a motion information table. In an example, a motion information candidate derived based on the motion information of a block included in a merge processing region may not be added to a motion information table. Since the encoding/decoding order for blocks included in a merge processing region is not defined, it is improper to use motion information of any one of them for the inter-prediction of another of them. Accordingly, motion information candidates derived based on blocks included in a merge processing region may not be added to a motion information table.

Alternatively, the motion information of a block smaller than a preset size may be set not to be added to a motion information table. In an example, a motion information candidate derived based on the motion information of a coding block whose width or height is smaller than 4 or 8 or the motion information of a 4×4 sized coding block may not be added to a motion information table.

When motion compensation prediction is performed per sub-block basis, a motion information candidate may be derived based on the motion information of a representative sub-block among a plurality of sub-blocks included in a current block. In an example, when a sub-block merge candidate is used for a current block, a motion information candidate may be derived based on the motion information of a representative sub-block among sub-blocks.

The motion vector of sub-blocks may be derived in the following order. First, any one of merge candidates included in the mere candidate list of a current block may be selected and an initial shift vector (shVector) may be derived based on the motion vector of a selected merge candidate. And, a shift sub-block that a base sample is at a position of (xColSb, yColSb) may be derived by adding an initial shift vector to the position (xSb, ySb) of the base sample of each sub-block in a coding block (e.g. a left-top sample or a center sample). The below Equation 1 shows a formula for deriving a shift sub-block.

(xColSb,yColSb)=(xSb+shVector[0]>>4,ySb+shVec-
tor[1]>>4)  [Equation 1]

Then, the motion vector of a collocated block corresponding to the center position of a sub-block including (xColSb, yColSb) may be set as the motion vector of a sub-block including (xSb, ySb).

A representative sub-block may mean a sub-block including the left-top sample or center sample of a current block.

FIG. 13 is a diagram showing the position of a representative sub-block.

FIG. 13 (a) shows an example in which a sub-block positioned at the left-top of a current block is set as a representative sub-block and FIG. 12 (b) shows an example in which a sub-block positioned at the center of a current block is set as a representative sub-block. When motion compensation prediction is performed in a basis of a sub-block, the motion information candidate of a current block may be derived based on the motion vector of a sub-block including the left-top sample of a current block or including the central sample of a current block.

Based on the inter-prediction mode of a current block, it may be determined whether a current block will be used as a motion information candidate. In an example, a block encoded/decoded based on an affine motion model may be set to be unavailable as a motion information candidate. Accordingly, although a current block is encoded/decoded by inter-prediction, a motion information table may not be updated based on a current block when the inter-prediction mode of a current block is an affine prediction mode.

Alternatively, a motion information candidate may be derived based on at least one sub-block vector of a sub-block included in a block encoded/decoded based on an affine motion model. In an example, a motion information candidate may be derived by using a sub-block positioned at the left-top, the center or the right-top of a current block. Alternatively, the average value of the sub-block vectors of a plurality of sub-blocks may be set as the motion vector of a motion information candidate.

Alternatively, a motion information candidate may be derived based on the average value of the affine seed vectors of a block encoded/decoded based on an affine motion model. In an example, at least one average of the first affine seed vector, the second affine seed vector or the third affine seed vector of a current block may be set as the motion vector of a motion information candidate.

Alternatively, a motion information table may be configured per inter-prediction mode. In an example, at least one of a motion information table for a block encoded/decoded by an intra block copy, a motion information table for a block encoded/decoded based on a translation motion model or a motion information table for a block encoded/decoded based on an affine motion model may be defined. According to the inter-prediction mode of a current block, any one of a plurality of motion information tables may be selected.

FIG. 14 shows an example in which a motion information table is generated per inter-prediction mode.

When a block is encoded/decoded based on a non-affine motion model, a motion information candidate mvCand derived based on the above block may be added to a non-affine motion information table HmvpCandList.

A motion information candidate may be set to include additional information except for motion information. In an example, at least one of the size, shape or partition information of a block may be additionally stored in a motion information candidate. When the merge candidate list of a current block is configured, only motion information candidate whose size, shape or partition information is identical or similar to a current block among motion information candidates may be used or a motion information candidate whose size, shape or partition information is identical or similar to a current block may be added to a merge candidate list in advance.

When the number of a merge candidate included in the merge candidate list of a current block is less than the threshold, a motion information candidate included in a motion information table may be added to a merge candidate list as a merge candidate. The additional process is performed in the order reflecting sorted order of indexes of motion information candidates in ascending or descending order. In an example, a motion information candidate with the largest index may be first added to the merge candidate list of a current block.

When a motion information candidate included in a motion information table is added to a merge candidate list, a redundancy check between a motion information candidate and pre-stored merge candidates in the merge candidate list may be performed. As a result of a redundancy check, a motion information candidate with the same motion information as a pre-stored merge candidate may not be added to the merge candidate list.

A redundancy check may be performed only for a part of motion information candidates included in a motion information table. In an example, a redundancy check may be performed only for a motion information candidate with an index over or below the threshold. Alternatively, a redundancy check may be performed only for N motion information candidates with the largest index or the smallest index.

Alternatively, a redundancy check may be performed only for a part of pre-stored merge candidates in a merge candidate list. In an example, a redundancy check may be performed only for a merge candidate whose index is over or below the threshold or a merge candidate derived from a block at a specific position. In this connection, a specific position may include at least one of the left neighboring block, the top neighboring block, the right-top neighboring block or the left-bottom neighboring block of a current block.

FIG. 15 is a diagram showing an example in which a redundancy check is performed only for a part of merge candidates.

When a motion information candidate HmvpCand[j] is added to a merge candidate list, a redundancy check with 2 merge candidates with the largest index, mergeCandList[NumMerge-2] and mergeCandList[NumMerge-1], may be performed for a motion information candidate. In this connection, NumMerge may show the number of an available spatial merge candidate and a temporal merge candidate.

Unlike a shown example, when a motion information candidate HmvpCand[j] is added to a merge candidate list, a redundancy check with 2 merge candidates with the smallest index may be performed for a motion information candidate. For example, it may be checked whether mergeCandList[0] and mergeCandList[1] are identical to HmvpCand[j].

Alternatively, a redundancy check may be performed only for a merge candidate derived from a specific position. In an example, a redundancy check may be performed for at least one of a merge candidate derived from a neighboring block positioned at the left of a current block or at the top of a current block. When there is no merge candidate derived from a specific position in a merge candidate list, a motion information candidate may be added to a merge candidate list without a redundancy check.

When a motion information candidate HmvpCand[j] is added to a merge candidate list, a redundancy check with 2 merge candidates with the largest index, mergeCandList[NumMerge-2] and mergeCandList[NumMerge-1], may be performed for a motion information candidate. In this connection, NumMerge may show the number of an available spatial merge candidate and a temporal merge candidate.

A redundancy check with a merge candidate may be performed only for a part of motion information candidates. In an example, a redundancy check may be performed only for N motion information candidates with a large or a small index among motion information candidates included in a motion information table. In an example, a redundancy check may be performed only for motion information candidates with an index that the number and difference of motion information candidates included in a motion information table are below the threshold. When the threshold is 2, a redundancy check may be performed only for 3 motion information candidates with the largest index value among motion information candidates included in a motion information table. A redundancy check may be omitted for motion information candidates except for the above 3 motion information candidates. When a redundancy check is omitted, a motion information candidate may be added to a merge candidate list regardless of whether the same motion information as a merge candidate is exist or not.

Conversely, a redundancy check is set to be performed only for motion information candidates with an index that the number and difference of motion information candidates included in a motion information table are over the threshold.

The number of a motion information candidate that a redundancy check is performed may be redefined in an encoder and a decoder. In an example, the threshold may be an integer such as 0, 1 or 2.

Alternatively, the threshold may be determined based on at least one of the number of a merge candidate included in a merge candidate list or the number of motion information candidates included in a motion information table.

When a merge candidate identical to the first motion information candidate is found, a redundancy check with the merge candidate identical to the first motion information candidate may be omitted in a redundancy check for the second motion information candidate.

FIG. 16 is a diagram showing an example in which a redundancy check with a specific merge candidate is omitted.

When a motion information candidate HmvpCand[i] whose index is i is added to a merge candidate list, a redundancy check between the motion information candidate and pre-stored merge candidates in a merge candidate list is performed. In this connection, when a merge candidate mergeCandlist[j] identical to a motion information candidate HmvpCand[i] is found, a redundancy check between a motion information candidate HmvpCand[i-1] whose index is i-1 and merge candidates may be performed without adding the motion information candidate HmvpCand[i] to a merge candidate list. In this connection, a redundancy check between the motion information candidate HmvpCand[i-1] and the merge candidate mergeCandList[j] may be omitted.

In an example, in an example shown in FIG. 16, it was determined that HmvpCand[i] and mergeCandList[2] are identical. Accordingly, a redundancy check for HmvpCand[i-1] may be performed without adding HmvpCand[i] to a merge candidate list. In this connection, a redundancy check between HmvpCand[i-1] and mergeCandList[2] may be omitted.

When the number of a merge candidate included in the merge candidate list of a current block is less than the threshold, at least one of a pairwise merge candidate or a zero merge candidate may be additionally included except for a motion information candidate. A pairwise merge candidate means a merge candidate having a value obtained from averaging the motion vectors of more than 2 merge candidates as a motion vector and a zero merge candidate means a merge candidate whose motion vector is 0.

For the merge candidate list of a current block, a merge candidate may be added in the following order.

Spatial merge candidate—Temporal merge candidate—Motion information candidate—(Affine motion information candidate)—Pairwise merge candidate—Zero merge candidate A spatial merge candidate means a merge candidate derived from at least one of a neighboring block or a non-neighboring block and a temporal merge candidate means a merge candidate derived from a previous reference picture. An affine motion information candidate represents a motion information candidate derived from a block encoded/decoded by an affine motion model.

Intra-prediction predicts a current block by using a reconstructed sample that has been already encoded/decoded and which is around the current block. In this connection, a reconstructed sample before applying an in-loop filter may be used for intra-prediction of the current block.

An intra-prediction method includes intra-prediction based on a matrix and intra-prediction according to a direction with a neighboring reconstruction sample. Information indicating an intra-prediction method of a current block may be signaled in a bitstream. The information may be a 1-bit flag. Alternatively, an intra-prediction of a current block may be determined on the basis of at least one of a position of the current block, a size of the current block, a shape of the current block, or an intra-prediction method of a neighboring block. In an example, when a current block is present crossing a picture boundary, it may be set such that an intra-prediction method based on a matrix is not applied to the current block.

An intra-prediction method based on a matrix is a method of obtaining a prediction block of a current block on the basis of a matrix product of a matrix stored in the encoder and the decoder, and reconstruction samples around the current block. Information for specifying any one of a plurality of prestored matrices may be signaled in a bitstream. The decoder may determine a matrix for performing intra-prediction on a current block on the basis of the above information and a size of the current block.

General intra-prediction is a method of obtaining a prediction block of a current block on the basis of a non-directional intra-prediction mode or directional intra-prediction mode. Hereinafter, with reference to figures, a process of intra-prediction based on general intra-prediction will be described in detail.

FIG. 17 is a flow diagram of an intra-prediction method according to an embodiment of the present disclosure.

A reference sample line of a current block may be determined 51701. The reference sample line means a group of reference samples included in a k-th line apart from a top and/or a left of the current block. A reference sample may be derived from a reconstructed sample encoded/decoded around the current block.

Index information identifying a reference sample line for a current block among a plurality of reference sample lines may be signaled in a bitstream. In an example, index information, intra_luma_ref_idx, for specifying the reference sample line of the current block may be signaled in the bitstream. The index information may be signaled per coding block.

A plurality of reference sample lines may include at least one of a first line, a second line or a third line at a top and/or left of a current block. A reference sample line composed of a row adjacent to the top of the current block and a column adjacent to the left of the current block among a plurality of reference sample lines may be referred to as an adjacent reference sample line, and other reference sample lines may be referred to as a non-adjacent reference sample line.

Table 1 shows an index assigned to each candidate reference sample line.

TABLE 1

| Index (intra_luma_ref_idx) | Reference sample line |
|---|---|
| 0 | Adjacent reference sample line |
| 1 | First non-adjacent reference sample line |
| 2 | Second non-adjacent reference sample line |

Based on at least one of a position, a size, a shape of a current block or a prediction encoding mode of a neighboring block, a reference sample line of the current block may be determined. In one example, when the current block adjoins a boundary of a picture, a tile, a slice or a coding tree unit, an adjacent reference sample line may be determined as the reference sample line of the current block.

A reference sample line may include top reference samples positioned at a top of the current block and left reference samples positioned at a left of the current block. The top reference samples and left reference samples may be derived from reconstructed samples around the current block. The reconstructed samples may be in a state before an in-loop filter is applied.

Next, an intra-prediction mode of a current block may be determined S1702. For the intra-prediction mode of the current block, at least one of a non-directional intra-prediction mode or a directional intra-prediction mode may be determined as the intra-prediction mode of the current block. Non-directional intra-prediction modes includes a planar and a DC and directional intra-prediction modes includes 33 or 65 modes from a left-bottom diagonal direction to a right-top diagonal direction.

FIG. 18 is a diagram showing intra-prediction modes.

FIG. 18 (a) shows 35 intra-prediction modes and FIG. 18 (b) shows 67 intra-prediction modes.

The larger or smaller number of intra-prediction modes than shown in FIG. 18 may be defined.

Based on an intra-prediction mode of a neighboring block adjacent to a current block, an MPM (Most Probable Mode) may be set. In this connection, a neighboring block may include a left neighboring block adjacent to a left of the current block and a top neighboring block adjacent to a top of the current block.

The number of MPMs included in an MPM list may be preset in an encoder and a decoder. In an example, the number of MPMs may be 3, 4, 5 or 6. Alternatively, information representing the number of MPMs may be signaled in a bitstream. Alternatively, based on at least one of a prediction encoding mode of a neighboring block, a size, a shape or a reference sample line index of a current block, the number of MPMs may be determined. In an example, while N MPMs may be used when an adjacent reference sample line is determined as the reference sample line of the current block, M MPMs may be used when a non-adjacent reference sample line is determined as the reference sample line of the current block. As M is a natural number smaller than N, in an example, N may be 6 and M may be 5, 4 or 3. Accordingly, while the intra-prediction mode of the current block may be determined as any one of 6 candidate intra-prediction modes when the index of the reference sample line of the current block is 0 and an MPM flag is true, the intra-prediction mode of the current block may be determined as any one of 5 candidate intra-prediction modes when the index of the reference sample line of the current block is larger than 0 and an MPM flag is true.

Alternatively, the fixed number (e.g. 6 or 5) of MPM candidates may be used regardless of the index of the reference sample line of the current block.

An MPM list including a plurality of MPMs may be generated and information indicating whether the same MPM as an intra-prediction mode of a current block is included in the MPM list may be signaled in a bitstream. As the information is a 1-bit flag, it may be referred to as an MPM flag. When the MPM flag represents the same MPM as the current block is included in the MPM list, index information identifying one of MPMs may be signaled in a bitstream. In an example, index information, mpm_idx, specifying any one of plural MPMs may be signaled in a bitstream. An MPM specified by the index information may be set as the intra-prediction mode of the current block. When the MPM flag represents the same MPM as the current block is not included in the MPM list, remaining mode information indicating any one of remaining intra-prediction modes except for MPMs may be signaled in a bitstream. Remaining mode information represents an index value corresponding to the intra-prediction mode of the current block when an index is reassigned to remaining intra-prediction modes except for MPMs. A decoder may determine the intra-prediction mode of the current block by arranging MPMs in the ascending order and comparing remaining mode information with MPMs. In an example, when remaining mode information is equal to or smaller than MPM, the intra-prediction mode of the current block may be derived by adding 1 to remaining mode information.

In deriving an intra-prediction mode of a current block, comparing a part of MPMs with remaining mode information may be omitted. In an example, MPMs in a non-directional intra-prediction mode among MPMs may be excluded from a comparison target. When non-directional intra-prediction modes are set as MPMs, remaining mode information clearly indicates a directional intra-prediction mode, so the intra-prediction mode of the current block may be derived by comparing remaining MPMs except for non-directional intra-prediction modes with remaining mode information. Instead of excluding non-directional intra-prediction modes from a comparison target, a result value may be compared with remaining MPMs after adding the number of non-directional intra-prediction modes to remaining mode information.

Instead of setting a default mode as an MPM, information indicating whether an intra-prediction mode of a current block is the default mode may be signaled in a bitstream. The information is a 1-bit flag and the flag may be referred to as a default mode flag. The default mode flag may be signaled only when an MPM flag represents that the same MPM as the current block is included in an MPM list. As described above, the default mode may include at least one of a planar, DC, a vertical direction mode or a horizontal direction mode. In an example, when the planar is set as the default mode, the default mode flag may indicate whether the intra-prediction mode of the current block is the planar. When the default mode flag indicates that the intra-prediction mode of the current block is not the default mode, one of MPMs indicated by index information may be set as the intra-prediction mode of the current block.

When a default mode flag is used, it may be set that an intra-prediction mode same with a default mode is not set as an MPM. In an example, when the default mode flag indicates that whether the intra-prediction mode of the current block is a planar, the intra-prediction mode of the current block may be derived by using 5 MPMs excluding an MPM corresponding to the planar.

When a plurality of intra-prediction modes are set as default modes, index information indicating any one of default modes may be further signaled. The intra-prediction mode of the current block may be set as a default mode indicated by the index information.

When an index of a reference sample line of a current block is not 0, it may be set not to use a default mode. In an example, when a non-adjacent reference sample line is determined as the reference sample line of the current block, it may be set not to use a non-directional intra-prediction mode such as a DC mode or a planar mode. Accordingly, when an index of a reference sample line is not 0, a default mode flag may not be signaled and a value of the default mode flag may be inferred to a predefined value (i.e. false).

When an intra-prediction mode of a current block is determined, prediction samples for the current block may be obtained based on a determined intra-prediction mode S1703.

When the DC mode is selected, prediction samples for the current block may be generated based on an average value of the reference samples. In detail, values of all of samples within the prediction block may be generated based on an average value of the reference samples. An average value may be derived using at least one of top reference samples adjacent to the top of the current block, and left reference samples adjacent to the left of the current block.

The number or a range of the reference samples used when deriving an average value may vary based on the shape of the current block. In an example, when a current block is a non-square block where a width is greater than a height, an average value may be calculated by using top reference samples. To the contrary, when a current block is a non-square block where a width is smaller than a height, an average value may be calculated by using left reference samples. In other words, when a width and a height of the current block are different, reference samples adjacent to the greater length may be used so as to calculate an average value. Alternatively, whether to calculate an average value by using top reference samples or by using left reference samples may be determined on the basis of a ratio between a width and a height of the current block.

When a planar mode is selected, a prediction sample may be obtained by using a horizontal directional prediction sample and a vertical directional prediction sample. In this connection, the horizontal directional prediction sample may be obtained on the basis of a left reference sample and a right reference sample which are positioned at the same horizontal line with the prediction sample, and the vertical directional prediction sample may be obtained on the basis of an top reference sample and a bottom reference sample which are positioned at the same vertical line with the prediction sample. In this connection, the right reference sample may be generated by copying a reference sample adjacent to the top-right corner of the current block, and the bottom reference sample may be generated by copying a reference sample adjacent to the lower-left corner of the current block. The horizontal directional prediction sample may be obtained on the basis of a weighted sum of the left reference sample and the right reference sample, and the vertical directional prediction sample may be obtained on the basis of a weighted sum of the top reference sample and the bottom reference sample. In this connection, a weighting factor assigned to each reference sample may be determined according to a position of the prediction sample. The prediction sample may be obtained on the basis of an average or a weighted sum of the horizontal directional prediction sample and the vertical directional prediction sample. When a weighted sum is used, a weighting factor assigned to the horizontal directional prediction sample and the vertical directional prediction sample may be determined on the basis of a position of the prediction sample.

When a directional prediction mode is selected, a parameter representing a prediction direction (or prediction angle) of the selected directional prediction mode may be determined. Table 2 below represents an intra directional parameter of intraPredAng for each intra-prediction mode.

TABLE 2

| PredModeIntra | 1   | 2   | 3   | 4   | 5   | 6   | 7   |
|---------------|-----|-----|-----|-----|-----|-----|-----|
| IntraPredAng  | —   | 32  | 26  | 21  | 17  | 13  | 9   |
| PredModeIntra | 8   | 9   | 10  | 11  | 12  | 13  | 14  |
| IntraPredAng  | 5   | 2   | 0   | −2  | −5  | −9  | −13 |
| PredModeIntra | 15  | 16  | 17  | 18  | 19  | 20  | 21  |
| IntraPredAng  | −17 | −21 | −26 | −32 | −26 | −21 | −17 |
| PredModeIntra | 22  | 23  | 24  | 25  | 26  | 27  | 28  |
| IntraPredAng  | −13 | −9  | −5  | −2  | 0   | 2   | 5   |
| PredModeIntra | 29  | 30  | 31  | 32  | 33  | 34  |     |
| IntraPredAng  | 9   | 13  | 17  | 21  | 26  | 32  |     |

Table 2 represents an intra directional parameter of each intra-prediction mode where an index thereof is one of 2 to 34 when 35 intra-prediction modes are defined. When directional intra-prediction modes are defined more than 33, an intra directional parameter of each intra-prediction mode may be set by subdividing Table 2.

Top reference samples and left reference samples for the current block are arranged in a line, and then a prediction sample may be obtained on the basis of a value of an intra directional parameter. In this connection, when a value of the intra directional parameter is a negative value, left reference samples and top reference samples may be arranged in a line.

FIGS. 19 and 20 are views respectively showing examples of one-dimensional arrangement where reference samples are arranged in a line.

FIG. 19 is a view showing vertical directional one-dimensional arrangement where reference samples are arranged in a vertical direction, and FIG. 20 is a view showing horizontal directional one-dimensional arrangement where reference samples are arranged in a horizontal direction. Examples of FIGS. 19 and 20 will be described in assumption that 35 intra-prediction modes are defined.

When an intra-prediction mode index is any one of 11 to 18, horizontal directional one-dimensional arrangement may be applied where top reference samples are rotated in counterclockwise, and when an intra-prediction mode index is any one of 19 to 25, vertical directional one-dimensional arrangement may be applied where left reference samples are rotated in clockwise. When arranging reference samples in a line, an intra-prediction mode angle may be considered.

A reference sample determining parameter may be determined on the basis of an intra directional parameter. The reference sample determining parameter may include a reference sample index for specifying a sample, and a weighting factor parameter for determining a weighting factor applied to the reference sample.

A reference sample index, iIdx, and a weighting factor parameter, ifact, may be respectively obtained through Equations 2 and 3 below.

$$iIdx=(y+1)*P_{ang}/32 \quad \text{[Equation 2]}$$

$$i_{fact}=[(y+1)*P_{ang}]\&31 \quad \text{[Equation 3]}$$

In Equations 2 and 3, $P_{ang}$ represents an intra directional parameter. A reference sample specified by a reference sample index of iIdx corresponds to an integer pel.

In order to derive a prediction sample, at least one reference sample may be specified. In detail, according to a slope of a prediction mode, a position of a reference sample used for deriving a prediction sample may be specified. In an example, a reference sample used for deriving a prediction sample may be specified by using a reference sample index of iIdx.

In this connection, when a slope of an intra-prediction mode is not represented by one reference sample, a prediction sample may be generated by performing interpolation on a plurality of reference samples. In an example, when a slope of an intra-prediction mode is a value between a slope between a prediction sample and a first reference sample, and a slope between the prediction sample and a second reference sample, the prediction sample may be obtained by performing interpolation on the first reference sample and the second reference sample. In other words, when an angular line according to an intra-prediction angle does not pass a reference sample positioned at an integer pel, a prediction sample may be obtained by performing interpolation on reference samples positioned adjacent to the left and the right, or the top and the bottom of the position where the angular line passes.

Equation 4 below represents an example of obtaining a prediction sample on the basis of reference samples.

$$P(x,y)=((32-i_{fact})/32)*Ref\_1D(x+iIdx+1)+(i_{fact}/32)* Ref\_1D(x+iIdx+2) \quad \text{[Equation 4]}$$

In Equation 4, P represents a prediction sample, and Ref_1D represents any one of reference samples that are arranged in a line. In this connection, a position of the reference sample may be determined by a position (x, y) of the prediction sample and a reference sample index of iIdx.

When a slope of an intra-prediction mode is possibly represented by one reference sample, a weighting factor parameter of ifact is set to 0. Accordingly, Equation 4 may be simplified as Equation 5 below.

$$P(x,y)=Ref\_1D(x+iIdx+1) \quad \text{[Equation 5]}$$

Intra-prediction for a current block may be performed on the basis of a plurality of intra-prediction modes. In an example, an intra-prediction mode may be derived for each prediction sample, and a prediction sample may be derived on the basis of an intra-prediction mode assigned to each prediction sample.

Alternatively, an intra-prediction mode may be derived for each region, intra-prediction for each region may be performed on the basis of an intra-prediction mode assigned to each region. In this connection, the region may include at least one sample. At least one of a size and a shape of the region may be adaptively determined on the basis of at least one of a size of the current block, a shape of the current block, and an intra-prediction mode for the current block. Alternatively, at least one of a size and a shape of the region may be predefined in the encoder and the decoder independent to a size or shape of the current block.

FIG. 21 is a view showing a degree formed between directional intra-prediction modes and a straight line parallel to an x axis.

As an example shown in FIG. 21, directional prediction modes may be present between the lower-left diagonal direction and the top-right diagonal direction. Describing a degree formed between the x axis and a directional prediction mode, directional prediction modes may be present from 45 degrees (bottom-left diagonal direction) to −135 degrees (top-right diagonal direction).

When a current block is a non-square, a case may be present where a prediction sample is derived by using, among reference samples positioned at the angular line according to an intra-prediction angle, a reference sample that is positioned farther than a reference sample close to a prediction sample according to an intra-prediction mode for the current block.

FIG. 22 is a view shown an aspect of obtaining a prediction sample when a current block is a non-square.

In an example, as an example shown in FIG. 22 (a), it is assumed that a current block is a non-square where a width is greater than a height, and an intra-prediction mode for the current block is a directional intra-prediction mode having an angle from 0 degree to 45 degrees. In the above case, when deriving a prediction sample A around a right column of the current block, among reference samples positioned at the angular mode according to the above degree, rather than using a top reference sample T close to the prediction sample, a case may be present where a left reference sample L far away from the prediction sample is used.

In another example, as an example shown in FIG. 22 (b), it is assumed that a current block is a non-square where a height is greater than a width, and an intra-prediction mode for the current block is a directional intra-prediction mode from −90 degrees to −135 degrees. In the above case, when deriving a prediction sample A around a bottom row of the current block, among reference samples positioned at the angular mode according to the above degree, rather than using a left reference sample L close to the prediction sample, a case may be present where a top reference sample T far away from the prediction sample is used.

To solve the above problem, when a current block is a non-square, an intra-prediction mode for the current block may be substituted with an intra-prediction mode in opposite direction. Accordingly, for a non-square block, directional prediction modes having angles greater or smaller than those of directional prediction modes shown in FIG. 18 may be used. The above directional intra-prediction mode may be defined as a wide angle intra-prediction mode. A wide angle intra-prediction mode represents a directional intra-prediction mode that does not belong to a range of 45 degrees to −135 degrees.

FIG. 23 is a view showing wide angle intra-prediction modes.

In an example show in FIG. 23, intra-prediction modes having indices from −1 to −14 and intra-prediction modes having indices from 67 to 80 represent wide angle intra-prediction modes.

In FIG. 23, 14 wide angle intra-prediction modes (from −1 to −14) which are greater in angle than 45 degrees and 4 wide angle intra-prediction modes (from 67 to 80) which are smaller in angle than −135 degrees are shown. However, more or fewer number of wide angle intra-prediction modes may be defined.

When a wide angle intra-prediction mode is used, a length of top reference samples may be set to 2W+1, and a length of left reference samples may be set to 2H+1.

By using a wide angle intra-prediction mode, a sample A shown in FIG. 23 (a) may be predicted by using a reference sample T, and a sample A shown in FIG. 23 (b) may be predicted by a reference sample L.

In addition to legacy intra-prediction modes and N wide angle intra-prediction modes, a total of 67+N intra-prediction modes may be used. In an example, Table 3 represents an intra directional parameter for intra-prediction modes when 20 wide angle intra-prediction modes are defined.

TABLE 3

| PredModeIntra | −10 | −9 | −8 | 7 | −6 |
|---|---|---|---|---|---|
| intraPredAngle | 114 | 93 | 79 | 68 | 60 |
| PredModeIntra | −5 | −4 | −3 | −2 | −1 |
| intraPredAngle | 54 | 49 | 45 | 39 | 35 |
| PredModeIntra | 2 | 3 | 4 | 5 | 6 |
| intraPredAngle | 32 | 29 | 26 | 23 | 21 |
| PredModeIntra | 7 | 8 | 9 | 10 | 11 |
| intraPredAngle | 19 | 17 | 15 | 13 | 11 |
| PredModeIntra | 12 | 13 | 14 | 15 | 16 |
| intraPredAngle | 9 | 7 | 5 | 3 | 2 |
| PredModeIntra | 17 | 18 | 19 | 20 | 21 |
| intraPredAngle | 1 | 0 | −1 | −2 | −3 |
| PredModeIntra | 22 | 23 | 24 | 25 | 26 |
| intraPredAngle | −5 | −7 | −9 | −11 | −13 |
| PredModeIntra | 27 | 28 | 29 | 30 | 31 |
| intraPredAngle | −15 | −17 | −19 | −21 | −23 |
| PredModeIntra | 32 | 33 | 34 | 35 | 36 |
| intraPredAngle | −26 | −29 | −32 | −29 | −26 |
| PredModeIntra | 37 | 38 | 39 | 40 | 41 |
| intraPredAngle | −23 | −21 | −19 | −17 | −15 |
| PredModeIntra | 42 | 43 | 44 | 45 | 46 |
| intraPredAngle | −13 | −11 | −9 | −7 | −5 |
| PredModeIntra | 47 | 48 | 49 | 50 | 51 |
| intraPredAngle | −3 | −2 | −1 | 0 | 1 |
| PredModeIntra | 52 | 53 | 54 | 55 | 56 |
| intraPredAngle | 2 | 3 | 5 | 7 | 9 |
| PredModeIntra | 57 | 58 | 59 | 60 | 61 |
| intraPredAngle | 11 | 13 | 15 | 17 | 19 |
| PredModeIntra | 62 | 63 | 64 | 65 | 66 |
| intraPredAngle | 21 | 23 | 26 | 29 | 32 |
| PredModeIntra | 67 | 68 | 69 | 70 | 71 |
| intraPredAngle | 35 | 39 | 45 | 49 | 54 |
| PredModeIntra | 72 | 73 | 74 | 75 | 76 |
| intraPredAngle | 60 | 68 | 79 | 93 | 114 |

When a current block is a non-square, and an intra-prediction mode for the current block which is obtained in S2502 belongs to a transform range, the intra-prediction mode for the current block may be transformed into a wide angle intra-prediction mode. The transform range may be determined on the basis of at least one of a size, a shape, or a ratio of the current block. In this connection, the ratio may represent a ratio between a width and a height of the current block.

When a current block is a non-square where a width is greater than a height, a transform range may be set from an intra-prediction mode index (for example, 66) of an top-right diagonal direction to (an intra-prediction mode index of the top-right diagonal direction—N). In this connection, N may be determined on the basis of a ratio of the current block. When an intra-prediction mode for the current block belongs to a transform range, the intra-prediction mode may be transformed into a wide angle intra-prediction mode. The transform may be subtracting a predefined value from the intra-prediction mode, and the predefined value may be the total number (for example, 67) of intra-prediction modes excluding a wide angle intra-prediction mode.

In the above example, intra-prediction mode from the number 66 to the number 53 may be respectively transformed into wide angle intra-prediction modes from the number −1 to the number −14.

When a current block is a non-square where a height is greater than a width, a transform range may be set from an intra-prediction mode index (for example, 2) of a bottom-left diagonal direction to (the intra-prediction mode index of the lower-left diagonal direction+M). In this connection, M may be determined on the basis of a ratio of the current block. When an intra-prediction mode for the current block belongs to a transform range, the intra-prediction mode may be transformed into a wide angle intra-prediction mode. The transform may be adding a predefined value to the intra-prediction mode, and the predefined value may be the total number (for example, 65) of directional intra-prediction mode excluding a wide angle intra-prediction mode.

In the above example, intra-prediction mode from the number 2 to the number 15 may be respectively transformed into wide angle intra-prediction modes from the number 67 to the number 80

Hereinafter, intra-prediction modes belonging to a transform range are referred to as wide angle intra prediction replacement modes.

A transform range may be determined on the basis of a ratio of the current block. In an example, Tables 4 and 5 respectively show a transform range of a case where 35 intra-prediction modes excluding a wide angle intra-prediction mode are defined, and a case where 67 intra-prediction modes excluding a wide angle intra-prediction mode are defined.

TABLE 4

| Condition | Replaced Intra Prediction Modes |
|---|---|
| W/H = 2 | Modes 2, 3, 4 |
| W/H > 2 | Modes 2, 3, 4, 5, 6 |
| W/H = 1 | None |
| H/W = ½ | Modes 32, 33, 34 |
| H/W < ½ | Modes 30, 31, 32, 33, 34 |

TABLE 5

| Condition | Replaced Intra Prediction Modes |
|---|---|
| W/H = 2 | Modes 2, 3, 4, 5, 6, 7 |
| W/H > 2 | Modes 2, 3, 4, 5, 6, 7, 8, 9, 10, 11 |
| W/H = 1 | None |
| H/W = ½ | Modes 61, 62, 63, 64, 65, 66 |
| H/W < ½ | Modes 57, 58, 59, 60, 61, 62, 63, 64, 65, 66 |

As examples shown in Tables 4 and 5, the number of wide angle intra prediction replacement modes included in a transform range may vary according to a ratio of the current block.

The ratio of the current block may be further subdivided to set a transform range as shown in Table 6 below.

TABLE 6

| Condition | Replaced Intra Prediction Modes |
|---|---|
| W/H = 16 | Modes 12, 13, 14, 15 |
| W/H = 8 | Modes 12, 13 |
| W/H = 4 | Modes 2, 3, 4, 5, 6, 7, 8, 9, 10, 11 |
| H/W = 2 | Modes 2, 3, 4, 5, 6, 7 |
| H/W = 1 | None |
| W/H = ½ | Modes 61, 62, 63, 64, 65, 66 |
| W/H = ¼ | Modes 57, 58, 59, 60, 61, 62, 63, 64, 65, 66 |
| W/H = ⅛ | Modes 55, 56 |
| H/W = 1/16 | Modes 53, 54, 55, 56 |

When the non-adjacent reference sample line is determined as the reference sample line for the current block or when the multi-line intra prediction encoding method for selecting one of the plurality of reference sample lines is used, the prediction method may be configured not to use the wide angle intra prediction mode. That is, although the current block has a non-square shape, and the intra prediction mode for the current block belongs to the transform range, the intra prediction mode for the current block may not be transformed into the wide angle intra prediction mode.

Alternatively, when the intra prediction mode for the current block is determined as the wide angle intra prediction mode, the prediction method may be configured such that the non-adjacent reference sample lines are unavailable as the reference sample line for the current block or may be configured not to use the multi-line intra prediction encoding method for selecting one of the plurality of reference sample lines. When the multi-line intra prediction encoding method is not used, the adjacent reference sample line may be determined as the reference sample line for the current block.

When the wide angle intra prediction mode is not used, each of refW and refH may be set to a sum of nTbW and nTbH. Accordingly, the non-adjacent reference sample line spaced from the current block by i may include (nTbW+nTbH+offsetX[i]) top reference samples and (nTbW+nTbH+offsetY[i]) left reference samples except for the left-top reference sample. That is, the non-adjacent reference sample line spaced from the current block by i may include (2nTbW+2nTbH+offsetX[i]+offsetY[i]+1) reference samples. For example, when a value of whRatio is greater than 1, a value of offsetX may be set to be larger than a value of offsetY. In one example, when the value of offsetX may be set to 1, and the value of offsetY may be set to 0. To the contrary, when the value of whRatio is smaller than 1, the value of offsetY may be set to be larger than the value of offsetX. In one example, the value of offsetX may be set to 0, and the value of offsetY may be set to 1.

Since wide angle intra-prediction modes are used in addition to legacy intra-prediction modes, resource for encoding wide angle intra-prediction modes may be increased, and thus encoding efficiency may be reduced. Accordingly, rather than encoding a wide angle intra-prediction mode as it is, a replaced intra-prediction mode for the wide angle intra-prediction modes are encoded so as to improve encoding efficiency.

In an example, when a current block is encoded by using a wide angle intra-prediction mode of the number 67, the number 2 that is a wide angle replacement intra-prediction mode of the number 67 may be encoded as an intra-prediction mode for the current block. In addition, when a current block is encoded by using a wide angle intra-prediction mode of the number −1, the number 66 that is a wide angle replacement intra-prediction mode of the number −1 may be encoded as an intra-prediction mode for the current block.

The decoder may decode an intra-prediction mode for the current block, and determine whether or not the decoded intra-prediction mode belongs to a transform range. When the decoded intra-prediction mode is a wide angle replacement intra-prediction mode, the intra-prediction mode may be transformed into a wide angle intra-prediction mode.

Alternatively, when a current block is encoded through a wide angle intra-prediction mode, the wide angle intra-prediction mode may be encoded as it is.

Encoding of an intra prediction mode may be performed based on an MPM list described above. Specifically, when a neighboring block is encoded in a wide angle intra prediction mode, an MPM may be set based on a wide angle replacement intra prediction mode corresponding to the wide angle intra prediction mode.

A residual image may be derived by subtracting a prediction image from an original image. In this connection, when the residual image is converted into a frequency domain, even though high frequency components are removed from frequency components, subjective image quality of the image does not drop significantly. Accordingly, when values of high frequency components are transformed into small values, or when values of high frequency components are set to 0, compression efficiency may be increased without causing large visual distortion. Reflecting the above feature, transform may be performed on a current block so as to decompose a residual image to two-dimensional frequency components. The transform may be performed by using transform methods such as DCT (discrete cosine transform), DST (discrete sine transform), etc.

A transform method may be determined on a basis of a block. A transform method may be determined on the basis of at least one of a prediction encoding mode for a current block, a size of the current block, or a size of the current block. In an example, when a current block is encoded through an intra-prediction mode, and a size of the current block is smaller than N×N, transform may be performed by using a transform method of DST. On the other hand, when the above condition is not satisfied, transform may be performed by using a transform method of DCT.

For a partial block of a residual image, two-dimensional image transform may not be performed. Not performing two-dimensional image transform may be referred to as transform skip. When transform skip is applied, quantization may be applied to residual values for which transform is not performed.

After performing transform on a current block by using DCT or DST, transform may be performed again on the transformed current block. In this connection, transform based on DCT or DST may be defined as first transform, and performing transform again on a block to which first transform is applied may be defined as second transform.

First transform may be performed by using any one of a plurality of transform core candidates. In an example, first transform may be performed by using any one of DCT2, DCT8, or DCT7.

Different transform cores may be used for a horizontal direction and a vertical direction. Information representing a combination of a transform core of a horizontal direction and a transform core of a vertical direction may be signaled in a bitstream.

A processing unit of first transform may differ with second transform. In an example, first transform may be performed on an 8×8 block, and second transform may be performed on a 4×4 sized sub-block within the transformed 8×8 block. In this connection, a transform coefficient for remaining regions for which second transform is not performed may be set to 0.

Alternatively, first transform may be performed on a 4×4 block, and second transform may be performed on a region having an 8×8 size including the transformed 4×4 block.

Information representing whether or not to perform second transform may be signaled in a bitstream.

Alternatively, whether to perform the second transform may be determined based on whether a horizontal directional transform core and a vertical directional transform core are identical with each other. In one example, the second transform may be performed only when the horizontal directional transform core and the vertical directional transform core are identical with each other. Alternatively, the second transform may be performed only when the horizontal directional transform core and the vertical directional transform core are different from each other.

Alternatively, the second transform may be allowed only when a predefined transform core is used for the horizontal directional transform and the vertical directional transform. In one example, when a DCT2 transform core is used for transform in the horizontal direction and transform in the vertical direction, the second transform may be allowed.

Alternatively, it may be determined whether to perform the second transform based on the number of non-zero transform coefficients of the current block. In one example, when the number of the non-zero transforms coefficient of the current block is smaller than or equal to a threshold, the prediction method may be configured not to use the second transform. When the number of the non-zero transform coefficients of the current block is greater than the threshold, the prediction method may be configured to use the second transform. As long as the current block is encoded using intra prediction, the prediction method may be configured to use the second transform.

The decoder may perform inverse-transform (second inverse-transform) to the second transform and may perform inverse-transform (first inverse-transform) to the first transform resultant from the second inverse-transform. As a result of performing the second inverse-transform and the first inverse-transform, residual signals for the current block may be obtained.

When transform and quantization are performed by the encoder, the decoder may obtain the residual block via inverse-quantization and inverse-transform. The decoder may add the prediction block and the residual block to each other to obtain the reconstructed block for the current block.

When the reconstructed block of the current block is obtained, loss of information as occurring in the process of the quantization and encoding may be reduced via the in-loop filtering. The in-loop filter may include at least one of a deblocking filter, a sample adaptive offset filter (SAO), or an adaptive loop filter (ALF). Hereinafter, a reconstructed block before an in-loop filter is applied is referred to as a first reconstructed block and a reconstructed block after an in-loop filter is applied is referred to as a second reconstructed block.

The second reconstructed block may be obtained by applying at least one of a deblocking filter, SAO or ALF to the first reconstructed block. In this connection, SAO or ALF may be applied after the deblocking filter is applied.

A deblocking filter is to alleviate quality degradation (e.g. Blocking Artifact) on a boundary of a block which occurs as quantization is performed per block. To apply the deblocking filter, a blocking strength (BS) between the first reconstructed block and a neighboring reconstructed block may be determined.

FIG. 24 is a flow diagram showing a process of determining a blocking strength.

In an example shown in FIG. 24, P represents a first reconstructed block and Q represents a neighboring reconstructed block. In this connection, the neighboring reconstructed block may neighbor a left or top of the current block.

An example shown in FIG. 24 showed that a blocking strength is determined considering a prediction encoding mode of P and Q, whether a transform coefficient which is not 0 is included, whether inter-prediction is performed by using the same reference picture or whether the difference value of motion vectors is equal to or greater than a threshold value.

Based on a blocking strength, whether a deblocking filter is applied may be determined. In an example, when the blocking strength is 0, filtering may not be performed.

SAO is to alleviate ringing artifact which occurs as quantization is performed in a frequency region. SAO may be performed by adding or subtracting an offset determined by considering a pattern of a first reconstructed image. The determination method of the offset includes Edge Offset (EO) or Band Offset (BO). EO represents a method determining the offset of a current sample according to a pattern of neighboring pixels. BO represents a method applying a common offset to a group of pixels with a similar brightness value in a region. Concretely, pixel brightness may be partitioned into 32 uniform sections and pixels with a similar brightness value may be set as one group. In an example, 4 adjacent bands among 32 bands may be set as one group and the same offset value may be applied to samples belonging to 4 bands.

ALF is a method of generating a second reconstructed image by applying a filter with a predefined size/shape to a first reconstructed image or a reconstructed image that a deblocking filter is applied. The following Equation 6 represents an example in which ALF is applied.

$$R'(i, j) = \sum_{k=-\frac{N}{2}}^{\frac{N}{2}} \sum_{l=-\frac{N}{2}}^{\frac{N}{2}} f(k, l) \cdot R(i+k, j+l)$$ [Equation 6]

Any one of predefined filter candidates may be selected in a basis of a picture, a coding tree unit, a coding block, a prediction block or a transform block. At least one of a size or shape of each filter candidate may be different.

FIG. 25 represents predefined filter candidates.

As in an example shown in FIG. 25, at least any one of a 5×5, 7×7 or 9×9 sized diamond shape may be selected.

Only a 5×5 sized diamond shape may be used for a chroma component.

A method of partitioning a picture into a plurality of regions and encoding/decoding the plurality of regions in parallel may be considered for the real-time or low delay encoding of a high resolution image such as a panoramic video, a 360-degree video or 4K/8K UHD (Ultra High Definition). Concretely, according to a purpose of processing, a picture may be partitioned into tiles or slices (or tile groups).

A tile represents a base unit for parallel encoding/decoding. Each tile may be processed in parallel. The tile may have a rectangular shape. In encoding/decoding the tile, it may be set not to use data of other tile. The parallel processing of tiles can be supported by removing encoding/decoding dependency between tiles. Concretely, a probability table of CABAC (Context Adaptive Binary Arithmetic Coding) context may be initialized per tile and an in-loop filter may be set not to be applied on a boundary of tiles.

Information on video encoding/decoding may be signaled by a slice header. Information signaled by the slice header may be commonly applied to coding tree units or tiles included in the slice.

FIG. 26 is a diagram showing a picture partitioning method according to an embodiment of the present disclosure.

First, whether a current picture is partitioned into a plurality of processing units may be determined S2610. In this connection, a processing unit may include at least one of a tile or a slice. In an example, a syntax, no_pic_partition_flag, indicating whether a current picture is partitioned into a plurality of tiles or slices, may be signaled in a bitstream. If a value of the syntax, no_pic_partition_flag, is 0, it represents that a current picture is partitioned into at least one tile or at least one slice. On the other hand, if a value of a syntax, no_pic_partition_flag, is 1, it represents that a current picture is not partitioned into a plurality of tiles or slices.

When it is determined that a current picture is not to be partitioned into a plurality of processing units, a partitioning process of the current picture may be ended. In this connection, it may be understood that the current picture is composed of a single tile and a single slice (or a single tile group).

When it is determined that a current picture is to be partitioned into a plurality of processing units, tile partitioning information may be signaled in a bitstream. A picture may be partitioned into at least one tile based on the signaled tile partitioning information S2620.

When a current picture is partitioned into a plurality of tiles, a tile group (or a slice) may be determined by combining a plurality of tiles or partitioning a tile S2630.

Hereinafter, according to the present disclosure, a tile partitioning method and a tile group determination method will be described in detail.

FIG. 27 represents an example in which a picture is partitioned into a plurality of tiles.

A tile may include at least one coding tree unit. A boundary of the tile may be set to match a boundary of a coding tree unit. In other words, a partitioning type that one coding tree unit is partitioned into plural may not be allowed.

Information representing a partitioning shape of a picture may be signaled in a bitstream. The information may be encoded and signaled by a picture parameter set or a sequence parameter set.

Information representing a partitioning shape of a picture may include at least one of information indicating whether tiles are partitioned in a uniform size, information representing the number of tile columns or information representing the number of tile rows.

Information indicating whether tiles are partitioned in a uniform size may be a 1-bit flag, uniform_spacing_flag. When it is determined that a picture is partitioned in a uniform size, remaining tiles except for tiles adjacent to a right and/or bottom boundary of the picture may have the same size.

As a picture is partitioned by using at least one of a vertical line or a horizontal line across a picture, each tile belongs to a different column and/or row. To determine a partitioning shape of the picture, information representing the number of tile columns and/or tile rows may be signaled. In an example, information, num_tile_row_minus1, representing the number of rows formed by tiles, and information, num_tile_column_minus1, representing the number of columns formed by tiles generated by partitioning the picture may be signaled in a bitstream. A syntax, num_tile_row_minus1, represents a value subtracting 1 from the number of tile rows and a syntax, num_tile_column_minus1, represents a value subtracting 1 from the number of tile columns.

In an example shown in FIG. 27, the number of tile columns is 4 and the number of tile rows is 3. Accordingly, num_tile_columns_minus1 may represent 3 and num_tile_rows_minus1 may represent 2.

A set of tiles belonging to one line (row or column) may be referred to as a tile set. In an example, a horizontal directional tile set may mean a set of tiles belonging to one row and a vertical directional tile set may mean a set of tiles belonging to one column.

According to a partitioning shape of a picture, tiles may have the same size in all regions excluding a picture boundary. Alternatively, a height of tiles which are adjacent horizontally may be set to be the same or a width of tiles which are adjacent vertically may be set to be the same.

Information representing a size of a tile column and/or a size of a tile row may be signaled in a bitstream. The size of the tile column may be determined based on the number of coding tree unit columns included in the tile column and the size of the tile row may be determined based on the number of coding tree unit rows included in the tile row.

In an example, when a picture is partitioned into a plurality of tile columns, information representing a width of each tile column may be signaled in a bitstream and when a picture is partitioned into a plurality of tile rows, information representing a height of each tile row may be signaled in a bitstream. A syntax element, column_width_minus1[i], representing a size of a tile column, may have a value subtracting 1 from the number of coding tree unit columns included in an i-th tile column. A syntax element, row_height_minus1[i] representing a size of a tile row, may have a value subtracting 1 from the number of coding tree unit rows included in an i-th tile row.

For the last tile column, encoding of a syntax element, column_width_minus1, representing a size of a tile column, may be omitted. In addition, for the last tile row, encoding of a syntax element, row_height_minus1, representing a size of a tile row, may be omitted. The width of the last tile column and the height of the last row may be derived by considering a picture size.

Information representing a size of a tile column and/or information representing a size of a tile row may be signaled when a picture is determined to be partitioned into tiles in a non-uniform size. In an example, when uniform_spacing_flag is 0, information representing a size of a tile column and/or information representing a size of a tile row may be signaled. When uniform_spacing_flag is 1, encoding of information representing a size of a tile column and/or information representing a size of a tile row may be omitted. In this case, based on the number of tile columns and/or the number of tile rows, a size of a tile row and/or the number of a tile column may be derived.

Table 7 represents a syntax table for determining a partitioning shape of a picture.

TABLE 7

```
...
if ( tile_enabled_flag ) {
    num_tile_columns_minus1                              ue(v)
    num_tile_rows_minus1                                 ue(v)
    uniform_spacing_flag                                 u(1)
    if ( !uniform_spacing_flag ) {
        for ( i=0; i < num_tile_columns_minus1: i++ )
            column_width_minus1[i]                       ue(v)
        for ( i=0; i < num_tile_rows_minus1: i++ )
            row_height_minus1[i]                         ue(v)
    }
    loop_filter_across_tiles_enabled_flag                u(1)
}
...
```

In Table 7, a syntax element, num_tile_columns_minus1, representing the number of tile columns, and a syntax element, num_tile_rows_minus1, representing the number of tile rows may be signaled.

Next, a syntax element, uniform_spacing_flag, indicating whether a picture is partitioned into tiles in a uniform size may be signaled. When uniform_spacing_flag is true, tiles may be partitioned in a uniform size in a remaining region except for a picture boundary.

When uniform_spacing_flag is false, a syntax element, column_width_minus1, representing a width of each tile column, and a syntax element, row_height_minus1, representing a height of each tile row may be signaled.

A syntax element, loop_filter_across_tiles_enabled_flag, represents whether it is allowed to use a loop filter on a boundary of a tile.

A picture may be partitioned so that a height of tiles which are adjacent left and right is different or so that a width of tiles which are adjacent up and down is different. The above picture partitioning method may be referred to as a flexible tile partitioning method. In addition, tiles partitioned by the flexible tile partitioning method may be referred to as a flexible tile. The flexible tile partitioning method may be allowed only when tiles are determined not to be uniformly partitioned (e.g. when uniform_tile_spacing_flag is 0).

FIG. 28 is a diagram showing the partitioning aspect of a picture according to a flexible tile method.

A search order between tiles generated by partitioning a picture may follow a pre-determined scanning order. In addition, according to the pre-determined scanning order, an index may be assigned to each tile.

The scanning order of tiles may be any one of a raster scan, a diagonal scan, a vertical directional scan or a horizontal directional scan. (a) to (d) of FIG. 28 represent examples in which an index is assigned to each tile according to a raster scan, a diagonal scan, a vertical directional scan or a horizontal directional scan.

According to a size or position of a current tile, the next scanning order may be determined. In an example, when a height of the current tile is different from that of a tile neighboring a right of the current tile (e.g. when a height of the right neighboring tile is greater than that of the current tile), a tile at a leftmost position among tiles on the same vertical line as a tile neighboring a bottom of the current tile may be determined as the next scanning target of the current tile.

The scanning order of tiles may be determined per picture or per sequence.

Alternatively, the scanning order of tiles may be determined by considering a size of the first tile in a picture. In an example, when a width of the first tile is greater than height, the scanning order of tiles may be set as a horizontal scan. When a height of the first tile is greater than width, the scanning order of tiles may be set as a vertical scan. When the width and height of the first tile are the same, the scanning order of tiles may be set as a raster scan or a diagonal scan.

Alternatively, based on a tile index or an index for the after-mentioned tile group, the scanning order of tiles may be determined. Based on the index of the tile group, the scanning order between tile groups may be determined.

FIG. 29 is a diagram showing an example in which the scanning order of tiles is determined according to a tile group index.

When a plurality of tile groups are included in a picture, tiles included in a tile group with the lowest tile group index may be scanned first, and then tiles included in a tile group with a next-order tile group index may be scanned. In an example, as in an example shown in FIG. 29, when the first tile group, tile group0, includes tile0 to tile7 and the second tile group, tile group1, includes tile8 alone, the tile included in tile group1 may be scanned after scanning all tiles included in tile group0. Accordingly, the scanning order of tiles may be determined as follows.

Tile0, Tile1, Tile2, Tile3, Tile4, Tile5, Tile6, Tile7, Tile8

A scanning order of coding tree units in a tile may be set the same as the scanning order of tiles. In an example, when the scanning order of tiles follows a raster scanning order, coding tree units included in a tile may be also encoded/decoded in the raster scanning order.

Alternatively, a scanning order of coding tree units in a tile may be set to be different from a scanning order of tiles.

Information for determining a tile size may be encoded and signaled. In an example, a syntax element, tile_width_minus1[i], representing a width of the i-th tile column, and a syntax element, tile_height_minus1[i], representing a height of the i-th tile row may be encoded in a bitstream.

When a width of a current tile column is equal to that of a previous tile column, encoding of information representing the width of the current tile column may be omitted and the width of the current tile column may be derived from a width of a previous tile column. In an example, when the width of the current tile column is equal to that of the previous tile column, encoding of a syntax element, tile_width_minus1, representing the width of the current tile column may be omitted. In addition, for the rightmost tile column of a picture, encoding of a syntax element, tile_width_minus1, representing a width may be omitted. The width of the rightmost tile column may be derived by subtracting a width of remaining tile columns from a width of a picture.

When a height of a current tile row is equal to that of a previous tile row, encoding of information representing the height of the current tile row may be omitted and the height of the current tile row may be derived from the height of the previous tile row. In an example, when the height of the current tile row is equal to that of the previous tile row, encoding of a syntax element, tile_height_minus1, representing the height of the current tile row, may be omitted. In addition, for the lowest tile row of a picture, encoding of a syntax element, tile_height_minus1, representing a height may be omitted. The height of the lowest tile row may be derived by subtracting a height of remaining tile rows from a height of a picture.

For remaining tile columns/rows except for the first tile column/row, information representing whether a size is identical to a size of a previous tile column/row may be encoded. In an example, use_previous_tile_width_flag indicating whether a width of a current tile column is to the same as that of a previous tile column may be signaled. If use_previous_tile_width_flag is 1, it represents that the width of the current tile column is the same as that of the previous tile column. In this case, encoding of a syntax element representing the width of the current tile column may be omitted. If use_previous_tile_width_flag is 0, it represents that the width of the current tile column is not the same as that of the previous tile column. In this case, a syntax element representing the width of the current tile column may be encoded. Alternatively, when at least one tile column with the same width as a rightmost tile column or a tile column positioned at a left of the rightmost tile column in a current picture is consecutively assigned to a left of the rightmost tile column or a left of the tile column positioned at a left of the rightmost tile column, a syntax element representing width can be decoded only for one of tile columns with the same width. For the convenience of explanation, the rightmost tile column or the tile column positioned at the left of the rightmost tile column in the picture is referred to as a first tile column. In an example, while when a second tile column with the same width as the first tile column exists at a left of the first tile column, a syntax element representing a width of the second tile column may be encoded, and encoding of a syntax element representing the width of the first tile column may be omitted. The width of the first tile column may be set the same as the width of the second tile column.

In another example, use_previous_tile_height_flag indicating whether a height of a current tile row is the same as that of a previous tile row may be signaled. If use_previous_tile_height_flag is 1, it represents that the height of the current tile row is the same as that of the previous tile row. In this case, encoding of a syntax element representing the height of the current tile row may be omitted. If use_previous_tile_height_flag is 0, it represents that the height of the current tile row is not the same as that of the previous tile row. In this case, a syntax element representing the height of the current tile row may be encoded. Alternatively, when at least one tile row with the same height as a bottom tile row or a tile row positioned at a top of the bottom tile row in a current picture is consecutively assigned to a top of the bottom tile row or a top of the tile row positioned at the top of the bottom tile row, a syntax element representing a height may be encoded only for one of tile rows with the same height. For the convenience of explanation, the bottom tile row or the tile row positioned at the top of the bottom tile row in the picture is referred to as a first tile row. In an example, while when a second tile row with the same height as the first tile row exists at a top of the first tile row, a syntax element representing a height of the second tile row may be encoded, and encoding of a syntax element representing a height of the first tile row may be omitted. The height of the first tile row may be set the same as the height of the second tile row.

In another example, information for specifying the number of tile columns whose width is signaled in a current picture may be signaled in a bitstream. In an example, a syntax, num_exp_tile_columns_minus1, for determining the number of tile columns whose width is signaled, may be signaled in a bitstream. A syntax, num_exp_tile_columns_minus1, may be a value subtracting 1 from the number of tile columns whose a width is signaled. When an index of a tile column is below the number of tile columns whose width is signaled, a width of the corresponding tile column may be determined based on a syntax, tile_width_minus1, signaled in a bitstream. On the other hand, when an index of a tile column is equal to or greater than the number of tile columns whose width is signaled, a width of the corresponding tile column may be set the same as a syntax, tile_width_minus1, signaled last.

Alternatively, information for specifying the number of tile rows whose height is signaled in a current picture may be signaled in a bitstream. In an example, a syntax, num_exp_tile_rows_minus1, for determining the number of tile rows whose height is signaled, may be signaled in a bitstream. A syntax, num_exp_tile_rows_minus1, may be a value subtracting 1 from the number of tile rows whose height is signaled. When an index of a tile row is below the number of tile rows whose height is signaled, a height of the corresponding tile row may be determined based on a syntax, tile_height_minus1, signaled in a bitstream. On the other hand, when an index of a tile row is equal to or greater than the number of tile rows whose height is signaled, a height of the corresponding tile row may be set the same as a syntax, tile_height_minus1, signaled last.

In another example, information representing a height and width of a tile may be signaled per tile. In an example, when the number of tiles is determined, information for determining a size of each tile may be encoded and signaled. In an example, a syntax element, tile_width_minus1[i], representing a width of an i-th tile, and a syntax element, tile_height_minus1[i], representing a height of an i-th tile may be signaled in a bitstream. For it, information representing the total number of tiles in a picture may be encoded.

If the number of tiles is determined, information for defining the information of each tile may be signaled for each tile.

First, for remaining tiles except for a first tile, information indicating whether to have the same size as a previous tile may be encoded and signaled. In an example, a syntax element, use_previous_tile_size_flag, represents whether a size of a current tile is the same as that of a previous tile. If use_previous_tile_size_flag is true, it represents that the size of the current tile is the same as that of the previous tile. In this case, encoding of information representing the size of the current tile may be omitted. If use_previous_tile_size_flag is false, information representing the size of the current tile may be encoded and signaled. For the first tile, encoding of use_previous_tile_size_flag may be omitted and a value of the flag may be inferred to be false. In an example, a syntax, tile_width_minus1[i], representing a width of an i-th tile, and a syntax, tile_height_minus1[i], representing a height of an i-th tile may be encoded and signaled.

A tile size may be determined with information indicating whether a width of a tile is the same as that of a previous tile and/or information indicating whether a height of a tile is the same as that of a previous tile.

Table 8 represents a syntax table including information representing whether a width of a tile is the same as that of a previous tile.

TABLE 8

| | Descriptor |
|---|---|
| pic_parameter_set_rbsp( ) { | |
| ... | |
|   tiles_enabled_flag | u(1) |
| ... | |
|   CoveredWidthByTile = 0; | |
|   CoveredHeightByTile = 0 ; | |
|   PrevWidthByTile = 0; | |
|   PrevHeightByTile = 0 ; | |
|   if( tiles_enabled_flag ) { | |
|     number_of_tiles_in_picture_minus2 | ue(v) |
|     for ( i=0; i < number_of_tiles_in_picture_minus2+2 ; i++ ) { | |
|       if ( i > 0 ) | |
|         use_previous_tile_size_flag | u(1) |
|       if ( use_previous_tile_size_flag == 0) { | |
|         use_previous_tile_width _flag | ue(v) |
|         if ( use_previous_tile_width_flag == 0) { | ue(v) |
|           tile_width_minus1[ i ] | ue(v) |
|         tile_height_minus1[ i ] | ue(v) |
|     } else { | |
|       tile_height_minus1[ i ] | ue(v) |
|       } | |
|     } | |
|     loop_filter_across_tiles_enabled_flag | u(1) |
|   } | |
| ... | |

A syntax element, use_previous_tile_width_flag, indicating whether a width of a current tile is the same as that of a previous tile. If use_previous_tile_width_flag is true, encoding of a syntax element representing a width of the current tile may be omitted and the width of the current tile may be set the same as that of the previous tile.

When use_previous_tile_width_flag is false, information representing a width of a current tile may be signaled. In an example, tile_width_minus1[i] may represent a value subtracting 1 from the number of coding tree unit rows included in an i-th tile.

Only when a size of a current tile is determined to be different from that of a previous tile (e.g. when a value of use_previous_tile_size_flag is 0), a syntax element, use_previous_tile_width_flag, may be encoded and signaled.

tile_width_minus1[i] may be a value subtracting 1 from the number of coding tree unit columns included in an i-th tile. A decoder may derive the number of coding tree unit columns included in the i-th tile by adding 1 to tile_width_minus1[i] and calculate the width of the tile by multiplying a derived value by a width of a coding tree unit.

Table 9 represents a syntax table that information indicating whether a height of a current tile is the same as that of a previous tile is further included.

TABLE 9

| | Descriptor |
|---|---|
| pic_parameter_set_rbsp( ) { | |
| ... | |
|   tiles_enabled_flag | u(1) |
| ... | |
|   CoveredWidthByTile = 0; | |
|   CoveredHeightByTile = 0 ; | |
|   PrevWidthByTile = 0; | |
|   PrevHeightByTile = 0 ; | |
|   if( tiles_enabled_flag ) { | |
|     number_of_tiles_in_picture_minus2 | ue(v) |
|     for ( i=0; i < number_of_tiles_in_picture_minus2+2 ; i++ ) { | |
|       if ( i > 0) | |
|         use_previous_tile_size_flag | u(1) |
|       if ( use_previous_tile_size_flag == 0) { | |
|         use_previous_tile_width _flag | ue(v) |
|         if ( use_previous_tile_width_flag == 0) { | ue(v) |
|           tile_width_minus1[ i ] | ue(v) |
|           tile_width_minus1[i] +=1; | |
|         use_previous_tile_height _flag | |
|         if (use_previous_tile_height_flag ==0){ | |
|           tile_height_minus1[ i ] | ue(v) |
|           tile_height_minus1[i] +=1; | |
|         } | |
|       } else { | |
|         use_previous_tile_height _flag | |
|         if (use_previous_tile_height_flag ==0){ | |
|           tile_height_minus1[ i ] | ue(v) |
|           tile_height +=1; | |
|         } | |
|       } | |
|     } | u(1) |
|     loop_filter_across_tiles_enabled_flag | |
|   } | |
| ... | |

A syntax element, use_previous_tile_height_flag, represents whether a height of a current tile is the same as that of a previous tile. If use_previous_tile_height_flag is true, encoding of information representing the height of the current tile may be omitted and the height of the current tile may be set the same as that of the previous tile.

When use_previous_tile_height_flag is false, information representing the height of the current tile may be signaled. In an example, tile_height_minus1[i] may represent a value subtracting 1 from the number of coding tree unit rows included in an i-th tile.

Only when a size of a current tile is determined to be different from that of a previous tile (e.g. when a value of use_previous_tile_size_flag is 0), a syntax element, use_previous_tile_height_flag, may be encoded and signaled. In addition, a syntax element, use_previous_tile_height_flag, may be signaled only when use_previous_tile_width_flag is false.

Table 8 represents an example for a case in which use_previous_tile_width_flag is used and Table 9 represents an example for a case in which use_previous_tile_width_flag and use_previous_tile_height_flag are used. Although not shown in the above Tables, encoding of use_previous_tile_width_flag may be omitted and only use_previous_tile_height_flag may be used.

Whether to use use_previous_tile_height_flag or use_previous_tile_size_flag may be determined based on at least one of a tile scanning order, a width/height of a first tile or a width/height of a previous tile. In an example, while use_previous_tile_height_flag may be used when the tile scanning order is a vertical direction, use_previous_tile_width_flag may be used when the tile scanning order is a horizontal direction. Alternatively, while use_previous_tile_width_flag may be used when a first tile or a previous tile has a non-square shape whose width is greater than height, use_previous_tile_height_flag may be used when a first tile or a previous tile has a non-square shape whose height is greater than width.

While the number of tiles included in a picture is signaled, encoding of information related to a tile size for the last tile may be omitted.

Table 10 represents an example in which encoding of a tile size for the last tile is omitted.

TABLE 10

|  | Descriptor |
|---|---|
| pic_parameter_set_rbsp( ) { | |
| ... | |
|   tiles_enabled_flag | u(1) |
| ... | |
|   if( tiles_enabled_flag ) { | |
|     number_of_tiles_in_picture_minus2 | ue(v) |
|     subtile_width_minus1 | ue(v) |
|     subtile_height_minus1 | ue(v) |
|     for ( i=0; i < number_of_tiles_in_picture_minus2+1 ; i++ ) { | |
|       if ( i > 0 ) | |
|         use_previous_tile_size_flag | u(1) |
|       if ( use_previous_tile_size_flag == 0) { | |
|         tile_width_minus1[ i ] | ue(v) |
|         tile_height_minus1[ i ] | ue(v) |
|       } | |
|     } | |
|     loop_filter_across_tiles_enabled_flag | u(1) |
|   } | |
| } | |
| ... | |

If a size of tiles except for the last tile is specified, a remaining region in a picture may be set as the last tile.

A decoder may determine a size of a tile based on the number of coding tree unit columns and/or the number of coding tree unit rows derived based on the above syntax elements and a size of a coding tree unit. In an example, a width of an i-th tile may be set by (tile_width_minus1[i]+1)*(the width of a coding tree unit) and a height of the i-th tile may be set by (tile_height_minus1[i]+1)*(the height of a coding tree unit).

On the other hand, information representing a size of a coding tree unit may be signaled by a sequence parameter set or by a picture parameter set.

An identifier (hereinafter referred to as TileID) for identifying a tile to which a coding tree unit belongs may be assigned to each coding tree unit.

FIG. 30 is a diagram showing an example in which a TileID is assigned to each coding tree unit.

The same TileID may be assigned to coding tree units belonging to the same tile. Concretely, TileID of N may be assigned to coding tree units belonging to Tile N.

To determine a TileID assigned to each coding tree unit, variables, x and y, representing a position of a coding tree unit in a picture may be determined. In this connection, x represents a value which is derived by dividing an x-axis coordinate in (x0, y0) by a width of a coding tree unit, and y represents a value which is derived by dividing a y-axis coordinate in (x0, y0) by a height of a coding tree unit. Concretely, x and y may be derived from following Equations 7 and 8.

$$x=(x0/(CTU\_width)) \qquad \text{[Equation 7]}$$

$$y=(y0/(CTU\_height)) \qquad \text{[Equation 8]}$$

A TileID may be assigned to each coding tree unit in the following process.

i) Initialize TileID

TileID of each coding tree unit may be initialized as a value subtracting 1 from the number of tiles in a picture.

TABLE 11

If tiles_enabled_flag is equal to 1, the value of the variable tile_id and the value of the two-dimensional array TileId are specified as follows:
  tile_id = 0
  for (y=0; y<PicHeight InCtbsY; y++)
  - for (x=0; x<PicWidthInCtbsY; x++)
    → TileId[x][y] = number_of_tiles_in_picture_minus2+1
  tile_height_minus1[number_of_tiles_in_picture_minus2+1] = 0
  tile_width_minus1[number_of_tiles_in_picture_minus2+1] = 0 ii) Derive TileID

TABLE 12

The value of the variable tile_id and the value of the two-dimentional array CTU_tile assignment are derived as follows:
  for(ctu_y=0; ctu_y < (tile_height_minus1[i]+1)*(subtile_height_minus1+1) && (tile_coordinate_y+ctu_y) < PicHeight InCtbsY; ctu_y++)
    - for(ctu_x=0; ctu_x<(tile_width_minus1[i]+1)*(subtile_width_minus1+1) && (tile_coordinate_x+ctu_x) < PicWidthInCtbsY; ctu_x++)
      → TileId[tile_coordinate_x + ctu_x] [tile_coordinate_y + ctu_y] = tile_id
    tile_id++

A plurality of tiles may be defined as one processing unit. In an example, a plurality of tiles may be defined as one tile group. A tile group may be referred to as a slice.

Alternatively, one tile may be partitioned into a plurality of processing units. In an example, a tile may be partitioned into a plurality of slices. In this connection, one slice may include at least one coding tree unit column. When a tile is partitioned into a plurality of slices, information representing a height of each slice may be signaled in a bitstream.

Information representing the total number of tile groups in a sequence or in a picture may be signaled in a bitstream. In an example, a syntax, numTotalTileGroup_minus1, representing the total number of tile groups in a sequence or in a picture may be signaled.

When a plurality of tile groups are included in a picture, address information of a tile group may be signaled to identify each tile group. In an example, a syntax, tile group index, representing an index of each tile group, may be signaled per tile group.

Video encoding/decoding information may be signaled through a tile group header. Information signaled through the tile group header may be commonly applied to tiles belonging to the tile group.

Information for determining a tile group included in a picture may be signaled in a bitstream. The information may include information representing a partitioning method of a tile group. In an example, a syntax, rec_tile_group_flag, indicating the partitioning method of a tile group may be signaled in a bitstream.

A syntax, rec_tile_group_flag, represents whether a tile group is defined based on a raster scanning order or whether a tile group is defined in a rectangular shape. In an example, if rec_tile_group_flag is 0, it represents that a tile group is defined based on the raster scanning order of tiles. On the other hand, if rec_tile_group_flag is 1, it represents that a tile group is defined in a rectangular shape.

When a flexible tile partitioning method is applied, it may be only allowed to define a tile group in a rectangular shape. In other words, when a flexible tile partitioning method is applied, encoding of rec_tile_group_flag may be omitted and that value may be inferred to 1.

Hereinafter, the above two methods for determining a tile group will be described in detail.

A tile group may be defined based on a raster scanning order of tiles. In an example, at least one tile may be defined as one tile group, but tiles included in a tile group should be determined in the raster scanning order.

FIGS. 31 and 32 represent an example in which a tile group is defined based on the raster order.

In an example, in an example shown in FIG. 31, when it is assumed that a first tile group, tile group0, includes 3 tiles, the first tile group, tile group0, may be defined to include Tile0 to Tile2 in the raster scanning order. When it is assumed that a second tile group, tile group1, includes 6 tiles, the second tile group, tile group1, may be defined to include Tile3 to Tile8 in the raster scanning order. The last tile group, tile group2, may include the remaining tiles, Tile9 to Tile 11, in the raster scanning order.

When a tile group is defined in the raster scanning order, information representing the number of tiles included in each tile group may be signaled to determine tiles included in each tile group. For the last tile group, information representing the number of tiles included in the tile group may be omitted.

A width or height of tiles included in a tile group may be different. In an example, it was shown that a height of Tile3 among tiles included in the second tile group, Tile group1, is different from that of the remaining tiles.

Alternatively, tiles with different width or height may be set not to be included in one tile group. In an example, an example shown in FIG. 31 showed that Tile3 with a height of 2 and Tile4 to Tile 8 with a height of 3 constitute one tile group, but such combination of tiles may be set to be unallowable. In other words, as in an example shown in FIG. 32, it may be set so that one tile group does not include tiles with different height. An example shown in FIG. 32 showed that a tile group including Tile3 to Tile8 shown in FIG. 31 is partitioned into two tile groups, tile group1 and tile group2. Accordingly, the second tile group, tile group1, includes only Tile3 with a height of 2 and the third tile group, tile group 2, includes only Tile4 to Tile8 with a height of 3.

A tile group may be defined in a rectangular shape. In this case, tiles positioned at four corners of a tile group belong to the same row or the same column.

FIG. 33 is a diagram showing an example in which only a rectangular tile group is allowed.

As in an example shown in FIG. 33, a fourth tile group, tile group3, includes Tile5, Tile6, Tile9 and Tile10. As in a shown example, when a tile group includes a plurality of tiles, a rectangle with a left-top tile and a right-bottom tile constituting a tile group as two vertices may be defined as one tile group.

When a flexible tile partitioning method is applied, it may be only allowed to define a tile group in a rectangular shape.

FIG. 34 is a diagram showing an example in which a tile group is defined in a flexible tile partitioning method.

As in an example shown in FIG. 34, a tile group may be set to have a rectangular shape. In other words, as in a shown example, when a tile group includes a plurality of tiles, a rectangle with a left-top tile and a right-bottom tile constituting a tile group as two vertices may be defined as one tile group.

When a height of a predetermined tile is greater than that of a previous tile group, a corresponding tile may be set to form one tile group. In an example, in an example shown in FIG. 34, Tile 8 may be defined as a separate tile group since a height of Tile 8 is greater than that of a previous tile group, tile group1.

When a tile group is defined in a square shape, information for identifying tiles included in each tile group may be signaled to determine tiles included in each tile group. The information may be for identifying an index of a tile positioned at a left-top of the tile group and an index of a tile positioned at a right-top of the tile group. In an example, a syntax, top_left_tile_idx, for identifying an index of a tile positioned at a left-top of a tile group, and a syntax, bottom_right_tile_idx, for identifying an index of a tile positioned at a right-bottom of a tile group may be signaled in a bitstream. For the last tile group, encoding of at least one of a syntax for identifying an index of a tile positioned at the left-top of the tile group or a syntax for identifying an index of a tile positioned at the right-bottom of the tile group may be omitted.

In an example, in an example shown in FIG. 33, for tile group0, tile group1 and tile group2, top_left_tile_idx, an index of a tile index positioned at the left-top of each tile group, and bottom_right_tile_idx, an index of a tile positioned at the right-bottom of each tile group may be signaled. On the other hand, for tile group3 which is the last tile group in a picture, encoding of top_left_tile_idx and bottom_right_tile_idx may be omitted. An index of a tile positioned at the left-top of tile group3 may be set as an index of a tile positioned at the left-top of the remaining region excluding tile group0, tile group1 and tile group2 in a picture and an index of a tile positioned at the right-bottom of tile group3 may be set as the index of a tile positioned at the right-bottom of the above remaining region (or, a tile positioned at the right-bottom of a picture).

Alternatively, information representing a difference value between an index of a tile positioned at a left-top of a tile group and an index of a tile positioned at a right-top of the tile group may be signaled in a bitstream. In an example, a syntax, top_left_tile_idx, for identifying an index of a tile positioned at a left-top of a tile group, and a syntax, tile_delta_idx, representing a difference value between the index of the tile positioned at the left-top of a tile group and an index of a tile positioned at a right-bottom of the tile group may be signaled. For the last tile group, encoding of at least one of a syntax representing an index of a tile positioned at a left-top of a tile group or a syntax representing a difference value between an index of a tile positioned at a left-top of a tile group and an index of a tile positioned at a right-bottom of the tile group.

Alternatively, information representing a difference value between an index of a tile positioned at a right-bottom of a previous tile group and an index of a tile positioned at a right-bottom of a current tile group may be signaled in a bitstream. In an example, a syntax, tile_delta_idx, representing a difference value between an index of a tile positioned at a right-bottom of a previous tile group and an index of a tile positioned at a right-bottom of a current tile group may be signaled. For the first tile group, a syntax, tile_delta_idx, may represent a difference value between an index of a left-top tile and an index of a right-bottom tile in the first tile group. For the last tile group, encoding of a syntax representing a difference value between an index of a tile positioned at a right-bottom of a previous tile group and an index of a tile positioned at a right-bottom of a current tile group may be omitted.

It is possible to define a tile group based on an index of a coding tree unit, instead of an index of a tile group.

The above-mentioned example described that a tile group is defined in the raster scanning order of tiles, but it is also possible that a tile group may be defined according to a vertical scan, a horizontal scan or a diagonal scan.

Information indicating whether at least one tile group in a picture includes a plurality of tiles may be signaled. In an example, a syntax, isMultipleTileInTileG_flag, indicating whether there is a tile group including a plurality of tiles may be signaled. If a syntax, isMultipleTileInTileG_flag, is 1, it represents that at least one tile group in a picture includes at least 2 tiles or more. If a syntax, isMultipleTileInTileG_flag, is 0, it represents that all tile groups in a picture includes 1 tile. When isMultipleTileInTileG_flag is 0, each tile may be defined as a tile group.

Alternatively, information indicating whether the number of tiles constituting a tile group is plural may be signaled per tile group. In an example, a syntax, isMultipleTileInTileG_flag[i], represents whether an i-th tile group includes a plurality of tiles. When the number of tiles included in a tile group is 1, encoding of information for determining tiles included in a tile group (e.g. information on the number of tiles or information on a tile index) may be omitted.

A syntax, num_tile_inTG_minus2, representing the number of tiles in a tile group may be signaled. A syntax, num_tile_inTG_minus2, may be set as a value subtracting 2 from the number of tiles included in a tile group. A syntax, num_tile_inTG_minus2, representing the number of tiles in a tile group may be encoded only when a tile group is determined to include a plurality of tiles (e.g. when a value of isMultipleTileInTileG_flag is 1).

Alternatively, encoding of isMultipleTileInTileG_flag may be omitted and a syntax, num_tile_inTG_minus1, representing the number of tiles in a tile group may be encoded. A syntax, num_tile_inTG_minus1, may be set as a value subtracting 1 from the number of tiles included in a tile group.

A syntax, num_tile_inTG_minus2 or num_tile_inTG_minus1, representing the number of tile groups may be encoded only when a tile group is defined based on the raster scanning order of tiles. In an example, when a tile group is defined based on the raster scanning order of tiles, tile groups may be determined based on the number of tiles included in each tile group. In an example, num_tile_inTG_minus1[i] represents the number of tiles included in an i-th tile group. If the number of tiles included in a tile group is determined, tiles included in the tile group may be determined in the raster scanning order. For the last tile group, encoding of a syntax representing the number of tiles included in the tile group may be omitted.

Information indicating whether a size of a previous tile group is the same as that of a current tile group may be signaled. In this connection, the previous tile group may be determined based on an index of a tile group or a predetermined scanning order. In an example, a previous tile group may be determined as a tile group whose index is smaller than a current tile group by 1. Alternatively, a previous tile group may be determined according to at least one of a raster scanning order, a horizontal scanning order, a vertical scanning order or a diagonal scanning order.

The above information may include at least one of information indicating whether a size of a previous tile group is the same as that of a current tile group, information indicating whether a width of a previous tile group is the same as that of a current tile group or information indicating whether a height of a previous tile group is the same as that of a current tile group.

In an example, a syntax, use_previous_TG_size_flag, indicating whether a size of a current tile group is the same as that of a previous tile group may be signaled. If a syntax, use_previous_TG_size_flag[i], is 1, it represents that a size of an i-th tile group is the same as that of an (i−1)th tile group. When a syntax, use_previous_TG_size_flag[i], is 1, encoding of information for determining tiles included in i-th tile group may be omitted. For example, encoding of information representing the number of tiles included in a tile group or information representing an index of tiles included in a tile group may be omitted.

If a syntax, use_previous_TG_size_flag[i], is 0, it represents that a size of an i-th tile group is different from that of an (i−1)th tile group. When a syntax, use_previous_TG_size_flag[i], is 0, information for determining tiles included in an i-th tile group may be encoded and signaled.

The above-mentioned embodiment described that a flag indicating whether it is allowed to apply an in-loop filter on a boundary of tiles is signaled through a picture parameter set. But, when it is set not to use an in-loop filter on the boundary of all tiles, a problem may occur a problem that subjective image quality lowers and encoding efficiency decreases.

Accordingly, information indicating whether an in-loop filter is allowed may be encoded and signaled per tile.

FIG. 35 shows an example in which whether an in-loop filter is applied is selectively determined per tile.

As in an example shown in FIG. 35, whether an in-loop filter (e.g. a deblocking filter, SAO and/or ALF) will be allowed on a horizontal or vertical boundary may be determined per tile.

Table 13 represents an example in which information indicating whether an in-loop filter is allowed is encoded per tile.

TABLE 13

| | Descriptor |
|---|---|
| pic_parameter_set_rbsp( ) { | |
| ... | |
|   tiles_enabled_flag | u(1) |
| ... | |
|   if( tiles_enabled_flag ) { | |
|     number_of_tiles_in_picture_minus2 | ue(v) |
|     subtile_width_minus1 | ue(v) |
|     subtile_height_minus1 | ue(v) |
|     for ( i=0; i < number_of_tiles_in_picture_minus2+1 ; i++ ) { | |
|       if ( i > 0 ) | |
|         use_previous_tile_size_flag | u(1) |

TABLE 13-continued

| | Descriptor |
|---|---|
|     if ( use_previous_tile_size_flag == 0 ) { | |
|       tile_width_minus1[ i ] | ue(v) |
|       tile_height_minus1[ i ] | ue(v) |
|     } | |
|     loop_filter_across_tiles_flag[i] | u(1) |
|   } | |
| } | |
| ... | |

In an example in Table 13, a syntax element, loop_filter_across_tiles_flag[i], represents whether it is allowed to apply an in-loop filter for an i-th tile. If a value of loop_filter_across_tile_flag[i] is 1, it represents that an in-loop filter may be used on a horizontal and vertical boundary of a tile whose TileID is i. If a value of loop_filter_across_tile_flag[i] is 0, it represents that an in-loop filter may not be used on a horizontal and vertical boundary of a tile whose TileID is i.

Information indicating whether an in-loop filter is allowed for each horizontal direction and vertical direction may be encoded.

Table 14 represents an example in which information indicating whether an in-loop filter is allowed is individually encoded for a horizontal direction and a vertical direction.

TABLE 14

| | Descriptor |
|---|---|
| pic_parameter_set_rbsp( ) { | |
| ... | |
|   tiles_enabled_flag | u(1) |
|   ... | |
|   if( tiles_enabled_flag ) { | |
|     number_of_tiles_in_picture_minus2 | ue(v) |
|     subtile_width_minus1 | ue(v) |
|     subtile_height_minus1 | ue(v) |
|     for ( i=0; i < number_of_tiles_in_picture_minus2+1 ; i++ ) { | |
|       if ( i > 0 ) | |
|         use_previous_tile_size_flag | u(1) |
|       if ( use_previous_tile_size_flag == 0 ) { | |
|         tile_width_minus1[ i ] | ue(v) |
|         tile_height_minus1[ i ] | ue(v) |
|       } | |
|       loop_filter_hor_across_tiles_flag[i] | u(1) |
|       loop_filter_ver_across_tiles_flag[i] | u(1) |
|     } | |
|   } | |
| ... | |

In an example in Table 14, a syntax element, loop_filter_hor_across_tiles_flag[i], represents whether it is allowed to apply an in-loop filter horizontally across an i-th tile. A syntax element, loop_filter_ver_across_tiles_flag[i], represents whether it is allowed to apply an in-loop filter vertically across an i-th tile.

If a value of loop_filter_hor_across_tile_flag[i] is 1, it represents that an in-loop filter may be used on a horizontal boundary of a tile whose TileID is i. If a value of loop_filter_hor_across_tile_flag[i] is 0, it represents that an in-loop filter may not be used on a horizontal boundary of a tile whose TileID is i.

If a value of loop_filter_ver_across_tile_flag[i] is 1, it represents that an in-loop filter may be used on a vertical boundary of a tile whose TileID is i. If a value of loop_filter_ver_across_tile_flag[i] is 0, it represents that an in-loop filter may not be used on a vertical boundary of a tile whose TileID is i.

Alternatively, in a tile group level, information indicating whether an in-loop filter is allowed may be signaled. Whether an in-loop filter for a plurality of tiles included in a tile group is allowed may be determined by the above information.

Encoding of information indicating whether an in-loop filter is allowed may be omitted and whether an in-loop filter is allowed may be determined based on at least one of the number of coding tree units included in a tile, a width of a tile or a height of a tile. In an example, when a width of a tile is less than a base value, an in-loop filter for a horizontal direction may be allowed and when a height of a tile is less than a base value, an in-loop filter for a vertical direction may be allowed.

When an in-loop filter is used on a tile boundary, a reconstructed data outside the tile may be generated based on data included in the tile. In this connection, the reconstructed image outside the tile may be obtained by padding or interpolating data included in the tile. After than, the in-loop filter may be applied by using the reconstructed data outside the tile.

Applying the embodiments as described about the decoding process or the encoding process to the encoding process or the decoding process respectively may be included in the scope of the present disclosure. Within the scope of the present disclosure, the embodiments in which operations occur in a predetermined order may be modified to embodiments in which the operations occur in a different order from the predetermined order.

Although the above-described embodiment is described based on a series of the operations or the flowchart, the embodiment does not limit a time-series order of the operations of the method thereto. In another example, the operations may be performed simultaneously or in a different order therefrom as necessary. Further, in the above-described embodiment, each of the components (for example, a unit, a module, etc.) constituting the block diagram may be implemented in a form of a hardware device or software. A plurality of components may be combined with each other into a single component which may be implemented using a single hardware device or software. The above-described embodiment may be implemented using program instructions that may be executed via various computer components. The instructions may be recorded in a computer-readable storage medium. The computer-readable storage medium may contain therein program instructions, data files, data structures, or the like alone or in combination with each other. Examples of the computer-readable storage media include magnetic media such as hard disks, floppy disks, and magnetic tapes, optical storage media such as CD-ROMs, DVDs, and magneto-optical media such as floptical disks, and hardware devices such as ROM, RAM, flash memory, and the like specifically configured to store therein and execute the program instructions. The hardware device may be configured to operate as one or more software modules to perform processing according to the present disclosure, and vice versa.

INDUSTRIAL AVAILABILITY

The present disclosure may be applied to an electronic device that encodes/decodes video.

What is claimed is:
1. A system comprising:
one or more processors; and
one or more non-transitory computer readable media storing instructions that, when executed by the one or more processors, cause the one or more processors to perform operations comprising:

partitioning a picture into a plurality of tile columns; and partitioning the picture into a plurality of tile rows, wherein partitioning the picture into the plurality of tile columns comprises:

determining whether width information of each of a plurality of tile columns is to be decoded from a bitstream or not, wherein determining whether width information of each of the plurality tile columns is to be decoded from a bitstream or not comprises:

determining that the width information of a first tile column of the plurality of tile columns is to be decoded from the bitstream, and in response, determining a width of the first tile column based on the width information decoded for the first tile column, and determining that the width information of two or more additional tile columns of the plurality of tile columns is not to be decoded from the bitstream, and in response:

determining that the width of at least one of the additional tile columns is a width of a previous tile column, and determining that the width of at least one of the additional tile columns is a remaining width of a current picture.

2. The system of claim 1, wherein the operations further comprise decoding width number information from the bitstream, the width number information specifying the number of width information to be explicitly signaled, and wherein determination of whether the width information of a current tile column is to be decoded or not is based on a comparison between a value of the width number information and an index of the current tile column.

3. The system of claim 2, wherein when the index of the current tile column is equal to or less than the value of the width number information, the width information of the current tile column is decoded from the bitstream, and wherein when the index of the current tile column is greater than the value of the width number information, the width information of the current tile column is not decoded from the bitstream.

4. The system of claim 1, wherein when it is determined that the width information of a current tile column is not to be decoded from the bitstream, the width of the current tile column is determined to be smaller one among the width of the previous tile column and the remaining width of the current picture.

5. One or more non-transitory computer readable media storing instructions that, when executed by one or more processors, cause the one or more processors to perform operations comprising:

partitioning a picture into a plurality of tile columns; and partitioning the picture into a plurality of tile rows, wherein partitioning the picture into the plurality of tile columns comprises:

determining whether width information of each of a plurality of tile columns is to be decoded from a bitstream or not, wherein determining whether width information of each of the plurality tile columns is to be decoded from a bitstream or not comprises:

determining that the width information of a first tile column of the plurality of tile columns is to be decoded from the bitstream, and in response, determining a width of the first tile column based on the width information decoded for the first tile column, and determining that the width information of two or more additional tile columns of the plurality of tile columns is not to be decoded from the bitstream, and in response:

determining that the width of at least one of the additional tile columns is a width of a previous tile column, and determining that the width of at least one of the additional tile columns is a remaining width of a current picture.

6. The one or more non-transitory computer readable media of claim 5, wherein the operations further comprise decoding width number information from the bitstream, the width number information specifying the number of width information to be explicitly signaled, and wherein determination of whether the width information of a current tile column is to be decoded or not is based on a comparison between a value of the width number information and an index of the current tile column.

7. The one or more non-transitory computer readable media of claim 6, wherein when the index of the current tile column is equal to or less than the value of the width number information, the width information of the current tile column is decoded from the bitstream, and wherein when the index of the current tile column is greater than the value of the width number information, the width information of the current tile column is not decoded from the bitstream.

8. The one or more non-transitory computer readable media of claim 5, wherein when it is determined that the width information of a current tile column is not to be decoded from the bitstream, the width of the current tile column is determined to be smaller one among the width of the previous tile column and the remaining width of the current picture.

9. A system comprising:

one or more processors; and one or more non-transitory computer readable media storing instructions that, when executed by the one or more processors, cause the one or more processors to perform operations comprising:

partitioning a picture into a plurality of tile columns;

partitioning the picture into a plurality of tile rows; and determining whether to encode width information of each of the tile column into a bitstream or not, wherein determining whether to encode width information of each of the tile columns into the bitstream or not comprises:

determining that a width of a first tile columns of the plurality of tile columns is neither a width of a previous tile column nor a remaining width of a current picture, and encoding the width information of the first tile column into the bitstream, and determining that the width of each of two or more additional tile columns of the plurality of tile columns is either the width of the previous tile column or the remaining width of the current picture, and in response, omitting the width information of the two or more additional tile columns from the bitstream, wherein the width of at least one of the additional tile columns is the width of the previous tile column, and wherein the width of at least one of the additional tile columns is the remaining width of the current picture.

10. The system of claim 9, wherein the operations further comprise encoding width number information into the bitstream, the width number information specifying the number of width information to be explicitly signaled.

11. The system of claim 10, wherein when an index of a current tile column is equal to or less than a value of the width number information, the width information of the current tile column is encoded into the bitstream, and wherein when the index of the current tile column is greater than the value of the width number information, encoding of the width information of the current tile column is omitted.

12. The system of claim 9, wherein when encoding of the width information of a current tile column is omitted, the width of the current tile column is the same as smaller one among the width of the previous tile column and the remaining width of the current picture.

13. One or more non-transitory computer readable media storing instructions that, when executed by one or more processors, cause the one or more processors to perform operations comprising:

partitioning a picture into a plurality of tile columns;
partitioning the picture into a plurality of tile rows; and
determining whether to encode width information of each of the tile column into a bitstream or not, wherein determining whether to encode width information of each of the tile columns into the bitstream or not comprises:
determining that a width of a first tile columns of the plurality of tile columns is neither a width of a previous tile column nor a remaining width of a current picture, and encoding the width information of the first tile column into the bitstream, and
determining that the width of each of two or more additional tile columns of the plurality of tile columns is either the width of the previous tile column or the remaining width of the current picture, and in response, omitting the width information of the two or more additional tile columns from the bitstream,
wherein the width of at least one of the additional tile columns is the width of the previous tile column, and
wherein the width of at least one of the additional tile columns is the remaining width of the current picture.

14. The one or more non-transitory computer readable media of claim 13, wherein the operations further comprise encoding width number information into the bitstream, the width number information specifying the number of width information to be explicitly signaled.

15. The one or more non-transitory computer readable media of claim 14, wherein when an index of a current tile column is equal to or less than a value of the width number information, the width information of the current tile column is encoded into the bitstream, and wherein when the index of the current tile column is greater than the value of the width number information, encoding of the width information of the current tile column is omitted.

16. The one or more non-transitory computer readable media of claim 13, wherein when encoding of the width information of a current tile column is omitted, the width of the current tile column is the same as smaller one among the width of the previous tile column and the remaining width of the current picture.

* * * * *

UNITED STATES PATENT AND TRADEMARK OFFICE
CERTIFICATE OF CORRECTION

PATENT NO. : 11,997,272 B2
APPLICATION NO. : 18/116554
DATED : May 28, 2024
INVENTOR(S) : Bae Keun Lee Page 1 of 1

It is certified that error appears in the above-identified patent and that said Letters Patent is hereby corrected as shown below:

In the Claims

Column 53, Line 11, in Claim 1, after "plurality" insert -- of --; and

Column 53, Line 63, in Claim 5, after "plurality" insert -- of --.

Signed and Sealed this
Eighth Day of October, 2024

Katherine Kelly Vidal
*Director of the United States Patent and Trademark Office*